US012213055B2

(12) United States Patent
Patil et al.

(10) Patent No.: US 12,213,055 B2
(45) Date of Patent: *Jan. 28, 2025

(54) MULTI-LINK COMMUNICATION

(71) Applicant: QUALCOMM Incorporated, San Diego, CA (US)

(72) Inventors: Abhishek Pramod Patil, San Diego, CA (US); George Cherian, San Diego, CA (US); Alfred Asterjadhi, San Diego, CA (US); Sai Yiu Duncan Ho, San Diego, CA (US); Lochan Verma, Danville, CA (US); Yanjun Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,192

(22) Filed: Nov. 28, 2023

(65) Prior Publication Data

US 2024/0098624 A1 Mar. 21, 2024

Related U.S. Application Data

(63) Continuation of application No. 17/942,988, filed on Sep. 12, 2022, which is a continuation of application
(Continued)

(51) Int. Cl.
*H04W 48/08* (2009.01)
*H04L 1/1607* (2023.01)
(Continued)

(52) U.S. Cl.
CPC ........... *H04W 48/08* (2013.01); *H04L 1/1621* (2013.01); *H04W 4/23* (2018.02); *H04W 8/245* (2013.01);
(Continued)

(58) Field of Classification Search
CPC ....... H04W 48/08; H04W 48/16; H04W 4/23; H04W 76/15; H04W 76/11;
(Continued)

(56) References Cited

U.S. PATENT DOCUMENTS 8,885,539 B2  11/2014  Trudeau et al.
9,271,291 B2   2/2016  Gauvreau et al.
(Continued)

FOREIGN PATENT DOCUMENTS

CN    101167392 A    4/2008
CN    102823183 A   12/2012
(Continued)

OTHER PUBLICATIONS

Patil A ( Qualcomm)., et al., "Container for Advertising ML Information", IEEE 802.11-20/03574-2, MLO: Container Structure for Capability Advertisement, vol. 802.11 EHT: 802.11 be, No. 2, Mar. 15, 2020, XP068169647, Jun. 22, 2020, pp. 1-30.
(Continued)

*Primary Examiner* — Phong La
(74) *Attorney, Agent, or Firm* — Kevin M. Donnelly; Holland & Hart LLP

(57) ABSTRACT

This disclosure provides systems, methods, and apparatuses for associating a wireless communication device such as a wireless station (STA) of a STA multi-link device (MLD) with an access point (AP) MLD that includes a first AP associated with a first communication link of the AP MLD and includes one or more secondary APs associated with one or more respective secondary communication links of the first AP MLD. The first AP includes one or more virtual APs, and the first AP and the one or more virtual APs of the first AP belong to a first multiple basic service set identifier (BSSID) set associated with the first communication link. The AP MLD transmits a frame including a first element
(Continued)

carrying discovery information for the first AP and the one or more virtual APs belonging to the first multiple BSSID set, and including a second element carrying discovery information for the one or more secondary APs of the first AP MLD associated with the one or more respective secondary communication links of the first AP MLD.

30 Claims, 31 Drawing Sheets

Related U.S. Application Data

No. 16/926,644, filed on Jul. 10, 2020, now Pat. No. 11,445,431.

(60) Provisional application No. 63/003,284, filed on Mar. 31, 2020, provisional application No. 63/003,272, filed on Mar. 31, 2020, provisional application No. 62/873,827, filed on Jul. 12, 2019.

(51) Int. Cl.
| | | |
|---|---|---|
| *H04W 4/23* | (2018.01) | |
| *H04W 8/24* | (2009.01) | |
| *H04W 12/73* | (2021.01) | |
| *H04W 48/16* | (2009.01) | |
| *H04W 72/0446* | (2023.01) | |
| *H04W 74/0808* | (2024.01) | |
| *H04W 76/11* | (2018.01) | |
| *H04W 76/15* | (2018.01) | |
| *H04W 80/02* | (2009.01) | |
| *H04W 84/12* | (2009.01) | |
| *H04W 88/02* | (2009.01) | |
| *H04W 88/10* | (2009.01) | |
| *H04W 92/02* | (2009.01) | |
| *H04W 92/10* | (2009.01) | |

(52) U.S. Cl.
CPC .......... *H04W 12/73* (2021.01); *H04W 48/16* (2013.01); *H04W 72/0446* (2013.01); *H04W 74/0808* (2013.01); *H04W 76/11* (2018.02); *H04W 76/15* (2018.02); *H04W 80/02* (2013.01); *H04W 84/12* (2013.01); *H04W 88/02* (2013.01); *H04W 88/10* (2013.01); *H04W 92/02* (2013.01); *H04W 92/10* (2013.01)

(58) Field of Classification Search
CPC ......... H04W 72/0446; H04W 74/0808; H04W 12/73; H04W 8/245; H04W 80/02; H04W 84/12; H04W 88/02; H04W 88/10; H04W 92/02; H04W 92/10; H04L 1/1621
See application file for complete search history.

(56) References Cited

U.S. PATENT DOCUMENTS

| | | | |
|---|---|---|---|
| 9,743,275 B2 | 8/2017 | Asterjadhi et al. | |
| 9,794,829 B2 | 10/2017 | Seok | |
| 9,847,988 B2 | 12/2017 | Chu et al. | |
| 9,900,759 B2 | 2/2018 | Wentink et al. | |
| 10,588,165 B1 | 3/2020 | Chu et al. | |
| 10,938,644 B2 | 3/2021 | Xiao et al. | |
| 11,202,286 B2 | 12/2021 | Huang et al. | |
| 11,228,963 B2 | 1/2022 | Patil et al. | |
| 11,445,431 B2 | 9/2022 | Patil et al. | |
| 2003/0043773 A1 | 3/2003 | Chang | |
| 2007/0250713 A1* | 10/2007 | Rahman | H04W 12/50 713/171 |
| 2008/0069006 A1 | 3/2008 | Walter et al. | |
| 2010/0020746 A1 | 1/2010 | Zaks | |
| 2013/0077554 A1 | 3/2013 | Gauvreau et al. | |
| 2014/0010223 A1 | 1/2014 | Wang et al. | |
| 2016/0006672 A1 | 1/2016 | Saavedra | |
| 2016/0073440 A1* | 3/2016 | Pallen | H04W 76/15 370/329 |
| 2016/0112858 A1 | 4/2016 | Nguyen et al. | |
| 2016/0360443 A1 | 12/2016 | Hedayat | |
| 2017/0033850 A1 | 2/2017 | Kasher et al. | |
| 2017/0094680 A1 | 3/2017 | Patel et al. | |
| 2017/0257817 A1 | 9/2017 | Itagaki et al. | |
| 2017/0359300 A1 | 12/2017 | Patil et al. | |
| 2018/0054724 A1 | 2/2018 | Cariou et al. | |
| 2018/0199271 A1 | 7/2018 | Viger et al. | |
| 2018/0206190 A1 | 7/2018 | Cherian et al. | |
| 2018/0295567 A1 | 11/2018 | Ko et al. | |
| 2018/0338273 A1* | 11/2018 | Liu | H04W 76/15 |
| 2019/0150214 A1 | 5/2019 | Zhou et al. | |
| 2019/0158385 A1 | 5/2019 | Patil et al. | |
| 2019/0158413 A1 | 5/2019 | Patil et al. | |
| 2019/0215884 A1 | 7/2019 | Patil et al. | |
| 2019/0268221 A1 | 8/2019 | Xiao et al. | |
| 2019/0268956 A1* | 8/2019 | Xiao | H04W 76/15 |
| 2019/0335454 A1* | 10/2019 | Huang | H04W 72/542 |
| 2020/0221545 A1 | 7/2020 | Stacy et al. | |
| 2020/0252874 A1 | 8/2020 | Atefi | |
| 2020/0351988 A1 | 11/2020 | Chen et al. | |
| 2020/0374802 A1* | 11/2020 | Chu | H04W 28/082 |
| 2020/0396568 A1* | 12/2020 | Huang | H04W 76/40 |
| 2020/0413343 A1 | 12/2020 | Atefi | |
| 2021/0007168 A1* | 1/2021 | Asterjadhi | H04W 52/0216 |
| 2021/0014776 A1 | 1/2021 | Patil et al. | |
| 2021/0014911 A1* | 1/2021 | Patil | H04W 12/73 |
| 2021/0400662 A1* | 12/2021 | Huang | H04W 72/542 |
| 2022/0225236 A1 | 7/2022 | Bang et al. | |
| 2022/0279375 A1 | 9/2022 | Kim et al. | |
| 2022/0312522 A1 | 9/2022 | Jang et al. | |
| 2023/0007572 A1 | 1/2023 | Patil et al. | |
| 2023/0403743 A1* | 12/2023 | Kim | H04W 74/0816 |
| 2024/0098624 A1* | 3/2024 | Patil | H04W 48/16 |

FOREIGN PATENT DOCUMENTS

| | | | |
|---|---|---|---|
| CN | 103096328 A | 5/2013 | |
| CN | 103907388 A | 7/2014 | |
| CN | 104602266 A | 5/2015 | |
| CN | 104685934 A | 6/2015 | |
| CN | 104838695 A | 8/2015 | |
| CN | 105264845 A | 1/2016 | |
| CN | 106102149 A | 11/2016 | |
| CN | 107667559 A | 2/2018 | |
| CN | 108141872 A | 6/2018 | |
| CN | 109417755 A | 3/2019 | |
| CN | 109640310 A | 4/2019 | |
| CN | 109890053 A | 6/2019 | |
| CN | 112188644 A * | 1/2021 | H04L 1/16 |
| CN | 102761938 A | 10/2021 | |
| GB | 2548155 A | 9/2017 | |
| TW | 201921986 A | 6/2019 | |
| WO | WO2011056878 | 5/2011 | |
| WO | WO-2015167733 A1 | 11/2015 | |
| WO | WO2016123473 A1 | 8/2016 | |
| WO | WO-2017053642 | 3/2017 | |
| WO | WO2017099542 A1 | 6/2017 | |
| WO | WO2018022215 | 2/2018 | |

OTHER PUBLICATIONS

Patil A ( Qualcomm)., et al., "MLO Discovery Signaling", IEEE 802.11-20/0356r3, MLO: Discovery and Beacon-Bloating, vol. 802.11 EHT: 802.11 be, No. 3, Mar. 15, 2020, XP068169516, Jun. 10, 2020, pp. 1-16.
Seok Y ( Mediatek): "Enhanced Multi-Band/Multi-Channel Operation", vol. 802.11 EHT; 802.11 be, No. 1, May 14, 2019, XP068151249, pp. 1-13.
"U.S. Appl. No. 16/288,025 Final Office Action", Oct. 1, 2020, 15 pages.

(56) References Cited

OTHER PUBLICATIONS

"U.S. Appl. No. 16/288,025 Office Action", May 28, 2020, 17 pages.
Abhishek P (Qualcomm): "MLO: Container Structure for Capability Advertisement", IEEE Draft, 11-20-0357-02-00BE-MLO-Container-Structure-for-Capability-Advertisement, IEEE-SA Mentor, Piscataway, NJ, USA vol. 802.11 EHT, 802.11be, No. 2, Jun. 22, 2020 (Jun. 22, 2020), pp. 1-30, XP068169647, Slides 2-13.
David L.P., et al., "IEEE 802.11be Extremely High Throughput: The Next Generation of Wi-Fi Technology Beyond 802 .11ax", Feb. 12, 2019 (Feb. 12, 2019), XP055714804, 7 pages, Retrieved from the Internet: URL: https://arxiv.org/pdf/1902.04320v1.pdf">https://arxiv.org/pdf/1902.04320v1.pdf. [retrieved on Feb. 12, 2019] the whole document.
Hiertz G.R., et al., (Ericsson): "Multiple BSSID Element; 11-15-1014-00-00ax-Multiple-BSSID-Element", IEEE Draft; 11-15-1014-00-00AX-Multiple-BSSID-Element, IEEE-SA Mentor, Piscataway, NJ, USA, vol. 802.11ax, Aug. 25, 2015 (Aug. 25, 2015), IEEE 802.11-14/1014r0, pp. 1-16, XP068098190, [retrieved on Aug. 25, 2015], p. 1, Line 1—p. 10, Line 18.
International Preliminary Report on Patentability —PCT/US2020/041729, The International Bureau of WIPO—Geneva, Switzerland, Jan. 27, 2022.
International Search Report and Written Opinion—PCT/US2019/019991—ISA/EPO—May 2, 2019.
International Search Report and Written Opinion—PCT/US2019/020000—ISA/EPO—May 17, 2019.
International Search Report and Written Opinion—PCT/US2020/041728—ISA/EPO—Sep. 25, 2020.
International Search Report and Written Opinion—PCT/US2020/041729—ISA/EPO—Oct. 8, 2020.
International Preliminary Report on Patentability—PCT/US2019/019991, The International Bureau of WIPO—Geneva, Switzerland, Sep. 10, 2020.
International Preliminary Report on Patentability—PCT/US2019/020000, The International Bureau of WIPO—Geneva, Switzerland, Sep. 10, 2020.
Jian H., et al., "Throughput Optimization of Multiple Association-Based Software Defined Dense WLAN EDCA", Chinese High Technology Letters, 2018, vol. 28, Issue 1: 15-21, High Technology Letters No. 1, Jan. 15, 2018, DOI:10.3772/J.ISSN.1002-0470. 2018. 01.003, 11 Pages, Full text 1-29.
Lucent Technologies: "Draft CR to 21.905 for WLAN Interworking", This Specification IS provided for future development work within 3GPP only. The Organisational Partners accept no liability for any use of this Specification, TSG-SA1 SWG #18, S1-022156, Busan, Korea, Nov. 11-15, 2002, 56 Pages.
Patil A., et al., (Qualcomm): "MLO Discovery Signaling", MLO: Discovery and Beacon-Bloating, IEEE Draft, 11-20-0356-03-00BE-MLO-Discovery-and-Beacon-Bloating, IEEE-SA Mentor, Piscataway, NJ, USA vol. 802.11 EHT, 802.11be, Mar. 15, 2020 (Mar. 15, 2020), pp. 1-16, XP068167069, Retrieved from the Internet: URL: https://mentor.ieee.org/802.11/dcn/20/11-20-0356-00-00be-mlo-discovery-and-beacon-bloating.pptx">https://mentor.ieee.org/802.11/dcn/20/11-20-0356-00-00be-mlo-discovery-and-beacon-bloating.pptx. [retrieved on Mar. 15, 2020], p. 2-p. 3.
Seok Y., et al., "EHT Multi-link Operation", IEEE 802.11-19/0731r0, May 15, 2019, 17 pages.
Taiwan Search Report—TW108107021—TIPO—Oct. 21, 2021.
Taiwan Search Report—TW109123541—TIPO—Nov. 27, 2023.
Yongho S (Mediatek): "Enhanced Multi-band/Multi-Channel Operation", IEEE Draft, 11-19-0766-01-00BE-Enhanced-Multi-Band-Multj-Channel-Operation, IEEE-SA Mentor, Piscataway, NJ, USA, vol. 802.11 EHT, 802.11be, No. 1, May 14, 2019 (May 14, 2019), pp. 1-13, XP068151249, Slides 7-9, 12.

\* cited by examiner

720

722

Establishing a block acknowledgement (BA) session with the second wireless communication device that affiliates at least one traffic identifier (TID) to a first subset of the first communication link, the second communication link, and a third communication link, wherein the BA session is common for each of the first, the second, and the third communication links.

724

Dynamically reaffiliating the at least one TID to a second subset of the first communication link, the second communication link, and a third communication link.

726

Indicating the reaffiliation in an add Block Acknowledgment (ADDBA) Capabilities field of a third packet.

*Figure 7B*

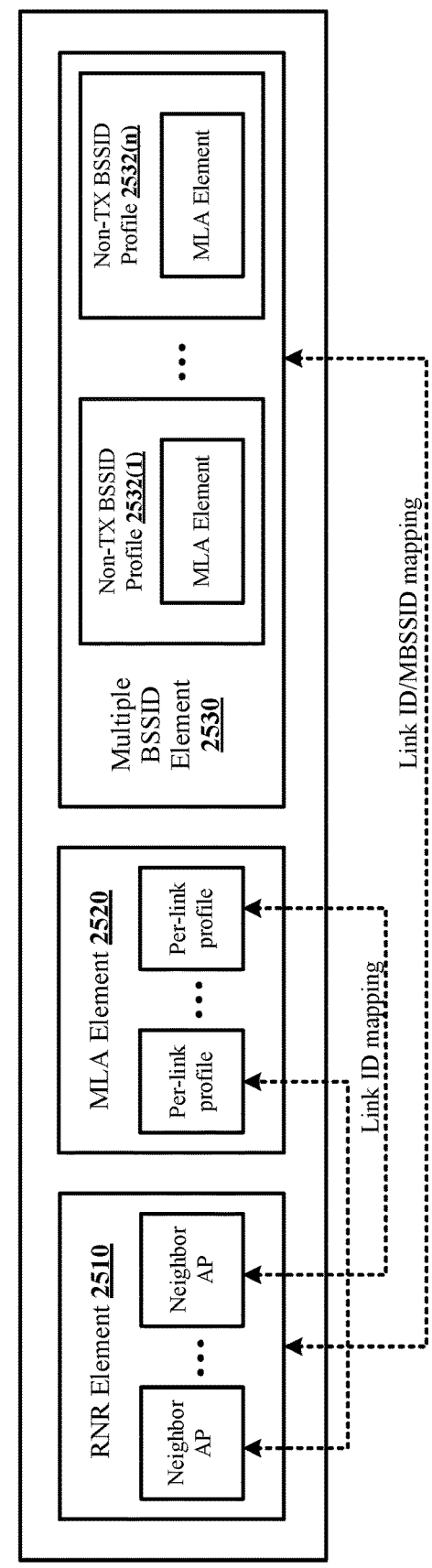

MULTI-LINK COMMUNICATION

CROSS-REFERENCE TO RELATED APPLICATIONS

This Patent Application is a continuation of Ser. No. 17/942,988 entitled "Multi-Link Communication" filed Sep. 12, 2022, which is a continuation application of, and claims priority to, U.S. patent application Ser. No. 16/926,644 entitled "MULTI-LINK COMMUNICATION" and filed on Jul. 10, 2020, which claims priority to U.S. Provisional Patent Application No. 63/003,272 entitled "MULTI-LINK COMMUNICATION" and filed on Mar. 31, 2020, to U.S. Provisional Patent Application No. 63/003,284 entitled "MULTI-LINK COMMUNICATION" and filed on Mar. 31, 2020, and to U.S. Provisional Patent Application No. 62/873,827 entitled "MULTI-LINK COMMUNICATION" and filed on Jul. 12, 2019, all of which are assigned to the assignee hereof. The disclosures of all prior Applications are considered part of and are incorporated by reference in this Patent Application.

TECHNICAL FIELD

This disclosure relates generally to wireless communication, and more specifically, to multi-link (ML) communication.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

To improve data throughput, the AP may communicate with one or more STAs over multiple concurrent communication links. Each of the communication links may be of various bandwidths, for example, by bonding a number of 20 MHz-wide channels together to form 40 MHz-wide channels, 80 MHz-wide channels, or 160 MHz-wide channels. The AP may establish BSSs on any of the different communication links, and therefore it is desirable to improve communication between the AP and the one or more STAs over each of the communication links.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication. In some implementations, the method may be performed by a first access point (AP) multi-link device (MLD) that includes a first AP and one or more secondary APs. The first AP may be associated with a first communication link of the AP MLD, and each of the one or more secondary APs may be associated with a respective secondary communication link of the one or more secondary communication links of the AP MLD. The first AP may also include one or more virtual APs, and the first AP and the one or more virtual APs of the first AP may belong to a first multiple basic service set identifier (BSSID) set associated with the first communication link. The method may include generating a frame including a first element carrying discovery information for the first AP and the one or more virtual APs belonging to the first multiple BSSID set, and including a second element carrying discovery information for the one or more secondary APs of the first AP MLD. In some implementations, the method may also include transmitting the frame on the first communication link.

In some implementations, the method may also include receiving a multi-link (ML) association request or a ML probe request from a first wireless station (STA) of a STA MLD, and transmitting one or both of association information or discovery information for the first AP and the one or more secondary APs of the first AP MLD to the first STA of the STA MLD based on the request. In some instances, the method may also include associating the STA MLD with the first AP MLD based at least in part on the request and communicating with the STA MLD on one or more of the first communication link or the one or more secondary communication links based on the association. In some aspects, the ML association request or ML probe request may include a multi-link attribute element carrying capability information of one or more secondary STAs of the STA MLD.

In some implementations, the frame may also include an identifier (ID) field carrying a first identifier that uniquely identifies one or both of the AP MLD with which the first AP is associated or a respective secondary AP of the one or more secondary APs that is affiliated with the first AP MLD. In some instances, the frame may also include one or more second ID fields, each field of the one or more second ID fields carrying a corresponding second identifier that uniquely identifies one or both of a second AP MLD of one or more second AP MLDs with which a respective virtual AP of the one or more virtual APs is affiliated, or a secondary AP of the one or more secondary APs that is affiliated with the second AP MLD. In some implementations, the first identifier may include one or more of a first link identifier that identifies the secondary AP affiliated with the first AP MLD, or a first MLD identifier that identifies the first AP MLD. Each identifier of the one or more second identifiers may include one or more of a second link identifier that identifies the secondary AP that is affiliated with the second AP MLD, or a second MLD identifier that identifies the second AP MLD.

In some implementations, each secondary AP of the one or more secondary APs may belong to a respective secondary multiple BSSID set of one or more secondary multiple BSSID sets. In some other implementations, the first AP may be associated with a transmitted BSSID (Tx BSSID), and each virtual AP of the one or more virtual APs may be associated with a corresponding non-transmitted BSSID (non-Tx BSSID) of one or more non-Tx BSSIDs. In some instances, the first element may include a multiple BSSID element including one or more non-Tx BSSID profiles, each profile of the one or more non-Tx BSSID profiles including an ID field carrying an identifier that uniquely identifies one or both of a respective AP of the first AP and the one or more virtual APs or a respective AP MLD of the first AP MLD and one or more second AP MLDs.

In some implementations, the second element may include a multi-link attribute element including one or more per-link profile subelements, each per-link profile subelement of the one or more per-link profile subelements carrying the discovery information for a corresponding secondary AP of the one or more secondary APs of the first AP MLD and carrying an ID field carrying an identifier that uniquely identifies a corresponding secondary communication link of the one or more secondary communication links. In some instances, each per-link profile subelement may carry operating parameters of the corresponding secondary AP of the first AP MLD, the operating parameters indicating at least one of a high-throughput (HT) operation, very high-throughput (VHT) operation, high efficiency (HE) operation, extremely high-throughput (EHT) operation, enhanced distributed channel access (EDCA) parameters, multi-user (MU) EDCA parameters, uplink (UL) orthogonal frequency division multiple access (OFDMA) random access (UORA) parameters, target wait time (TWT) parameters, fast initial link setup (FILS) parameters, or spatial reuse (SR) parameters. In some other instances, each per-link profile subelement may carry capability information of the corresponding secondary AP of the first AP MLD, the capability information indicating at least one of HT capabilities, VHT capabilities, HE capabilities, HE 6 GHz Band Capabilities, or EHT capabilities.

In some other instances, the multi-link attribute element may also indicate operating parameters of a respective AP and one or more corresponding virtual APs included in the respective AP, the respective AP and the one or more corresponding virtual APs belonging to a corresponding secondary multiple BSSID set of the one or more secondary multiple BSSID sets.

In some implementations, the frame may also include a reduced neighbor report (RNR) element carrying one or more neighbor AP information fields, each field of the one or more neighbor AP information fields carrying the unique link ID of a corresponding secondary AP of the one or more secondary APs of the first AP MLD. In some instances, the frame may further include an MLD common element or field carrying common attributes shared by each secondary AP of the one or more secondary APs of the AP MLD, and the RNR element may also include a control field indicating a presence or absence of one or more of the common attributes in the MLD common element or field.

Another innovative aspect of the subject matter described in this disclosure can be implemented in a wireless communication device. In some implementations, the wireless communication device may be a first access point (AP) multi-link device (MLD) that includes a first AP and one or more secondary APs. The first AP may be associated with a first communication link of the AP MLD, and each of the one or more secondary APs may be associated with a respective secondary communication link of the one or more secondary communication links of the AP MLD. The first AP may also include one or more virtual APs, and the first AP and the one or more virtual APs of the first AP may belong to a first multiple basic service set identifier (BSSID) set associated with the first communication link. The first AP MLD may include at least one modem, at least one processor communicatively coupled with the at least one modem, and at least one memory communicatively coupled with the at least one processor. The at least one memory stores instructions that, when executed by the at least one processor in conjunction with the at least one modem, causes the first AP MLD to perform operations. The operations may include generating a frame including a first element carrying discovery information for the first AP and the one or more virtual APs belonging to the first multiple BSSID set, and including a second element carrying discovery information for the one or more secondary APs of the first AP MLD.

In some implementations, the method may also include receiving a multi-link (ML) association request or a ML probe request from a first wireless station (STA) of a STA MLD, and transmitting one or both of association information or discovery information for the first AP and the one or more secondary APs of the first AP MLD to the first STA of the STA MLD based on the request. In some instances, the method may also include associating the STA MLD with the first AP MLD based at least in part on the request and communicating with the STA MLD on one or more of the first communication link or the one or more secondary communication links based on the association. In some aspects, the ML association request or ML probe request may include a multi-link attribute element carrying capability information of one or more secondary STAs of the STA MLD.

In some implementations, the frame may also include an identifier (ID) field carrying a first identifier that uniquely identifies one or both of the AP MLD with which the first AP is associated or a respective secondary AP of the one or more secondary APs that is affiliated with the first AP MLD. In some instances, the frame may also include one or more second ID fields, each field of the one or more second ID fields carrying a corresponding second identifier that uniquely identifies one or both of a second AP MLD of one or more second AP MLDs with which a respective virtual AP of the one or more virtual APs is affiliated, or a secondary AP of the one or more secondary APs that is affiliated with the second AP MLD. In some implementations, the first identifier may include one or more of a first link identifier that identifies the secondary AP affiliated with the first AP MLD, or a first MLD identifier that identifies the first AP MLD. Each identifier of the one or more second identifiers may include one or more of a second link identifier that identifies the secondary AP that is affiliated with the second AP MLD, or a second MLD identifier that identifies the second AP MLD.

In some implementations, each secondary AP of the one or more secondary APs may belong to a respective secondary multiple BSSID set of one or more secondary multiple BSSID sets. In some other implementations, the first AP may be associated with a transmitted BSSID (Tx BSSID), and each virtual AP of the one or more virtual APs may be associated with a corresponding non-transmitted BSSID (non-Tx BSSID) of one or more non-Tx BSSIDs. In some instances, the first element may include a multiple BSSID element including one or more non-Tx BSSID profiles, each profile of the one or more non-Tx BSSID profiles including an ID field carrying an identifier that uniquely identifies one or both of a respective AP of the first AP and the one or more virtual APs or a respective AP MLD of the first AP MLD and one or more second AP MLDs.

In some implementations, the second element may include a multi-link attribute element including one or more per-link profile subelements, each per-link profile subelement of the one or more per-link profile subelements carrying the discovery information for a corresponding secondary AP of the one or more secondary APs of the first AP MLD and carrying an ID field carrying an identifier that uniquely identifies a corresponding secondary communication link of the one or more secondary communication links. In some instances, each per-link profile subelement may carry operating parameters of the corresponding secondary AP of the first AP MLD, the operating parameters indicating at least one of a high-throughput (HT) operation, very high-throughput (VHT) operation, high efficiency (HE) operation, extremely high-throughput (EHT) operation, enhanced distributed channel access (EDCA) parameters, multi-user (MU) EDCA parameters, uplink (UL) orthogonal frequency division multiple access (OFDMA) random access (UORA) parameters, target wait time (TWT) parameters, fast initial link setup (FILS) parameters, or spatial reuse (SR) parameters. In some other instances, each per-link profile subelement may carry capability information of the corresponding secondary AP of the first AP MLD, the capability information indicating at least one of HT capabilities, VHT capabilities, HE capabilities, HE 6 GHz Band Capabilities, or EHT capabilities.

In some other instances, the multi-link attribute element may also indicate operating parameters of a respective AP and one or more corresponding virtual APs included in the respective AP, the respective AP and the one or more corresponding virtual APs belonging to a corresponding secondary multiple BSSID set of the one or more secondary multiple BSSID sets.

In some implementations, the frame may also include a reduced neighbor report (RNR) element carrying one or more neighbor AP information fields, each field of the one or more neighbor AP information fields carrying the unique link ID of a corresponding secondary AP of the one or more secondary APs of the first AP MLD. In some instances, the frame may further include an MLD common element or field carrying common attributes shared by each secondary AP of the one or more secondary APs of the AP MLD, and the RNR element may also include a control field indicating a presence or absence of one or more of the common attributes in the MLD common element or field.

Another innovative aspect of the subject matter described in this disclosure can be implemented as a method for wireless communication. In some implementations, the method may be performed by a STA MLD to associate with an AP MLD that includes a first AP and one or more secondary APs. The AP MLD may include a first AP and one or more secondary APs. The first AP may be associated with a first communication link of the AP MLD, and each of the one or more secondary APs may be associated with a respective secondary communication link of the one or more secondary communication links of the AP MLD. The first AP may also include one or more virtual APs, and the first AP and the one or more virtual APs of the first AP may belong to a first multiple basic service set identifier (BSSID) set associated with the first communication link. The method may include receiving, from the first AP MLD on a first communication link of the first AP MLD, a frame including a first element carrying discovery information for the first AP and the one or more virtual APs belonging to the first multiple BSSID set, and including a second element carrying discovery information for the one or more secondary APs of the first AP MLD associated with the one or more respective secondary communication links of the first AP MLD.

In some implementations, the method may also include transmitting, by a first STA of the STA MLD, a multi-link (ML) association request to the first AP MLD on the first communication link, and receiving association information for the first AP and the one or more secondary APs of the first AP MLD based on the ML association request. In some instances, the method may also include associating the STA MLD with the first AP MLD based at least in part on the association information and communicating with the first AP MLD on one or more of the first communication link or the one or more secondary communication links based on the association. In some other instances, the ML association or probe request may include a multi-link attribute element carrying capability information of one or more secondary STAs of the STA MLD.

In some implementations, the frame may also include an identifier (ID) field carrying a first identifier that uniquely identifies one or both of the AP MLD with which the first AP is associated or a respective secondary AP of the one or more secondary APs that is affiliated with the first AP MLD. In some instances, the frame may also include one or more second ID fields, each field of the one or more second ID fields carrying a corresponding second identifier that uniquely identifies one or both of a second AP MLD of one or more second AP MLDs with which a respective virtual AP of the one or more virtual APs is affiliated, or a secondary AP of the one or more secondary APs that is affiliated with the second AP MLD. In some implementations, the first identifier may include one or more of a first link identifier that identifies the secondary AP affiliated with the first AP MLD, or a first MLD identifier that identifies the first AP MLD. Each identifier of the one or more second identifiers may include one or more of a second link identifier that identifies the secondary AP that is affiliated with the second AP MLD, or a second MLD identifier that identifies the second AP MLD.

In some implementations, each secondary AP of the one or more secondary APs may belong to a respective secondary multiple BSSID set of one or more secondary multiple BSSID sets. In some other implementations, the first AP may be associated with a transmitted BSSID (Tx BSSID), and each virtual AP of the one or more virtual APs may be associated with a corresponding non-transmitted BSSID (non-Tx BSSID) of one or more non-Tx BSSIDs. In some instances, the first element may include a multiple BSSID element including one or more non-Tx BSSID profiles, each profile of the one or more non-Tx BSSID profiles including an ID field carrying an identifier that uniquely identifies one or both of a respective AP of the first AP and the one or more virtual APs or a respective AP MLD of the first AP MLD and one or more second AP MLDs.

In some implementations, the second element may include a multi-link attribute element including one or more per-link profile subelements, each per-link profile subelement of the one or more per-link profile subelements carrying the discovery information for a corresponding secondary AP of the one or more secondary APs of the first AP MLD and carrying an ID field carrying an identifier that uniquely identifies a corresponding secondary communication link of the one or more secondary communication links. In some instances, each per-link profile subelement may carry operating parameters of the corresponding secondary AP of the first AP MLD, the operating parameters indicating at least one of a high-throughput (HT) operation, very high-throughput (VHT) operation, high efficiency (HE) operation, extremely high-throughput (EHT) operation, enhanced distributed channel access (EDCA) parameters, multi-user (MU) EDCA parameters, uplink (UL) orthogonal frequency division multiple access (OFDMA) random access (UORA) parameters, target wait time (TWT) parameters, fast initial link setup (FILS) parameters, or spatial reuse (SR) parameters. In some other instances, each per-link profile subelement may carry capability information of the corresponding secondary AP of the first AP MLD, the capability information indicating at least one of HT capabilities, VHT capabilities, HE capabilities, HE 6 GHz Band Capabilities, or EHT capabilities.

In some other instances, the multi-link attribute element may also indicate operating parameters of a respective AP and one or more corresponding virtual APs included in the respective AP, the respective AP and the one or more corresponding virtual APs belonging to a corresponding secondary multiple BSSID set of the one or more secondary multiple BSSID sets.

In some implementations, the frame may also include a reduced neighbor report (RNR) element carrying one or more neighbor AP information fields, each field of the one or more neighbor AP information fields carrying the unique link ID of a corresponding secondary AP of the one or more secondary APs of the first AP MLD. In some instances, the frame may further include an MLD common element or field carrying common attributes shared by each secondary AP of the one or more secondary APs of the AP MLD, and the RNR element may also include a control field indicating a presence or absence of one or more of the common attributes in the MLD common element or field.

Another innovative aspect of the subject matter described in this disclosure can be implemented in a wireless communication device. In some implementations, the wireless communication device may be wireless station (STA) multi-link device (MLD) that includes at least one modem, at least one processor communicatively coupled with the at least one modem, and at least one memory communicatively coupled with the at least one processor. The at least one modem stores instructions that, when executed by the at least one processor in conjunction with the at least one modem, causes the STA MLD to perform operations to associate with an AP MLD that includes a first AP and one or more secondary APs. The AP MLD may include a first AP and one or more secondary APs. The first AP may be associated with a first communication link of the AP MLD, and each of the one or more secondary APs may be associated with a respective secondary communication link of the one or more secondary communication links of the AP MLD. The first AP may also include one or more virtual APs, and the first AP and the one or more virtual APs of the first AP may belong to a first multiple basic service set identifier (BSSID) set associated with the first communication link. The operations may include receiving, from the first AP MLD on a first communication link of the first AP MLD, a frame including a first element carrying discovery information for the first AP and the one or more virtual APs belonging to the first multiple BSSID set, and including a second element carrying discovery information for the one or more secondary APs of the first AP MLD associated with the one or more respective secondary communication links of the first AP MLD.

In some implementations, the operations may also include transmitting, by a first STA of the STA MLD, a multi-link (ML) association request to the first AP MLD on the first communication link, and receiving association information for the first AP and the one or more secondary APs of the first AP MLD based on the ML association request. In some instances, the operations may also include associating the STA MLD with the first AP MLD based at least in part on the association information and communicating with the first AP MLD on one or more of the first communication link or the one or more secondary communication links based on the association. In some other instances, the ML association or probe request may include a multi-link attribute element carrying capability information of one or more secondary STAs of the STA MLD.

In some implementations, the frame may also include an identifier (ID) field carrying a first identifier that uniquely identifies one or both of the AP MLD with which the first AP is associated or a respective secondary AP of the one or more secondary APs that is affiliated with the first AP MLD. In some instances, the frame may also include one or more second ID fields, each field of the one or more second ID fields carrying a corresponding second identifier that uniquely identifies one or both of a second AP MLD of one or more second AP MLDs with which a respective virtual AP of the one or more virtual APs is affiliated, or a secondary AP of the one or more secondary APs that is affiliated with the second AP MLD. In some implementations, the first identifier may include one or more of a first link identifier that identifies the secondary AP affiliated with the first AP MLD, or a first MLD identifier that identifies the first AP MLD. Each identifier of the one or more second identifiers may include one or more of a second link identifier that identifies the secondary AP that is affiliated with the second AP MLD, or a second MLD identifier that identifies the second AP MLD.

In some implementations, each secondary AP of the one or more secondary APs may belong to a respective secondary multiple BSSID set of one or more secondary multiple BSSID sets. In some other implementations, the first AP may be associated with a transmitted BSSID (Tx BSSID), and each virtual AP of the one or more virtual APs may be associated with a corresponding non-transmitted BSSID (non-Tx BSSID) of one or more non-Tx BSSIDs. In some instances, the first element may include a multiple BSSID element including one or more non-Tx BSSID profiles, each profile of the one or more non-Tx BSSID profiles including an ID field carrying an identifier that uniquely identifies one or both of a respective AP of the first AP and the one or more virtual APs or a respective AP MLD of the first AP MLD and one or more second AP MLDs.

In some implementations, the second element may include a multi-link attribute element including one or more per-link profile subelements, each per-link profile subelement of the one or more per-link profile subelements carrying the discovery information for a corresponding secondary AP of the one or more secondary APs of the first AP MLD and carrying an ID field carrying an identifier that uniquely identifies a corresponding secondary communication link of the one or more secondary communication links. In some instances, each per-link profile subelement may carry operating parameters of the corresponding secondary AP of the first AP MLD, the operating parameters indicating at least one of a high-throughput (HT) operation, very high-throughput (VHT) operation, high efficiency (HE) operation, extremely high-throughput (EHT) operation, enhanced distributed channel access (EDCA) parameters, multi-user (MU) EDCA parameters, uplink (UL) orthogonal frequency division multiple access (OFDMA) random access (UORA) parameters, target wait time (TWT) parameters, fast initial link setup (FILS) parameters, or spatial reuse (SR) parameters. In some other instances, each per-link profile subelement may carry capability information of the corresponding secondary AP of the first AP MLD, the capability information indicating at least one of HT capabilities, VHT capabilities, HE capabilities, HE 6 GHz Band Capabilities, or EHT capabilities.

In some other instances, the multi-link attribute element may also indicate operating parameters of a respective AP and one or more corresponding virtual APs included in the respective AP, the respective AP and the one or more corresponding virtual APs belonging to a corresponding secondary multiple BSSID set of the one or more secondary multiple BSSID sets.

In some implementations, the frame may also include a reduced neighbor report (RNR) element carrying one or more neighbor AP information fields, each field of the one or more neighbor AP information fields carrying the unique link ID of a corresponding secondary AP of the one or more secondary APs of the first AP MLD. In some instances, the frame may further include an MLD common element or field carrying common attributes shared by each secondary AP of the one or more secondary APs of the AP MLD, and the RNR element may also include a control field indicating a presence or absence of one or more of the common attributes in the MLD common element or field.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 7B shows a flowchart illustrating an example process for wireless communication according to some implementations.

FIG. 24 shows another example multiple link attribute element usable for communications between wireless communication devices.

FIG. 25 shows another example frame usable for communications between wireless communication devices.

Like reference numbers and designations in the various drawings indicate like elements.

DETAILED DESCRIPTION

Figure 1:
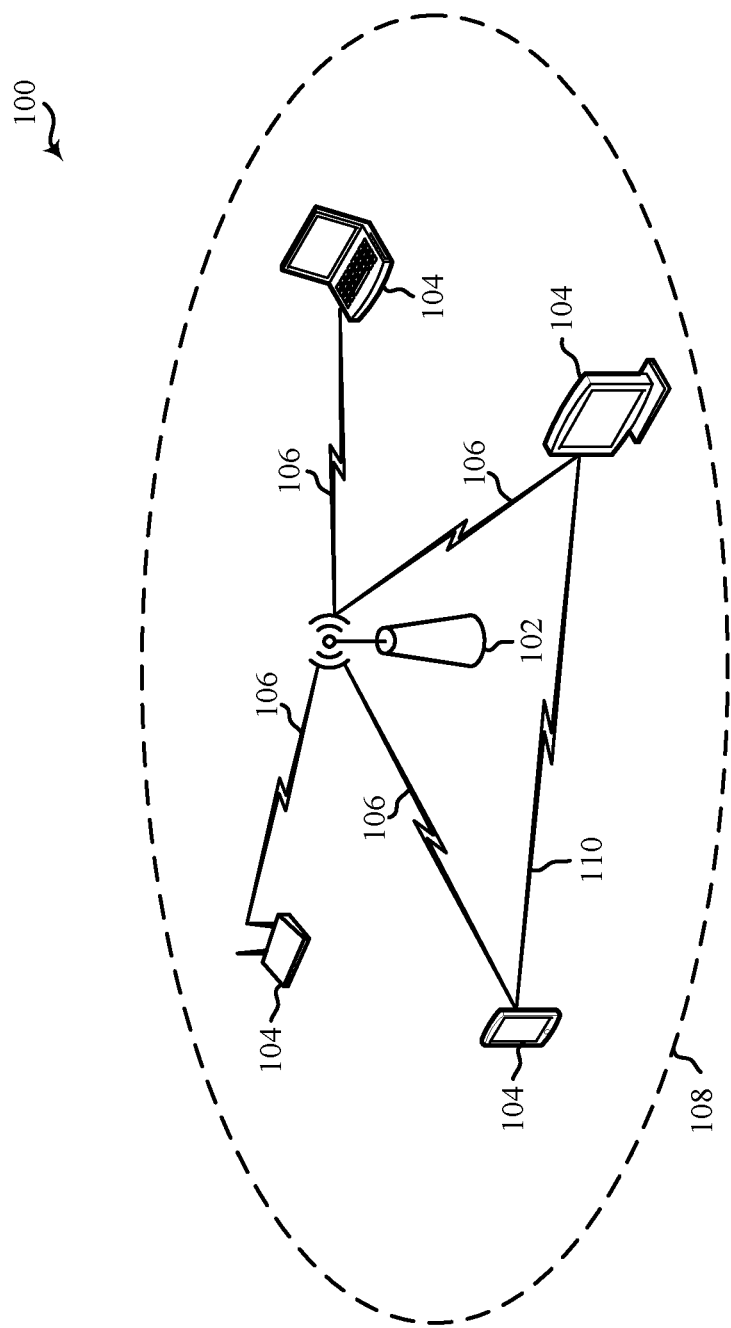
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to multi-link (ML) communications, and specifically to establishing an ML communication session between wireless communication devices. Aspects of the present disclosure provide a single ML association context for a plurality of communication links shared between multiple devices that form a multi-link device (MLD). Each MLD may have a unique medium access control (MAC) address, which is also referred to as a MAC service access point (MAC-SAP) endpoint. One example of an MLD device is an AP MLD, which includes multiple APs each capable of communicating on multiple communication links and establishing a BSS on the multiple communication links. Another example of an MLD device is a STA MLD device, which includes multiple STAs capable of communicating with other devices (such as an AP MLD device) on multiple communication links. The STA MLD device may have one medium access control physical layer (MAC-PHY) instance for each of the multiple communication links, and the MAC address of each MAC-PHY instance may be the same or different. Under certain conditions, such as if congestion on a first communication link is above a certain level, the MLD devices may switch from communicating on the first communication link to communicating on a second communication link. By providing a single ML association context that can be shared between the MAC-SAP endpoints of the MLD devices, aspects of the present disclosure allow the MLD devices to dynamically switch their communications between different communication links or groups of communication links without disassociating or re-associating with one another. In some implementations, associating with one another on one communication link allows the MLD devices to use the same association configuration, encryption keys, and other ML communication parameters when communicating on one or more of the other communication links associated with the MLDs.

Some implementations more specifically relate to a first wireless communication device (for example, an AP MLD device) transmitting a first packet on a first communication link (also referred to as a "first communication link"). The first packet includes discovery information for at least the first communication link and a second communication link (also referred to as a "secondary communication link"). A second wireless communication device (for example, a STA MLD device) transmits an MLA request to the AP MLD device on the first communication link based at least in part on the discovery information. In some implementations, the AP MLD then transmits a second packet on the first communication link. The second packet includes association information for at least the first communication link and the second communication link. In some implementations, the AP MLD associates with the STA MLD based at least in part on the association information. In some implementations, the associating includes establishing at least one ML communication parameter for communicating with the STA MLD on the first and the second communication links. The at least one ML communication parameter may be the same for each of the first and the second communication links.

In some other implementations, the associating includes establishing a common security context between a first MAC-SAP endpoint of the STA MLD and a second MAC-SAP endpoint of the AP MLD. Each of the first and second MAC-SAP endpoints may be used to communicate over both the first and second communication links. The STA MLD and the AP MLD may communicate on the second communication link based on the association on the first communication link without disassociating or re-associating. Some other implementations relate to the AP MLD establishing a common block acknowledgement (BA) session with the STA MLD for at least one traffic identifier (TID).

Particular implementations of the subject matter described in this disclosure can be implemented to realize one or more of the following potential advantages. By using a first communication link to exchange discovery information and one or more of capability information or operating parameter information for other communication links, wireless communication devices that implement various aspects of the present disclosure may allow the wireless communication devices to associate with one another by exchanging communications on a single communication link. The exchanged ML information may also allow the wireless communication devices to quickly switch communications between different communication links, and to dynamically change mappings between TID values and a plurality of communication links. Specifically, a STA MLD may receive, from an AP MLD, a single packet including ML information for all of the links that the MLDs are operating on. Thus, aspects of the present disclosure enable the STA MLD to discover the AP MLD on any link that the AP MLD device has setup a BSS. Additionally, aspects of the present disclosure may allow an AP MLD device and a STA MLD to establish a common BA session with one another for MAC service data units (MSDUs) corresponding to one or more TIDs, and to affiliate (or "map") each of the one or more TIDs with a corresponding group of communication links. The common BA session established between the AP MLD and the STA MLD, in conjunction with mappings between each TID and a corresponding group of communication links, may allow the AP MLD and the STA MLD MLDs to remap each TID of the one or more TIDs to another group of communication links without tearing-down the common BA session or establishing a new BA session.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on discovery information obtained through the passive or active scans, and to perform authentication and association operations to establish a communication link 108 with the selected AP 102. After authentication, the AP 102 may assign an association identifier (AID) to each associated STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
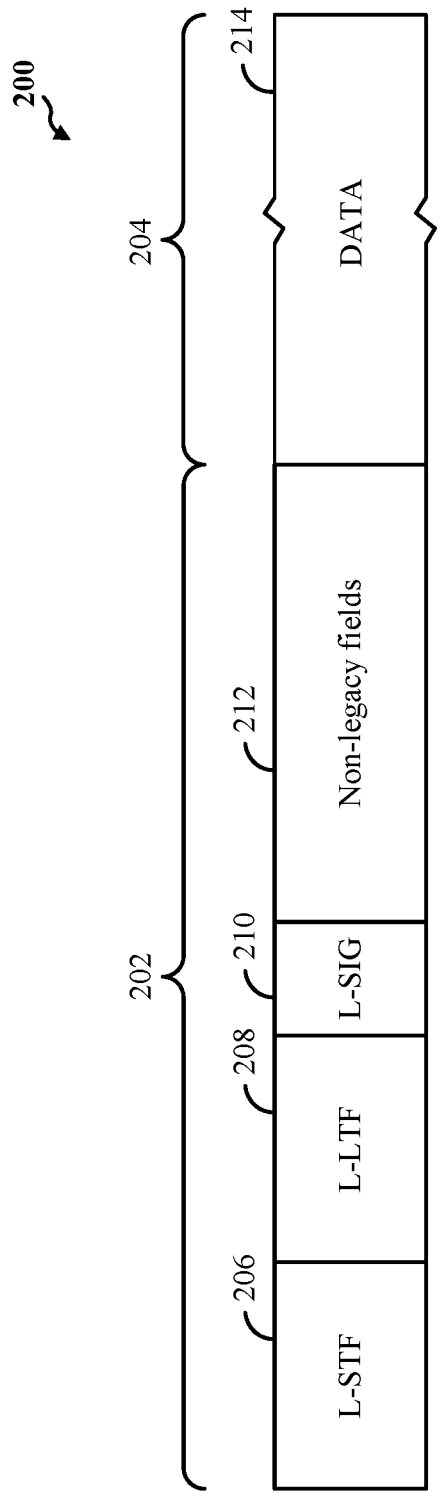
FIG. 2A shows an example protocol data unit (PDU) usable for communications between an access point (AP) and a number of stations (STAs)

FIG. 2A shows an example protocol data unit (PDU) 200 usable for communications between an AP and a number of STAs. For example, the PDU 200 can be configured as a PPDU. As shown, the PDU 200 includes a PHY preamble 202 and a PHY payload 204. For example, the PHY preamble 202 may include a legacy portion that itself includes a legacy short training field (L-STF) 206, a legacy long training field (L-LTF) 208, and a legacy signaling field (L-SIG) 210. The PHY preamble 202 may also include a non-legacy portion (not shown). The L-STF 206 generally enables a receiving device to perform automatic gain control (AGC) and coarse timing and frequency estimation. The L-LTF 208 generally enables a receiving device to perform fine timing and frequency estimation and also to estimate the wireless channel. The L-SIG 210 generally enables a receiving device to determine a duration of the PDU and use the determined duration to avoid transmitting on top of the PDU. For example, the L-STF 206, the L-LTF 208, and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may generally carry higher layer data, for example, in the form of medium access control (MAC) protocol data units (MPDUs) or aggregated MPDUs (A-MPDUs).

Figure 2B:
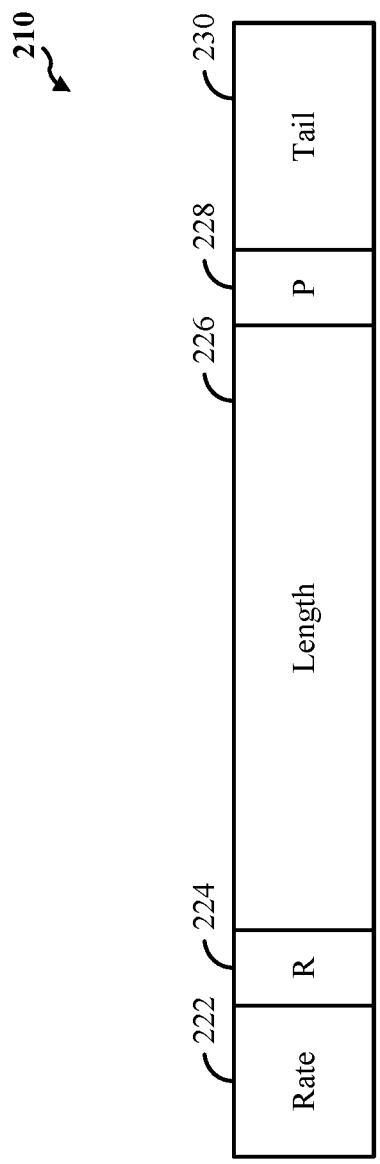
FIG. 2B shows an example field in the PDU of FIG. 2A.
Figure 3A:
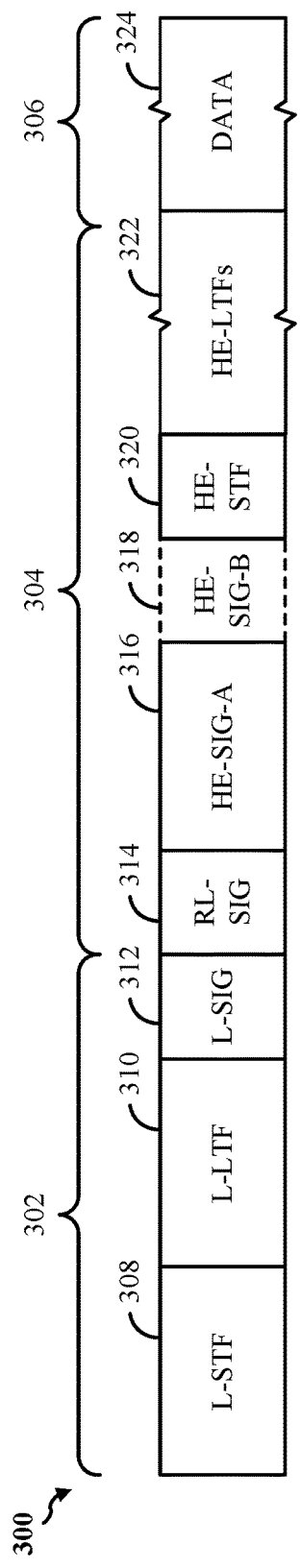
FIG. 3A shows another example PDU usable for communications between an AP and one or more STAs.

FIG. 2B shows an example L-SIG field 210 in the PDU of FIG. 2A. The L-SIG 210 includes a data rate field 212, a reserved bit 214, a length field 216, a parity bit 218, and a tail field 220. The data rate field 212 indicates a data rate (note that the data rate indicated in the data rate field 212 may not be the actual data rate of the data carried in the payload 204). The length field 216 indicates a length of the packet in units of, for example, bytes. The parity bit 218 is used to detect bit errors. The tail field 220 includes tail bits that are used by the receiving device to terminate operation of a decoder (for example, a Viterbi decoder). The receiving device utilizes the data rate and the length indicated in the data rate field 212 and the length field 216 to determine a duration of the packet in units of, for example, microseconds (µs). FIG. 3A shows another example PDU 300 usable for wireless communication between an AP and one or more STAs. The PDU 300 may be used for SU, OFDMA or MU-MIMO transmissions. The PDU 300 may be formatted as a High Efficiency (HE) WLAN PPDU in accordance with the IEEE 802.11ax amendment to the IEEE 802.11 wireless communication protocol standard. The PDU 300 includes a PHY preamble including a legacy portion 302 and a non-legacy portion 304. The PDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
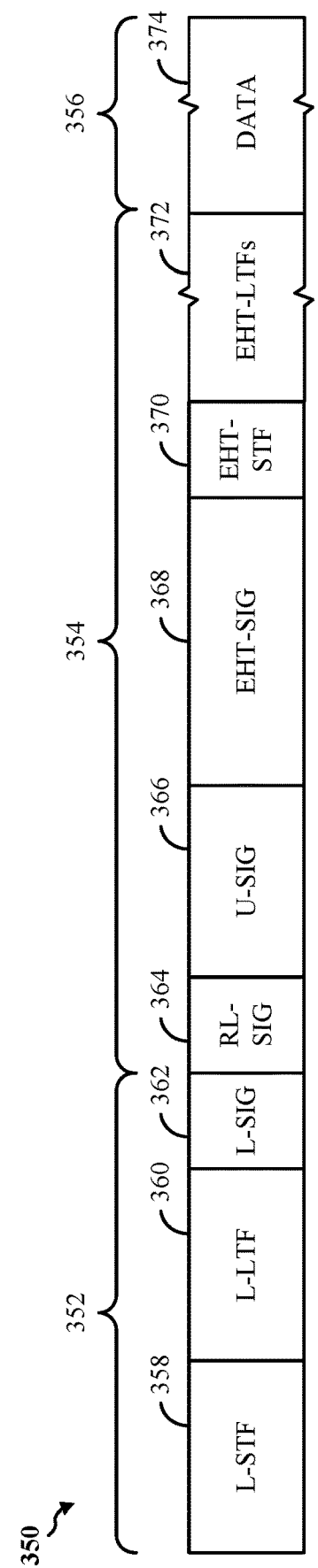
FIG. 3B shows another example PDU usable for communications between an AP and one or more STAs.

FIG. 3B shows another example PPDU 350 usable for wireless communication between an AP and one or more STAs. The PDU 350 may be used for SU, OFDMA or MU-MIMO transmissions. The PDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PDU 350 includes a PHY preamble including a legacy portion 352 and a non-legacy portion 354. The PDU 350 may further include a PHY payload 356 after the preamble, for example, in the form of a PSDU including a data field 376.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 372 (referred to herein as "EHT-STF 372," although it may be structured as, and carry version-dependent information for, other wireless communication protocol versions beyond EHT) and one or more additional long training fields 374 (referred to herein as "EHT-LTFs 374," although they may be structured as, and carry version-dependent information for, other wireless communication protocol versions beyond EHT) Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 376. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 376. In the context of DL MU-OFDMA, such information enables the respective STAs 104 to identify and decode corresponding RUs in the associated data field 376. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 376.

Figure 4:
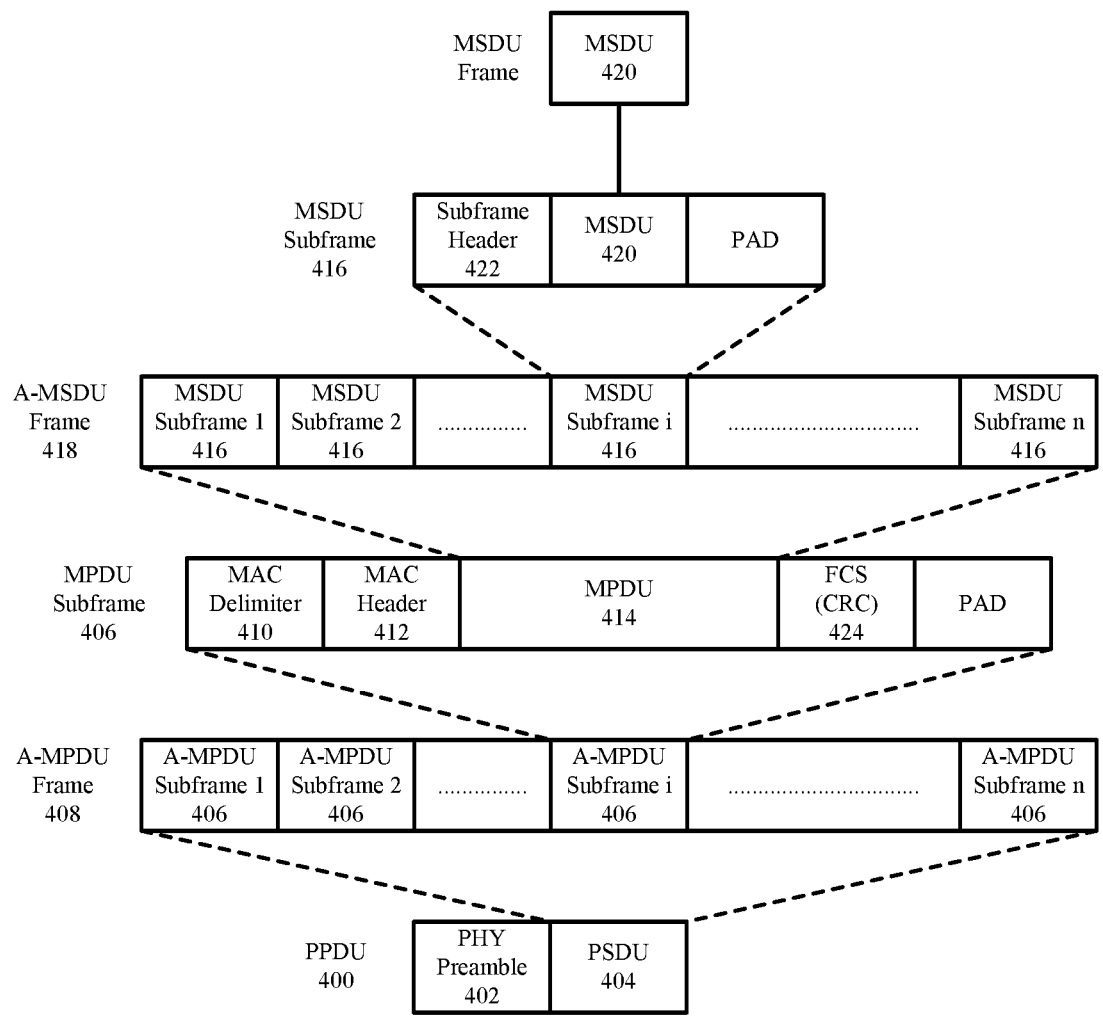
FIG. 4 shows an example physical layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs). For example, each PSDU 404 may carry an aggregated MPDU (A-MPDU) 408 that includes an aggregation of multiple A-MPDU subframes 406. Each A-MPDU subframe 406 may include a MAC delimiter 410 and a MAC header 412 prior to the accompanying MPDU 414, which comprises the data portion ("payload" or "frame body") of the A-MPDU subframe 406. The MPDU 414 may carry one or more MAC service data unit (MSDU) subframes 416. For example, the MPDU 414 may carry an aggregated MSDU (A-MSDU) 418 including multiple MSDU subframes 416. Each MSDU subframe 416 contains a corresponding MSDU 420 preceded by a subframe header 422.

Referring back to the A-MPDU subframe 406, the MAC header 412 may include a number of fields containing information that defines or indicates characteristics or attributes of data encapsulated within the frame body 414. The MAC header 412 also includes a number of fields indicating addresses for the data encapsulated within the frame body 414. For example, the MAC header 412 may include a combination of a source address, a transmitter address, a receiver address, or a destination address. The MAC header 412 may include a frame control field containing control information. The frame control field specifies the frame type, for example, a data frame, a control frame, or a management frame. The MAC header 412 may further include a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 406 may also include a frame check sequence (FCS) field 424 for error detection. For example, the FCS field 424 may include a cyclic redundancy check (CRC).

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
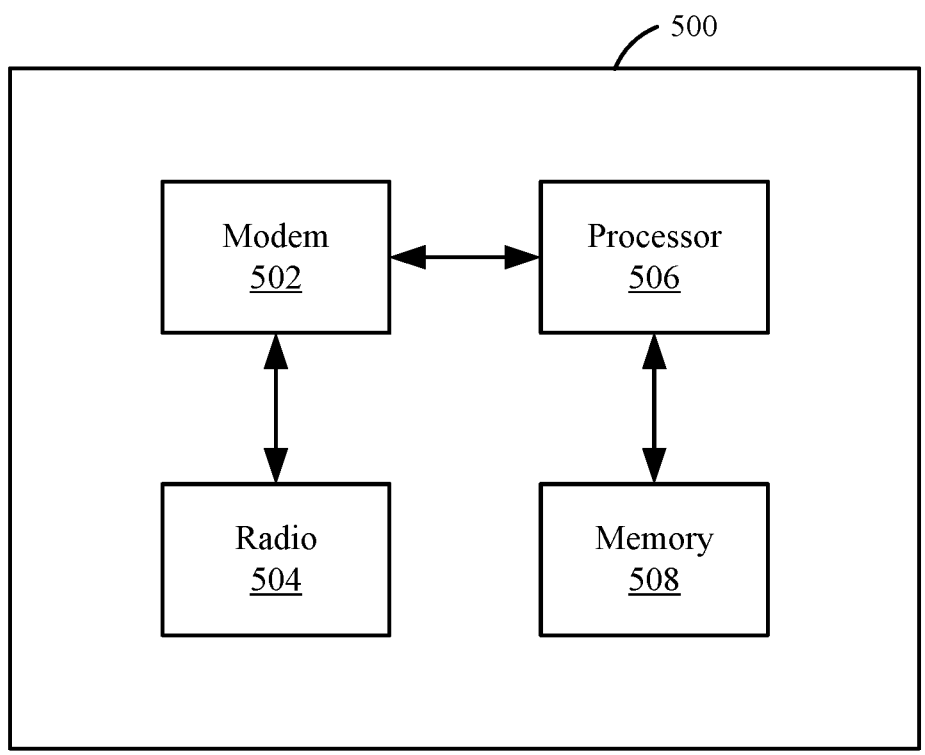
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 500 can be, or can include, a chip, system on chip (SoC), chipset, package, or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 506 further includes one or more processors, processing blocks or processing elements 506 (collectively "the processor 506"), and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer, and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation, or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 508 can include tangible storage media such as random-access memory (RAM) or read-only memory (ROM), or combinations thereof. The memory 508 also can store non-transitory processor- or computer-executable software (SW) code containing instructions that, when executed by the processor 506, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 6B:
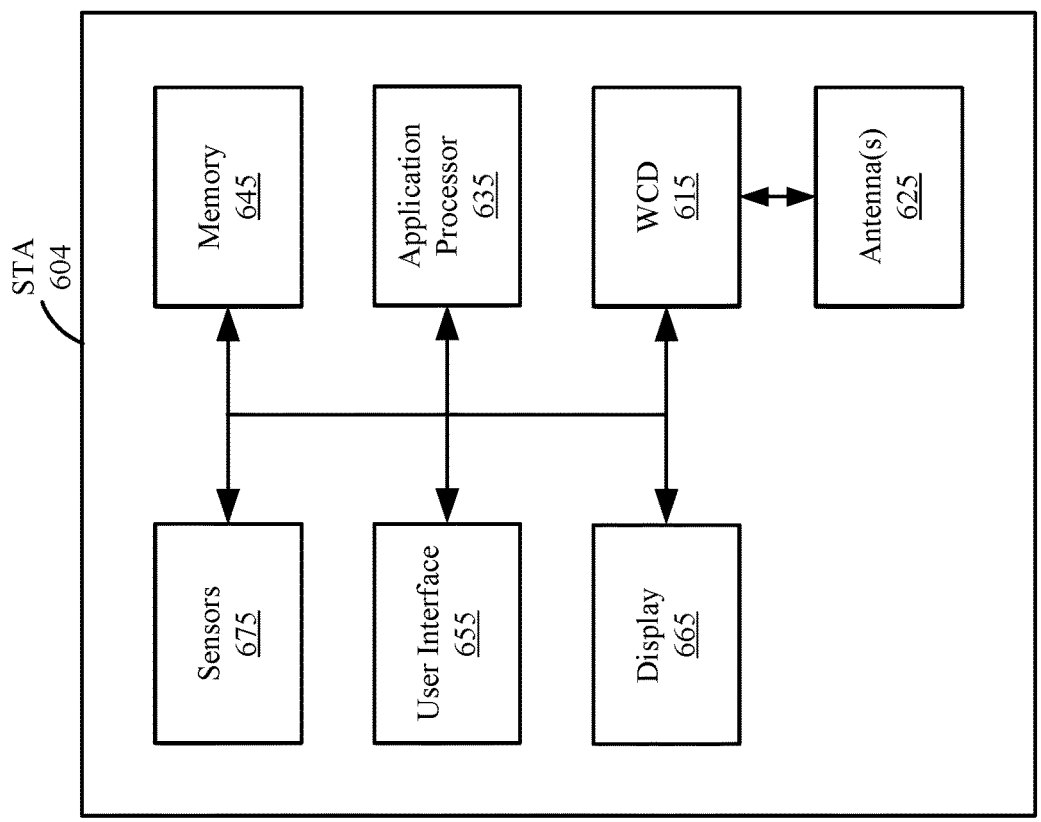
FIG. 6B shows a block diagram of an example station (STA).
Figure 6A:
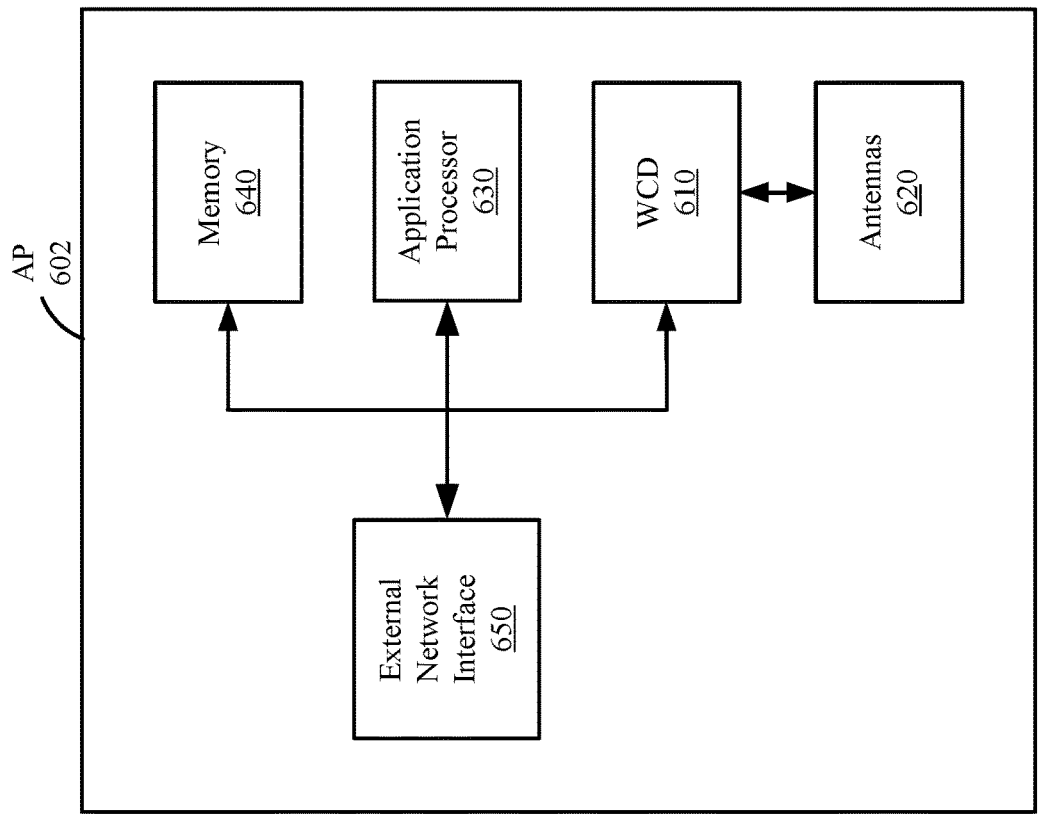
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

As described above, various implementations relate generally to ML communications, and specifically to establishing an ML communication session between wireless communication devices. Aspects of the present disclosure provide a single MLA context for a plurality of links shared between multiple MLD devices. Under certain conditions, such as if congestion on a first link is high, the MLD devices may switch from communicating on the first link to communicating on a second link. Aspects of the present disclosure provide a single MLA context that can be shared between the MAC-SAP endpoints of the MLD devices so that the MLD devices may dynamically communicate over any link shared between the MLD devices without disassociating or reassociating. Thus, in some implementations, associating on one link allows the MLD devices to use the same association configuration, encryption keys, among other ML communication parameters, for communication on any of the links.

Some implementations more specifically relate to a first wireless communication device transmitting a first packet on a first communication link. The first packet includes discovery information for at least the first communication link and a second communication link. The AP entity receives a ML Association request from the STA MLD device on the first communication link based at least in part on the discovery information. In some implementations, the AP entity then transmits a second packet on the first communication link. The second packet includes association information for at least the first communication link and the second communication link. In some implementations, the AP entity associates with the STA MLD device based at least in part on the association information. In some implementations, the associating includes establishing at least one ML communication parameter for communicating with the STA MLD device on the first and the second communication links. The at least one ML communication parameter may be the same for each of the first and the second communication links.

In some other implementations, the associating includes establishing a common security context between a first MAC-SAP endpoint of the first wireless communication device and a second MAC-SAP endpoint of the second wireless communication device. Each of the first and second MAC-SAP endpoints may be used to communicate over both the first and second communication links. The AP MLD and the STA MLD may communicate with one another on the second communication link based on the association operations performed on the first communication link without disassociating re-associating. Some other implementations relate to the AP entity establishing a common BA session with the STA MLD for at least one TID.

Particular implementations of the subject matter described in this disclosure can be implemented to realize one or more of the following potential advantages. By exchanging ML information, MLDs may implement aspects of the present disclosure to provide faster discovery of links available for communication between the MLD. Further, by exchanging ML information, MLDs also may implement aspects of the present disclosure to provide relatively fast switching between links and more efficient communications over the links. For example, the MLDs may switch from communicating over a first communication link to a second communication link without disassociation or reassociation, saving time and resources. For example, a STA MLD device may receive, from an AP MLD device, a single packet including ML information for all of the links that the MLDs are operating on. Thus, aspects of the present disclosure enable the STA MLD to discover the AP MLD on any link that the AP MLD device has setup a BSS.

Additionally, aspects of the present disclosure may allow an AP MLD device and a STA MLD to establish a common BA session with one another for MAC service data units (MSDUs) corresponding to one or more TIDs, and to affiliate (or "map") each of the one or more TIDs with a corresponding group of communication links. The common BA session established between the AP MLD and the STA MLD, in conjunction with mappings between each TID and a corresponding group of communication links, may allow the AP MLD and the STA MLD MLDs to remap each TID of the one or more TIDs to another group of communication links without tearing-down the common BA session or establishing a new BA session.

Figure 7A:
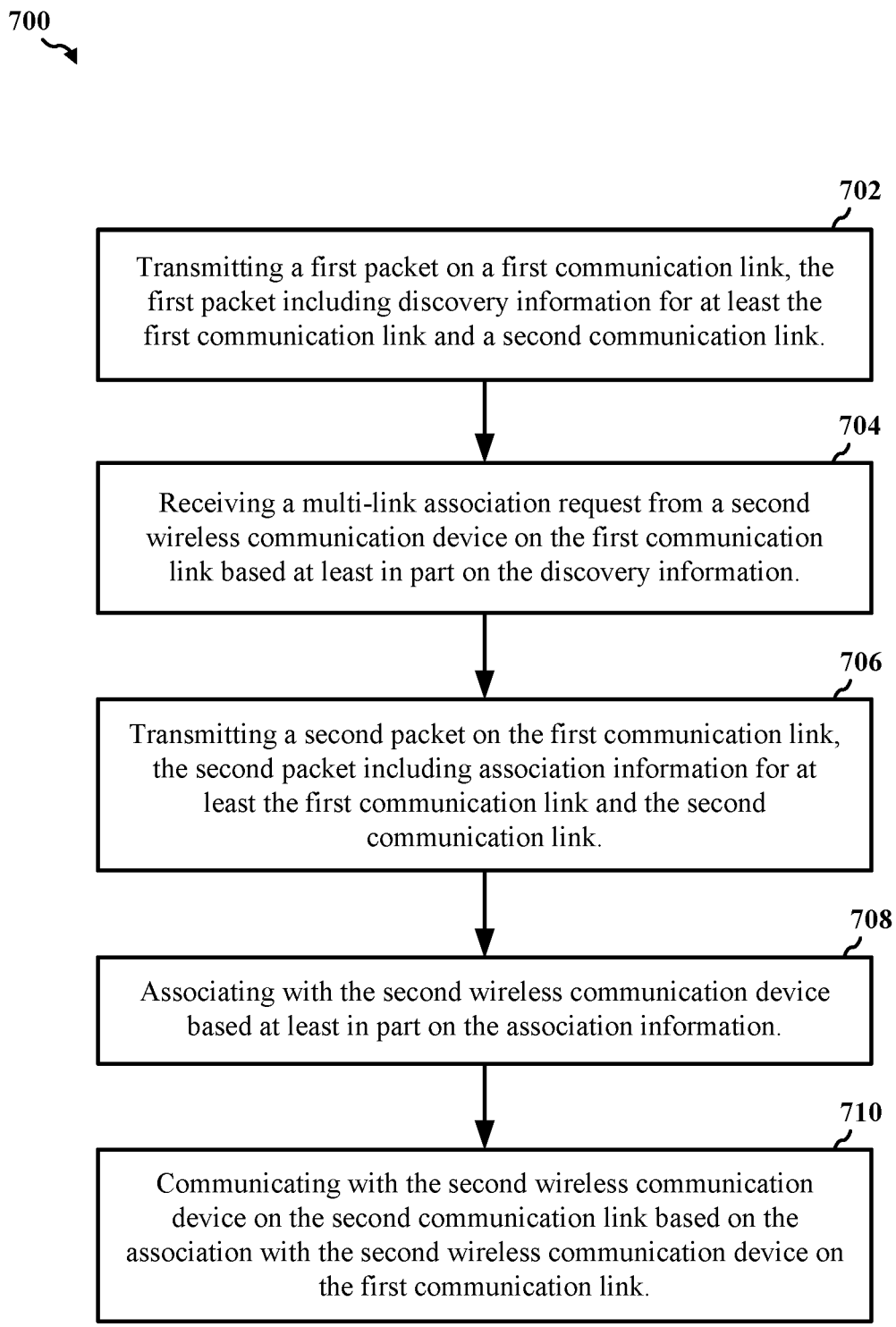
FIG. 7A shows a flowchart illustrating an example process for wireless communication according to some implementations.

FIG. 7A shows a flowchart illustrating an example process 700 for wireless communication according to some implementations. The process 700 may be performed by a first wireless communication device such as the wireless communication device 500 described above with reference to FIG. 5. In some implementations, the process 700 may be performed by a wireless communication device operating as or within a STA, such as one of the STAs 104 and 604 described above with reference to FIGS. 1 and 6B, respectively. In other implementations, the process 700 may be performed by a wireless communication device operating as or within an AP, such as one of the APs 102 and 602 described above with reference to FIGS. 1 and 6A, respectively.

At block 702, the AP transmits a first packet on a first communication link, the first packet including discovery information for at least the first communication link and a second communication link. At block 704, the AP receives a ML association request from a second wireless communication device on the first communication link based at least in part on the discovery information. At block 706, the AP transmits a second packet on the first communication link, the second packet including association information for at least the first communication link and the second communication link.

At block 708, the AP associates with the second wireless communication device based at least in part on the association information. In some implementations, the associating includes establishing at least one ML communication parameter for communicating with the second wireless communication device on the first and the second communication links. The at least one ML communication parameter may be the same for each of the first and the second communication links. In some other implementations, the associating includes establishing a common security context between a first medium access control service access point (MAC-SAP) endpoint of the first wireless communication device and a second MAC-SAP endpoint of the second wireless communication device. Each of the first and second MAC-SAP endpoints may be used to communicate over both the first and second communication links. In block 710, the process 700 proceeds with communicating with the second wireless communication device on the second communication link based on the association with the second wireless communication device on the first communication link.

FIG. 7B shows a flowchart illustrating an example process 720 for wireless communication according to some implementations. The process 720 may be performed by a wireless communication device such as the wireless communication device 500 described above with reference to FIG. 5. In some implementations, the process 720 may be performed by a wireless communication device operating as or within a STA, such as one of the STAs 104 and 604 described above with reference to FIGS. 1 and 6B, respectively. In other implementations, the process 720 may be performed by a wireless communication device operating as or within an AP, such as one of the APs 102 and 602 described above with reference to FIGS. 1 and 6A, respectively.

With reference to FIG. 7A, the process 720 may be a more detailed implementation of the ML communication operation described in block 710 of the process 700. For example, at block 722, the AP establishes a block acknowledgement (BA) session with the second wireless communication device that affiliates at least one traffic identifier (TID) to a first subset of the first communication link, the second communication link, and a third communication link. The BA session may be common for each of the first, the second, and the third communication links. At block 724, the AP dynamically reaffiliates the at least one TID to a second subset of the first communication link, the second communication link, and a third communication link. At block 726, the AP indicates the reaffiliation in an add Block Acknowledgment (ADDBA) Capabilities field of a third packet.

Figure 8A:
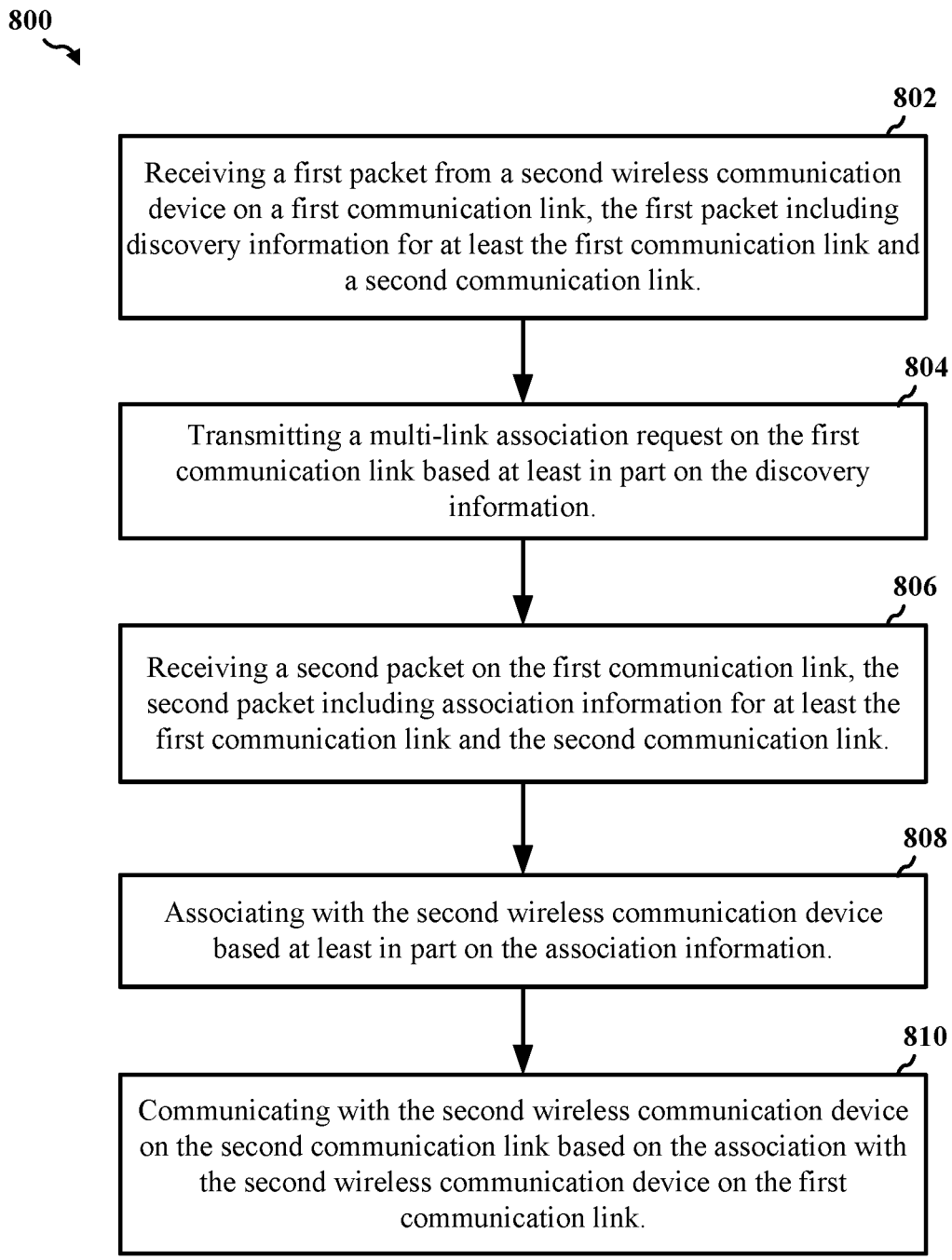
FIG. 8A shows a flowchart illustrating an example process for wireless communication according to some other implementations.

FIG. 8A shows a flowchart illustrating an example process 800 for wireless communication according to some implementations. The process 800 may be performed by a first wireless communication device such as the wireless communication device 500 described above with reference to FIG. 5. In some implementations, the process 800 may be performed by a wireless communication device operating as or within a STA, such as one of the STAs 104 and 604 described above with reference to FIGS. 1 and 6B, respectively. In other implementations, the process 800 may be performed by a wireless communication device operating as or within an AP, such as one of the APs 102 and 602 described above with reference to FIGS. 1 and 6A, respectively.

At block 802, the first wireless communication device receives a first packet from a second wireless communication device on a first communication link, the first packet including discovery information for at least the first communication link and a second communication link. At block 804, the AP transmits an ML association request on the first communication link based at least in part on the discovery information. At block 806, the AP receives a second packet on the first communication link, the second packet including association information for at least the first communication link and the second communication link. At block 808, the AP associates with the second wireless communication device based at least in part on the association information. At block 810, the AP first wireless communication device communicates with the second wireless communication device on the second communication link based on the association with the second wireless communication device on the first communication link.

In some implementations, the first A-MPDU subframe may be aligned with codeword boundaries in the PSDU such that portions of the first A-MPDU subframe are not encapsulated within the same LDPC codeword as portions of another A-MPDU subframe in the PSDU.

In some implementations, the associating includes establishing at least one ML communication parameter for communicating with the second wireless communication device on the first and the second communication links. The at least one ML communication parameter may be the same for each of the first and the second communication links. In some other implementations, the associating includes establishing a common security context between a first medium access control service access point (MAC-SAP) endpoint of the first wireless communication device and a second MAC-SAP endpoint of the second wireless communication device. Each of the first and second MAC-SAP endpoints may be used to communicate over the first and second communication links.

Figure 8B:
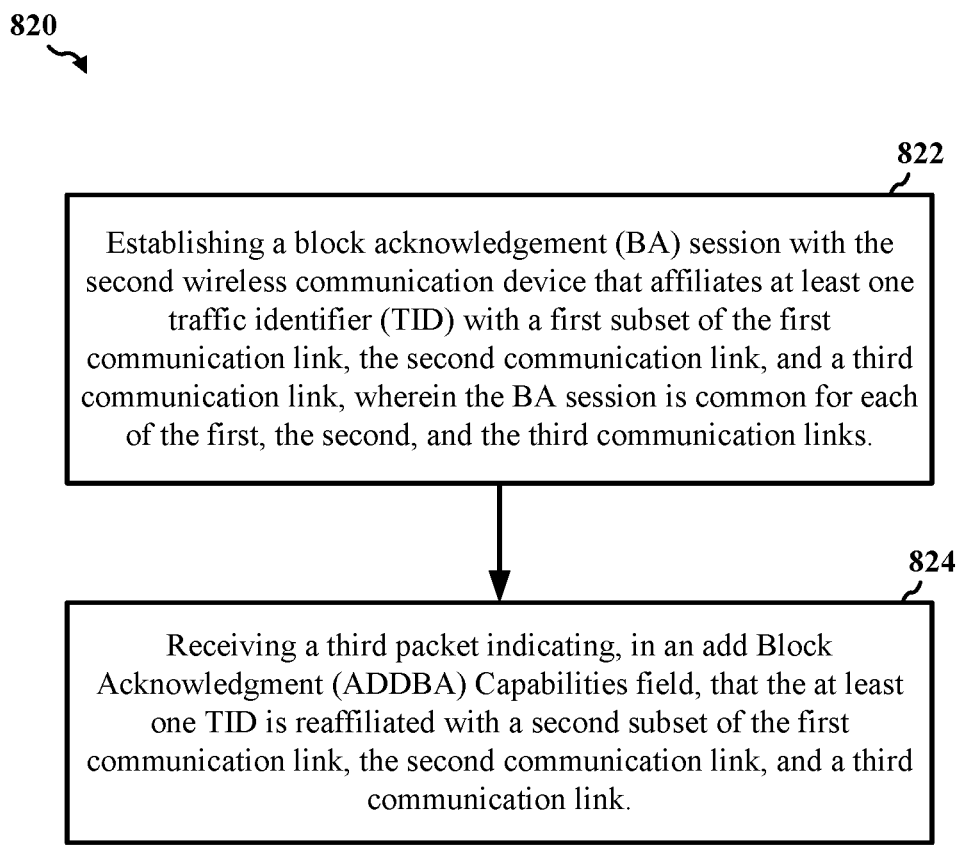
FIG. 8B shows a flowchart illustrating an example process for wireless communication according to some other implementations.

FIG. 8B shows a flowchart illustrating an example process 820 for wireless communication according to some implementations. The process 820 may be performed by a wireless communication device such as the wireless communication device 500 described above with reference to FIG. 5. In some implementations, the process 820 may be performed by a wireless communication device operating as or within a STA, such as one of the STAs 104 and 604 described above with reference to FIGS. 1 and 6B, respectively. In other implementations, the process 820 may be performed by a wireless communication device operating as or within an AP, such as one of the APs 102 and 602 described above with reference to FIGS. 1 and 6A, respectively.

With reference to FIG. 8A, the process 820 may be a more detailed implementation of the ML communication operation described in block 810 of the process 800. For example, at block 822, the first wireless communication device establishes a block acknowledgement (BA) session with the second wireless communication device that affiliates at least one traffic identifier (TID) with a first subset of the first communication link, the second communication link, and a third communication link. At block 824, the first wireless communication device receives a third packet indicating, in an add Block Acknowledgment (ADDBA) Capabilities field, that the at least one TID is reaffiliated with a second subset of the first communication link, the second communication link, and a third communication link. The BA session may be common for each of the first, the second, and the third communication links.

Figure 9A:
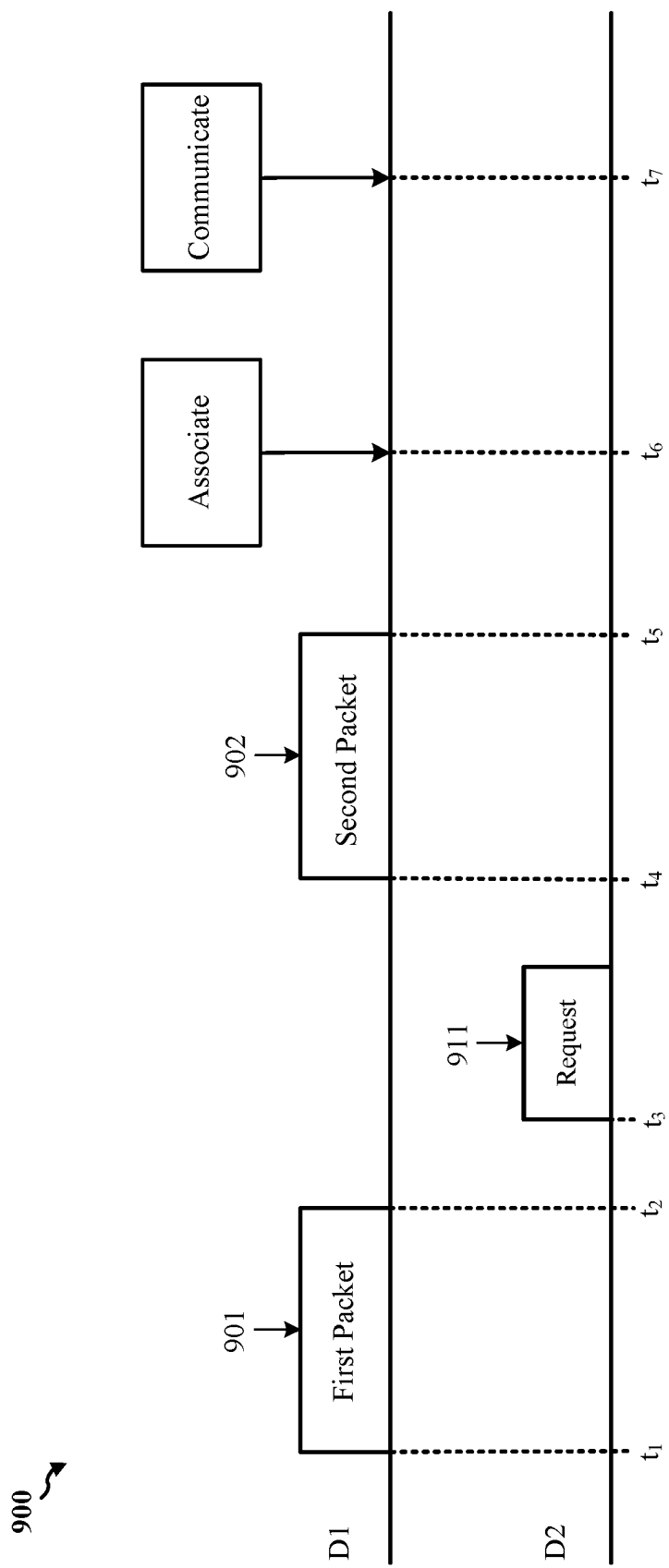
FIG. 9A shows a timing diagram depicting an example multi-link communication according to some implementations.

FIG. 9A shows a timing diagram depicting an example multi-link communication 900 according to some implementations. In the example of FIG. 9A, the ML communication may be performed between a first wireless communication device ("first device D1") and a second wireless communication device ("second device D2"). Each of the devices D1 and D2 may be any suitable wireless communication device such as one of the STAs 104 and 604 described above with reference to FIGS. 1 and 6B, respectively, or one of the APs 102 and 602 described above with reference to FIGS. 1 and 6A, respectively. In the timing diagram 900, the first device D1 may be the transmitting device, and the second device D2 may be the receiving device. Each of the first device D1 and the second device D2 may be an MLO entity. For example, the first device D1 may be an AP entity, and the second device D2 may be a STA MLD device.

At time $t_1$, the first device D1 transmits a first packet 901 on a first communication link (not shown for simplicity), the first packet 901 including ML information (such as capabilities and parameters) for at least the first communication link and a second communication link (not shown for simplicity). Although the example of FIG. 9A is described in terms of the first and the second communication links, in some implementations, there may be any number of additional communication links, such as a third, fourth, or fifth communication link. The first communication link and the second communication link may operate on different frequency bands or on different channels on the same frequency band. For example, the first communication link may operate on a 2.4 GHz frequency band, the second communication link may operate on a 5.0 GHz frequency band, and another link (not shown for simplicity) may operate on a 6.0 GHz frequency band. The first packet 901 may be a beacon frame or any other frame that may be used to communicate ML information.

In some implementations, the ML information may include one or more of: a first operating class for the first communication link; a first wireless channel for the first communication link; a first BSSID for the first communication link; a second operating class for the second communication link; a second wireless channel for the second communication link; or a second BSSID for the second communication link. In some implementations, some or all of the ML information may be included in a link attribute element of the first packet 901, as further described with respect to FIG. 9B and FIG. 10, or in a multiple link element of the first packet 901, as further described with respect to FIG. 9B, FIG. 10, and FIG. 11. In some aspects, at least one of the operating classes, the wireless channels, or the BSSIDs may be different. As one non-limiting example, a pair of AP entities having the same operating class may communicate on the same wireless channel. However, the pair of APs may be physically separate (non-collocated) and may thus have different MAC addresses (BSSIDs).

Between times $t_1$ and $t_2$, the second device D2 receives the first packet 901 from the first device D1 on the first communication link. In some implementations, the first device D1 and the second device D2 may establish at least one ML communication parameter for communicating on the first and the second communication links, as further described with respect to FIG. 9B. In short, because the first packet 901 includes ML information (such as ML capabilities, ML operating parameters and constraints, among other information) about all of the links that the first device D1 is operating on, aspects of the present disclosure enable a STA MLD device (such as the second device D2) to discover an AP entity (such as the first device D1) on any link that the AP entity has setup a BSS.

At time $t_3$, the second device D2 transmits an MLA request 911 on the first communication link based at least in part on the ML information. The MLA request 911 may be an association request frame. In some implementations, the MLA request 911 may include a preference for one or more of the first communication link or the second communication link to be designated as an anchor link, as further described with respect to FIG. 9B and FIG. 11. In some aspects, a client device (such as the second device D2) may save power by waiting (for a beacon, for example) on an anchor link while there is otherwise no active traffic.

Between times $t_3$ and $t_4$, the first device D1 receives the MLA request 911 from the second device D2 on the first communication link. In some aspects, the MLA request 911 may indicate one or more capabilities or security parameters of the second device D2.

At time $t_4$, the first device D1 transmits a second packet 902 on the first communication link, the second packet 902 including ML information for at least the first communication link and the second communication link. In some implementations, the second packet 902 may be an association response frame. In some other implementations, the second packet 902 may be some other appropriate frame. In some aspects, the second packet 902 may confirm or renegotiate one or more of the second device D2 capabilities for association over multiple links. Thus, the first device D1 and the second device D2 may establish a common security context that may apply to the multiple links. For example, the first device D1 and the second device D2 may establish a single encryption key that may apply to each of the first communication link and the second communication link.

In some implementations, the first device D1 may assign a different AID for each link. For example, in the second packet 902, the first device D1 may indicate that the AID is 25 for the first communication link and the AID is 26 for the second communication link. In some other implementations, the first device D1 may assign a common AID across all links.

Between times $t_4$ and $t_5$, the second device D2 receives the second packet 902 from the first device D1 on the first communication link. Then, at time $t_6$, the first device D1 associates with the second device D2 based at least in part on the ML information in the second packet 902. In some implementations, between times $t_6$ and $t_7$, the first device D1 and the second device D2 may establish a BA session for at least one TID. Finally, at time $t_7$, the first device D1 may communicate with the second device D2 on the first or the second communication link based on the association with the second wireless communication device on the first communication link.

By exchanging the ML information included in the first packet 901, the first device D1 and the second device D2 may implement aspects of the present disclosure to provide faster discovery of links available for communication between the first device D1 and the second device D2. Further by exchanging the ML information included in the second packet 922 or the MLA request 931, the first device D1 or the second device D2 also may implement aspects of the present disclosure to provide faster switching between links and more efficient communications over the links. For example, the first device D1 and the second device D2 may switch from communicating over the first communication link to the second communication link without disassociation or reassociation, saving time and resources. Specifically, the second device D2 may receive ML information (such as in the first packet 901) for the first communication link, the second communication link, or any links on which the first device D1 has setup a BSS. Thus, aspects of the present disclosure enable the second device D2 to discover the first device D1 on any link that the first device D1 has setup a BSS.

Figure 9B:
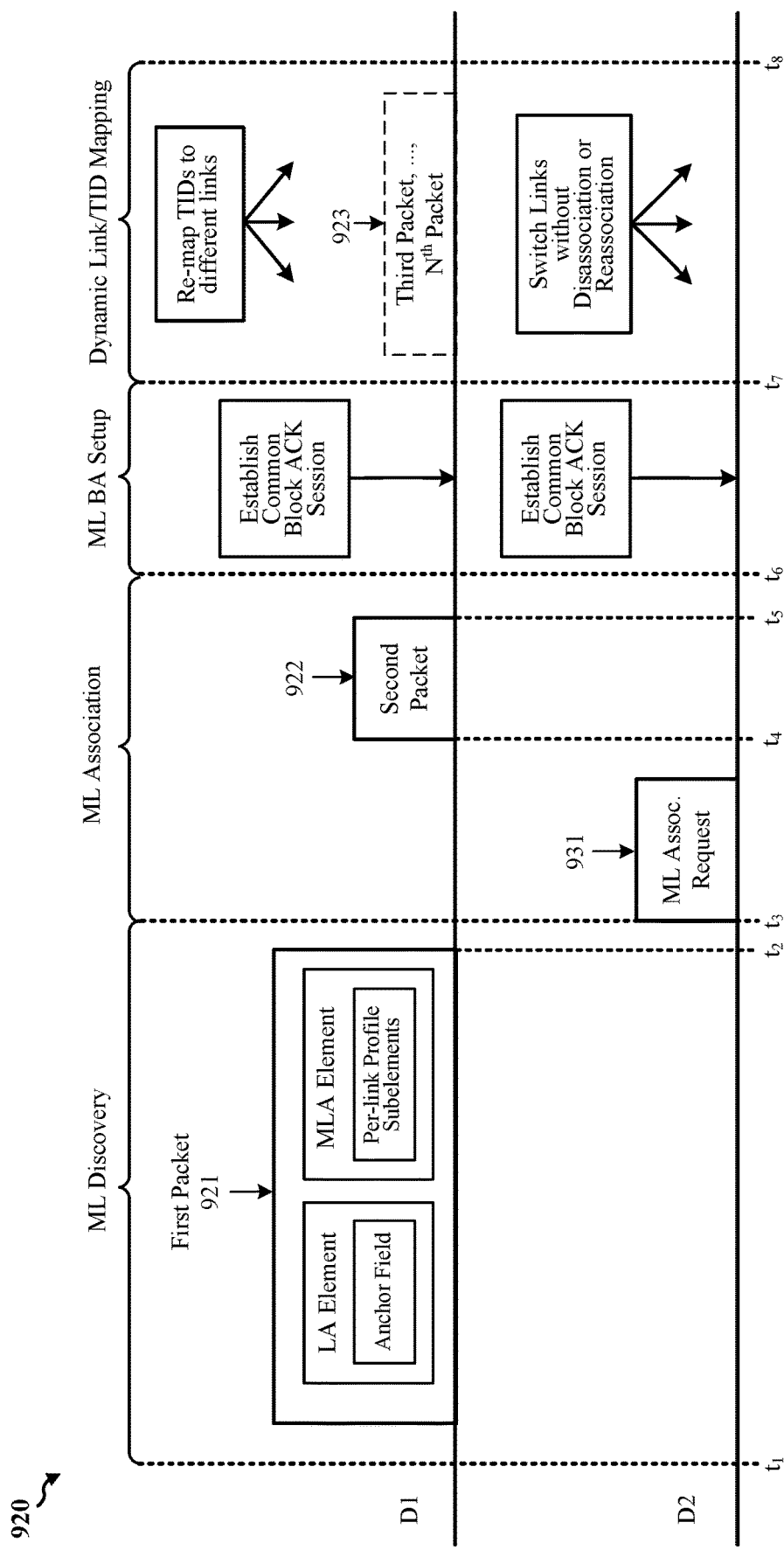
FIG. 9B shows a timing diagram depicting an example multi-link communication according to some implementations.

FIG. 9B shows a timing diagram depicting an example multi-link communication 920 according to some implementations. The multi-link communication 920 may be a more detailed example of the multi-link communication 900 of FIG. 9A. Each of the devices D1 and D2 may be or include any suitable wireless communication device such as one or more of the STAs 104 and 604 described above with reference to FIGS. 1 and 6B, respectively, or one of the APs 102 and 602 described above with reference to FIGS. 1 and 6A, respectively. In some implementations, the first device D1 may be an AP MLD, and the second device D2 may be a STA. In some instances, the AP MLD may include a first AP associated with a first communication link, and may include one or more secondary APs associated with respective one or more secondary communication links (communication links not shown for simplicity). In some other implementations, the second device D2 may be a STA MLD. In some instances, the STA MLD may include a first STA associated with the first communication link, and may include additional STAs associated with one or more of the secondary communication links of the AP MLD.

At time $t_1$, the first device D1 transmits the first packet 921 on a first communication link to the second device D2. The first packet 921 may include ML information for the first communication link and the one or more secondary communication links. In some implementations, the first packet 921 may uniquely identify each link of the first communication link and the one or more secondary communication links based on a limited set of information (tuple) such as, for example, {operating class, channel, and BSSID}, where operating class indicates an operating class for the link, channel indicates a channel for the link, and BSSID indicates a BSSID for the link. Example operating class may include a 2.4 GHz operating class, a 5.0 GHz operating class, and a 6 GHz operating class. The tuple may be carried in any suitable field (such as a 6-octet field) of the first packet 921.

The first packet 921 is shown to include a Link Attribute Element and a Multiple Link Attribute Element, which may be referred to by other suitable names in some other implementations. The Link Attribute (LA) Element may carry discovery information for the first communication link, and the Multiple Link Attribute (MLA) Element may carry discovery information for the one or more secondary communication links. The discovery information may include an operating class, a wireless channel, a BSSID, and other suitable information for a respective communication link. In some implementations, the LA Element may also carry operating parameters and capability information corresponding to the first communication link, and the MLA Element may include one or more per-link profile subelements that carry operating parameters and capability information corresponding to respective communication links of the one or more secondary communication links. In some instances, each of the per-link profile subelements may also carry the discovery information for a respective secondary communication link.

In some implementations, the capability information may indicate one or more of high-throughput (HT) capabilities, very high-throughput (VHT) capabilities, high efficiency (HE) capabilities, HE 6 GHz Band capabilities, or extremely high-throughput (EHT) capabilities, and the operating parameters may indicate one or more of HT operation parameters, VHT operation parameters, HE operation parameters, EHT operation parameters, enhanced distributed channel access (EDCA) parameters, multi-user (MU) EDCA parameters, uplink (UL) orthogonal frequency division multiple access (OFDMA) random access (UORA) parameters, target wait time (TWT) parameters, fast initial link setup (FILS) parameters, or spatial reuse (SR) parameters.

The LA Element may also include an Anchor Field that carries information indicating whether the first communication link is or least serves as an anchor link. In some instances, the Anchor Field carries an anchor bit that can be set to a first logic state to indicate that the first communication link is an anchor link, and can be set to a second logic state to indicate that the first communication link is not an anchor link.

The second device D2 receives the first packet 921 from the first device D1 on the first communication link, and may use the discovery information carried in the first packet 921 to establish one or more ML parameters for communicating with one another on the first communication link. Some example ML communication parameters may include, but are not limited to, a frequency band, high-throughput (HT) capabilities, very high-throughput (VHT) capabilities, high-efficiency (HE) capabilities, or extremely high-throughput (EHT) capabilities. In some implementations, the first device D1 and the second device D2 may also establish at least one ML communication parameter for communicating on one or more secondary communication links based on discovery information included in one or more corresponding per-link profile subelements carried in the Multiple Link Element. For example, the first device D1 and the second device D2 may establish at least one ML communication parameter for communicating on the second communication link based on discovery information carried in a first per-link profile subelement of the Multiple Link Element, and may establish at least one ML communication parameter for communicating on the third communication link based on discovery information carried in a second per-link profile subelement of the Multiple Link Element. In some aspects, at least one of the ML communication parameters may be the same for each of the first and the second communication links.

At time $t_3$, the second device D2 transmits an ML Association request 931 on the first communication link based at least in part on the ML information included in the first packet 921. In some implementations, such as when the Anchor Field of the first packet 921 has not designated an anchor link, the ML Association request 931 may indicate a preference for one of the first communication link or the secondary communication links to be designated as an anchor link. For example, the second device D2 may indicate its preference for an anchor link by setting the Anchor bit to 1 for the preferred anchor link in the ML Association request 931. In some aspects, the second device D2 may indicate more than one preferred anchor link by setting the Anchor bit to 1 for each of the preferred anchor links in the ML Association request 931.

The first device D1 receives the ML Association request 931 from the second device D2 on the first communication link, and transmits a second packet 922 to the first device D1 on the first communication link at time $t_4$. In some implementations, the second packet 922 may carry additional discovery information for the first communication link and the one or more secondary communication links. In some implementations, if the second device D2 indicated a preference for an anchor link in the ML Association request 931, the first device D1 may indicate an assigned anchor link for the second device D2 by setting the Anchor bit to the first logic state for one of the links in the second packet 922. In some aspects, even though the second device D2 may indicate a preference for a particular link to be designated as the anchor link, the first device D1 may designate one or more different links as anchor links.

The second device D2 receives the second packet 922, and may use the discovery information to perform an association operation with the second device D2 between times $t_5$ and $t_6$. In some implementations, the first device D1 and the second device D2 may associate by establishing a common security context between a first MAC-SAP endpoint of the first device D1 and a second MAC-SAP endpoint of the second device D2. In some aspects, each of the first and second MAC-SAP endpoints may be used to communicate over any one or more of the first communication link and the secondary communication links. In some aspects, the common security context may include a single encryption key shared by the first MAC-SAP endpoint and the second MAC-SAP endpoint.

Between times $t_6$ and $t_7$, the first device D1 and the second device D2 may establish a common BA session with one another for one or more TIDs. Thus, the first device D1 and the second device D2 may map MSDUs for the one or more TIDs with one or more of the first and the second communication links. By establishing the common BA session and mapping the one or more TIDs, the first device D1 and the second device D2 may implement aspects of the present disclosure to map (or remap, affiliate, or reaffiliate) the one or more TIDs to multiple links without tearing-down the common BA session or establishing a new BA session. The first device D1 and the second device D2 may then communicate on one or more of the first communication link and the secondary communication links according to their respectively mapped TIDs.

After time $t_7$, one or more link conditions (such as an amount of latency) may change, causing the first device D1 to remap one or more of the TIDs to one or more different links. As a non-limiting example, between times $t_6$ and $t_7$, the first device D1 may initially map a first TID (such as TID=4) to the first communication link so that the first device D1 and the second device D2 may exchange packets associated with TID=4 on the first communication link prior to time $t_7$. After time $t_7$, the first device D1 may remap TID=4 to the second communication link. In some implementations, the first device D1 may indicate the remapping of TID=4 to the second device D2 in a third packet 923. In some aspects, the first device D1 may indicate the remapping of TID=4 in an ADDBA Capabilities field of the third packet 923. In some implementations, the first device D1 may transmit one or more additional packets between times $t_7$ and $t_8$, as indicated by $N^{th}$ Packet.

Between times $t_7$ and $t_8$, the first device D1 may remap one or more TIDs from one communication link to another communication link. The first device D1 may indicate the remapping to the second device D2 in the third packet 923. For example, the first device D1 may remap a first TID (such as TID=4) from the first communication link to the second communication link and indicate the remapping in the third packet 923. Upon receiving the third packet 923, the second device D2 may switch from sending packets with TID=4 on the first communication link to sending packets with TID=4 on the second communication link. Since the second device D2 has already received information about each of the first and the second communication links from the first packet 921 or the second packet 922, the second device D2 may switch from communicating over the first communication link for TID=4 to communicating over the second communication link for TID=4 without disassociating from or reassociating with the first device D1, thereby saving time and resources.

As another non-limiting example, the first device D1 and the second device D2 may establish a common BA session together. In some implementations, the first device D1 may indicate that one or more of the communication links are active or enabled (available for communication) or that one or more of the communication links are not active or disabled (not available for communication). In this example, the first device D1 may indicate that each of the first and the second communication links are active and that a third communication link is inactive. For example, while establishing the common BA session, the first device D1 may set a first bit corresponding to the first communication link to 1, a second bit corresponding to the second communication link to 1, and a third bit corresponding to the third communication link to 0. Thus, the common BA session may map TID=4 to the first communication link and the second communication link and not the third communication link.

In some instances, conditions for one or more of the communication links may change. For example, interference on the second communication link may increase, and interference on the third communication link may decrease such that the third communication link offers higher throughput or lower latencies than the second communication link. Thus, in this example, the first device D1 may transmit a single signal (such as the third packet 923) to dynamically remap TID=4 to the first communication link and the third communication link. For example, the third packet 923 may change the anchor bit for the second communication link from logic high to logic low, and may change the anchor bit for the third communication link from logic low to logic high. Since the second device D2 has already received information about each of the communication links and setup the common BA session with the first device D1, the second device D2 may dynamically switch from communicating over the first and the second communication links for TID=4 to communicating over the first and the third communication links for TID=4 without disassociating from the first device D1, re-associating with the first device D1, or exchanging additional information with the first device D1, thereby saving time, conserving device resources, and reducing overhead on the communication links (such as compared with conventional mechanisms for which wireless communication devices disassociate and/or re-associate with one another when changing mappings between the TIDs and the communication links).

In addition, or in the alternative, the first device D1 may dynamically map one or more other TIDs to any subset of the communication links using the third packet 923. As a non-limiting example, the third packet 923 may dynamically map TID=2 to the third communication link, TID=5 to the first communication link and the second communication link, TID=3 to a fourth communication link, and TID=6 to all of the first, the second, the third, and the fourth communication links. In addition, or in the alternative, a wireless communication device may indicate to the first device D1 that the wireless communication device is capable of operating on a single link, even though multiple link are active and available. For example, the second device D2 may have one antenna and thus be capable of operating on a single link. In this example, the first device D1 may dynamically map TIDs to a single communication link for communications with the second device D2.

Figure 10:
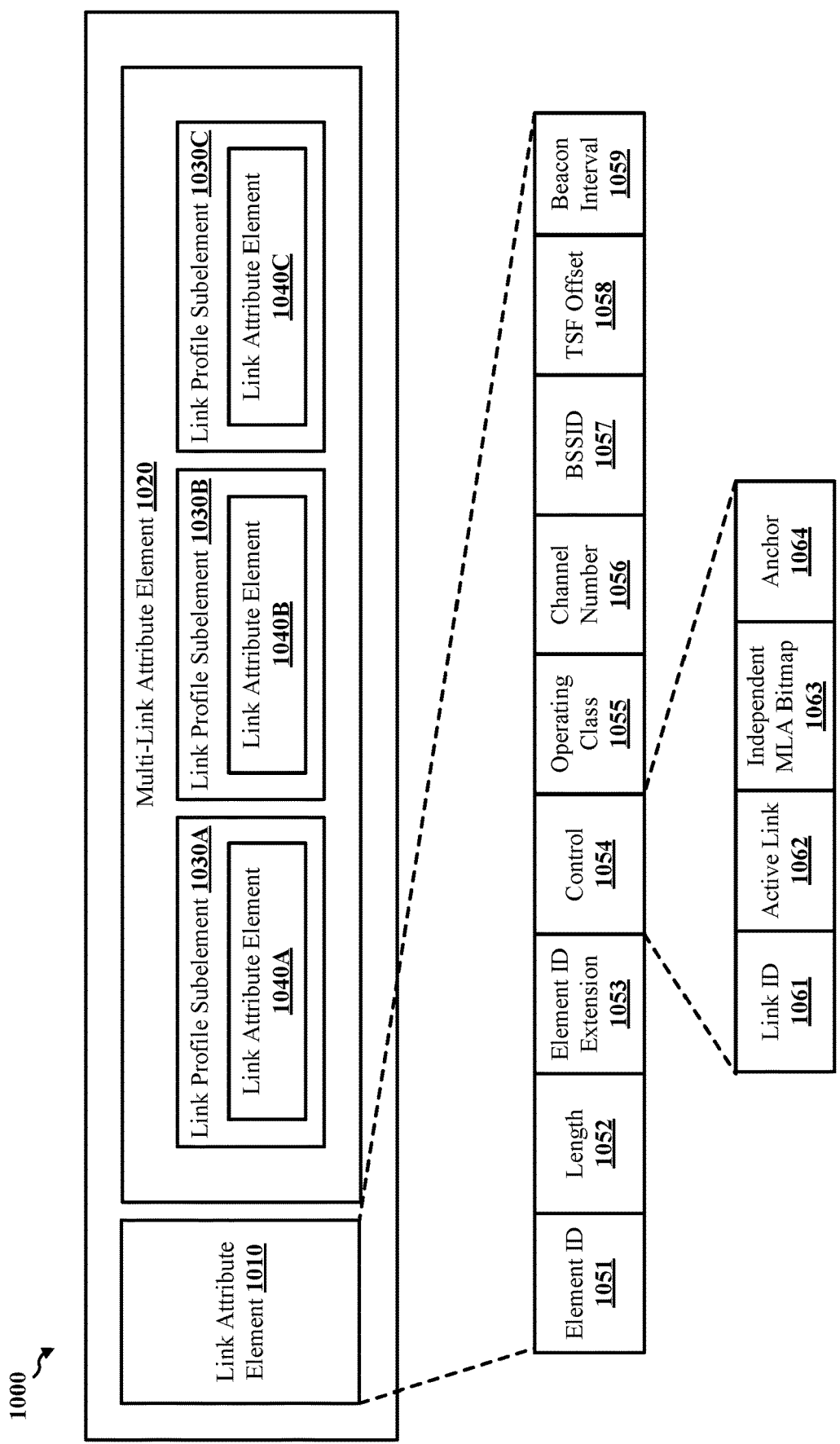
FIG. 10 shows an example frame usable for communications between wireless communication devices.

FIG. 10 shows an example frame 1000 including a Link Attribute Element 1010 and a Multiple Link Attribute Element 1020 usable for communications between wireless communication devices. In some implementations, the frame 1000 may be a beacon frame, a probe response frame, an association response frame, or some other appropriate frame. In some instances, the frame 1000 may be an example implementation of the first packet 901, the ML Association request 911, or the second packet 902 described with reference to FIG. 9A. In some other instances, the frame 1000 may be an example implementation of the first packet 921, the MLA request 931, the second packet 922, or the third packet 923 described with reference to FIG. 9B. For ease of explanation, some information elements of the frame 1000 may also be referred to as a "field," a "subfield," an "element," or a "subelement," which may be considered interchangeable terms for purposes of discussion herein.

The frame 1000 also is shown to include a Link Attribute Element 1010, which may be an example implementation of the Link Attribute Element described with respect to FIG. 9B. In some implementations, the Link Attribute Element 1010 includes information about a communication link. For purposes of discussion of this non-limiting example, the Link Attribute Element 1010 may include information about the first communication link described with respect to FIG. 9A and FIG. 9B. In some other implementations, the Link Attribute Element 1010 may include information about some other communication link.

The Link Attribute Element 1010 is shown to include a plurality of fields, including: an Element ID field 1051, a Length field 1052, an Element ID Extension field 1053, a Control field 1054, an Operating Class field 1055, a Channel Number field 1056, a BSSID field 1057, a Timing Synchronization Function (TSF) Offset field 1058, and a Beacon Interval field 1059. In some implementations, the Element ID field 1051 may be 1 octet long and include an identifier for the Link Attribute Element 1010. In some aspects, the Link Attribute Element 1010 may facilitate the establishment of a common BA session between the first device D1 and the second device D2, as described with respect to FIG. 9B. In some implementations, the Length field 1052 may be 1 octet long and indicate a length of the Link Attribute Element 1010. In some implementations, the Element ID Extension field 1053 may be 1 octet long.

In some implementations, the Operating Class field 1055 may be 0 octets or 1 octet long and indicate an operating class for the first communication link. In some implementations, the Channel Number field 1056 may be 0 octets or 1 octet long and indicate a channel number for the first communication link. In some implementations, the BSSID field 1057 may be 0 or 6 octets long and indicate a BSSID associated with the first communication link. In some implementations, the TSF Offset field 1058 may be 0 or 2 octets long and indicate a TSF offset timing value for packets transmitted over the first communication link. In some aspects, a value of 0 in the TSF Offset field 1058 and the Beacon Interval field 1059 may indicate that the first device D1 is not transmitting beacons on the first communication link.

In some implementations, the Beacon Interval field 1059 may be 0 or 2 octets long and indicate a beacon interval for beacons transmitted over the first communication link. In some aspects, the values in the TSF Offset field 1058 or the Beacon Interval field 1059 may facilitate faster link switching for certain types of non-AP entities, such as a STA MLD device with a single radio. In some other implementations, the first device D1 may indicate that beacons will not be sent on one or more links. For example, the first device D1 may indicate that it is capable of communicating on the second communication link and that the second communication link is dedicated as a data-only channel. In this way, the first device D1 may indicate that the second device D2 may utilize the second communication link but that the first device D1 will not broadcast beacons on the second communication link.

The Control field 1054 may include a plurality of sub-elements (which may also be referred to as fields or subfields) and, in some instances, the may include 1 octet (8 bits). In some implementations, the plurality of subelements may include a Link ID subelement 1061, an Active Link subelement 1062, an Independent MLA Bitmap subelement 1063, and an Anchor subelement 1064. In some other implementations, the Control field 1054 may not include the Link ID subelement 1061, or the Link ID subelement 1061 may be included in some other portion of the frame 1000. In some implementations, the Link ID subelement 1061 may include a unique identifier for the first communication link. In some aspects, the first device D1 may assign the unique identifier.

In some implementations, the Active Link subelement 1062 may indicate whether the first communication link is currently enabled. As a non-limiting example, the first device D1 may indicate that it is capable of operating on one or more links, and the first device D1 may provide channel numbers and BSSIDs for each of the one or more links. In some other implementations, the Active Link subelement 1062 may indicate one or more links that the first device D1 is not operating on. As an example, the first device D1 may indicate that a particular link is disabled so that certain types of (such as non-EHT) devices do not attempt to communicate over the particular link. In some aspects, the Active Link subelement 1062 may be reserved for the primary (first) communication link.

In some implementations, the Independent MLA Bitmap subelement 1063 may be a bitmap that indicates a particular (second) link with which the first communication link may perform independent ML Association. In some aspects, a bit position of the Independent ML Association Bitmap subelement 1063 may correspond to the value of the Link ID subelement 1061. In some aspects, the bitmap may be a two-bit link identifier capable of indicating up to four combinations, 0-3. For example, if the second bit is asserted (set to 1) for the second communication link, then the first communication link may be capable of operating independently with respect to the second communication link.

In some implementations, the Anchor subelement 1064 may indicate whether the first communication link is designated as an anchor link. In some aspects, for an auxiliary link, if the Active Link subelement 1062 is set to 0 for a particular link, the Anchor subelement 1064 may be reserved, and the particular link may be unavailable as an anchor link.

For the example of FIG. 10, the fields 1051-1059 are included in the Link Attribute Element 1010. In some implementations, the Link Attribute Element 1010 may not include one or more of the fields 1051-1059 or subelements 1061-1064. In some implementations, the Link Attribute Element 1010 may include one or more different information elements. As one non-limiting example, the Link Attribute Element 1010 may not include any of the Operating Class field 1055, the Channel Number field 1056, the BSSID field 1057, the TSF Offset field 1058, or the Beacon Interval field 1059. In some other implementations (not shown for simplicity), each of the Link Attribute Elements 1040A-1040C may include each of the Operating Class field 1055, the Channel Number field 1056, the BSSID field 1057, the TSF Offset field 1058, and the Beacon Interval field 1059.

As another non-limiting example, the Link Attribute Element 1010 may include each of the Operating Class field 1055, the Channel Number field 1056, the BSSID field 1057, the TSF Offset field 1058, and the Beacon Interval field 1059. And in some other implementations (not shown for simplicity), each of the Link Attribute Elements 1040A-1040C may not include any of the Operating Class field 1055, the Channel Number field 1056, the BSSID field 1057, the TSF Offset field 1058, or the Beacon Interval field 1059. Example implementations of the Link Attribute Element 1010 and the Link Attribute Elements 1040A-1040C are described with respect to FIG. 11.

In some implementations, one or more information elements, including the information elements 1051-1059, may be combined, added, moved (to one or more other information elements), removed, or otherwise modified for the frame 1000. Furthermore, the names shown for information elements 1051-1059 are example names, and in some implementations, one or more of the information elements 1010-1059 may have a different name.

The Multiple Link Attribute Element 1020, which may be an example implementation of the Multiple Link Attribute Element described with reference to FIG. 9B, may include a first per-link profile subelement 1030A, a second per-link profile subelement 1030B, and a third per-link profile subelement 1030C, each of which may be an example implementation of the per-link profile subelement described with reference to FIG. 9B. Each Link Profile Subelement 1030A-C may include a respective Link Attribute Element 1040A-1040C.

Figure 11:
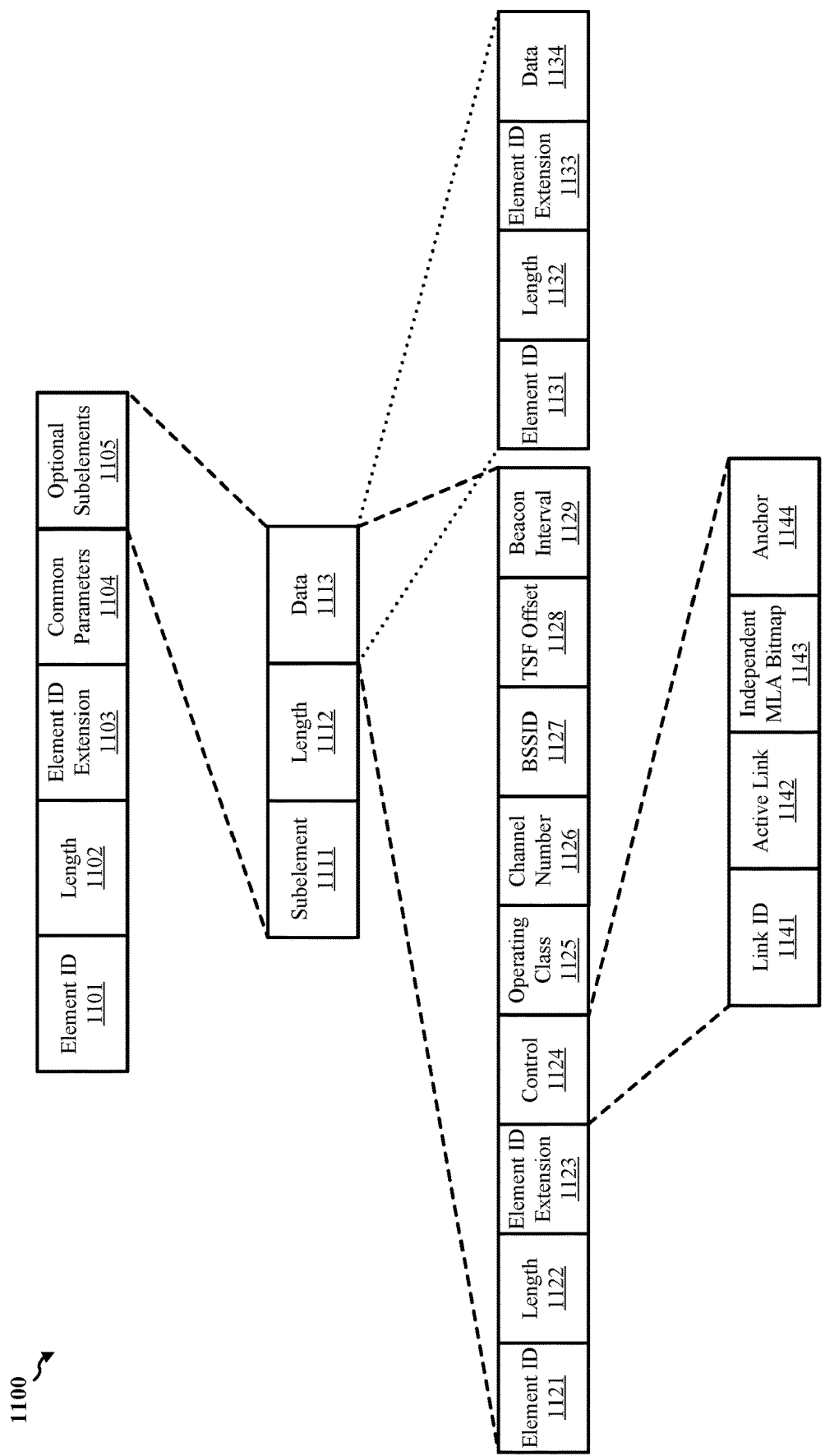
FIG. 11 shows an example Multiple Link Attribute (MLA) Element usable for communications between wireless communication devices.

FIG. 11 shows an example multi-link attribute element 1100 usable for communications between wireless communication devices. In some aspects, the Multiple Link Element 1100 may be an example implementation of the multi-link attribute element 1020 described with respect to FIG. 10. In some implementations, the multi-link attribute element 1020 may be included in a frame (such as the frame 1000, a beacon frame, an association request frame, an association response frame, or any other appropriate frame) transmitted by the first device D1 ("transmitting device," "AP," or "AP entity") and received by the second device D2 ("receiving device," "non-AP," "STA MLD device," "STA," "non-AP STA," or "non-AP STA entity"), or vice versa. For purposes of discussion of FIG. 11, the first communication link may be the "primary link," and the second communication link may be one "auxiliary link" of a number of auxiliary links. For ease of explanation, some information elements of the multi-link attribute element 1100 may be referred to as a "field," a "subfield," an "element," or a "subelement," which may be considered interchangeable terms for purposes of discussion herein. In some implementations, the information elements of the multi-link attribute element 1100 may be referred to with any other appropriate term.

The multi-link attribute element 1100 is shown to include a plurality of fields, including: an Element ID field 1101, a Length field 1102, an Element ID Extension field 1103, a Common Parameters field 1104, and an Optional Subelements field 1105. In some implementations, the Element ID field 1101 may be 1 octet long and include an identifier for the multi-link attribute element 1100. In some implementations, the Length field 1102 may be 1 octet long and indicate a length of the multi-link attribute element 1100. In some implementations, the Element ID Extension field 1103 may be 1 octet long. An example implementation of the Element ID Extension field 1103 is described with respect to FIG. 12. In some implementations, the Common Parameters field 1104 may be 1 octet long and include common information for each of the number of auxiliary links. In some implementations, the multi-link attribute element 1100 may include one or more Optional Subelement fields 1105. For simplicity, only one Optional Subelements field 1105 is shown; however, the multi-link attribute element 1100 may include one Optional Subelements field 1105 of variable length for each of the number of auxiliary links. In some aspects, the multi-link attribute element 1100 may include up to four Optional Subelements fields 1105, one for each of up to four auxiliary links (not shown for simplicity).

In some implementations, the Optional Subelements field 1105 for each of the number of auxiliary links may include ML information (or "ML attributes") for the corresponding auxiliary link that differs from the primary link. To save bits, in some aspects, ML attributes that are not included in a corresponding multi-link attribute element 1100 may be assumed to be inherited from the primary link. As one non-limiting example, a Link Attribute Element, such as the Link Attribute Element 1010 of FIG. 10, may include a beacon interval for the first (primary) communication link, and the Optional Subelements field 1105 corresponding to the second communication link may not include a beacon interval for the second communication link. In this example, the beacon interval for the second communication link may be inherited from the beacon interval for the first communication link included in the Link Attribute Element 1010. In this way, one or more information elements in the Optional Subelements field 1105 corresponding to the second communication link may be excluded or include different information. In some other implementations, the Multiple Link Element 1100 may include a single Optional Subelements field 1105 that includes ML information for all or a subset of the auxiliary links.

The Optional Subelements field 1105 is shown to include a plurality of fields, including: a Subelement ID=0 field 1111, a Length field 1112, and a Data field 1113. In some implementations, the Subelement ID=0 field 1111 may be 1 octet long and include an identifier (such as a value from 0-255) of the corresponding Optional Subelements field 1105. In some aspects, values 1-255 may be reserved.

In some implementations, the Length field 1112 may be 1 octet long and indicate a length of the corresponding Optional Subelements field 1105. In some implementations, the Data field 1113 may be of variable length and include ML information for the corresponding communication link. Each of the Data fields 1113 may be an example implementation of one of the Link Attribute Elements 1040A-1040C described with respect to FIG. 10. In some implementations, one or more of the Data fields 1113 may include the same or similar fields as the Link Attribute Element 1010 described with respect to FIG. 10.

One example implementation of the Data field 1113 is shown to include an Element ID field 1131, a Length field 1132, and an Element ID Extension field 1133. The Element ID field 1131, the Length field 1132, and the Element ID Extension field 1133 may be the same or similar to the Element ID field 1101, the Length field 1102, and the Element ID Extension field 1103, respectively, except that the Element ID field 1131, the Length field 1132, and the Element ID Extension field 1133 may include information about the corresponding auxiliary link, rather than the Multiple Link Element 1100. In some aspects, the Element ID Extension field 1133 may be 0 octets or 1 octet long. In some implementations, one or more of the Data fields 1113 may also include a Data field 1134 of variable length. In some aspects, one or more of the Data fields 1113 may indicate HT capabilities, VHT capabilities, HE capabilities, EHT capabilities, MLD capabilities, among other capabilities.

Another example implementation of the Data field 1113 is shown to include a plurality of fields, including an Element ID field 1121, a Length field 1122, an Element ID Extension field 1123, a Control field 1124, an Operating Class field 1125, a Channel Number field 1126, a BSSID field 1127, a TSF Offset field 1128, and a Beacon Interval field 1129, which may be the same or similar to the Element ID field 1051, the Length field 1052, the Element ID Extension field 1053, the Control field 1054, the Operating Class field 1055, the Channel Number field 1056, the BSSID field 1057, the TSF Offset field 1058, and the Beacon Interval field 1059, described with respect to FIG. 10, respectively.

In some implementations, the Optional Subelements field 1105 or the Data field 1113 may include additional ML information The Control field 1124 may include a plurality of subelements and, in some instances, may include 1 octet (8 bits). In some implementations, the Control field 1124 may include a Link ID subelement 1141, an Active Link subelement 1142, an Independent MLA Bitmap subelement 1143, and an Anchor subelement 1144, which may be the same or similar in format to the Link ID subelement 1061, the Active Link subelement 1062, the Independent MLA Bitmap subelement 1063, and the Anchor subelement 1064 of FIG. 10, respectively, except that the subelements 1141-1144 of the Multiple Link Element 1100 carry information for a corresponding secondary communication link, rather than for the primary link.

In some implementations, one or more of the various elements, subelements, fields, and subfields of the Multiple Link Element 1100 may be combined, added, moved (to one or more other information elements), removed, or otherwise modified. Furthermore, the names indicated for the various elements, subelements, fields, and subfields of the Multiple Link Element 1100 are example names, and may have different or alternate names in some other implementations.

Figure 12:
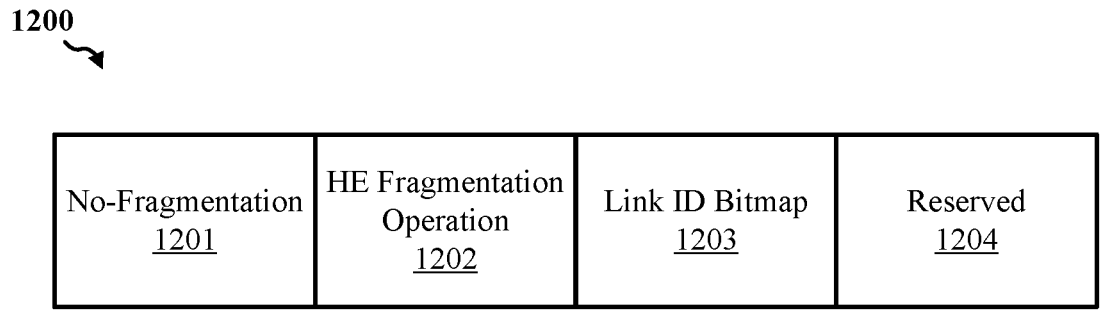
FIG. 12 shows an example Extension Element usable for communications between wireless communication devices.

FIG. 12 shows an example Extension Element 1200 usable for communications between wireless communication devices. In some aspects, the Extension Element 1200 may be an example implementation of the Element ID Extension field 1053 described with respect to FIG. 10, the Element ID Extension field 1103 described with respect to FIG. 11, the Element ID Extension field 1123 described with respect to FIG. 11, or the Element ID Extension field 1133 described with respect to FIG. 11. In some implementations, the Extension Element 1200 may be included in a frame (such as the frame 1000) transmitted by the first device D1 ("transmitting device," "AP," or "AP entity") and received by the second device D2 ("receiving device," "non-AP," "STA MLD device," "STA," "non-AP STA," or "non-AP STA entity"), or vice versa. For purposes of discussion of FIG. 12, the first communication link may be the "primary link," and the second communication link may be one "auxiliary link" of a number of auxiliary links. For ease of explanation, some information elements of the Extension Element 1200 may be referred to as a "field," a "subfield," an "element," or a "subelement," which may be considered interchangeable terms for purposes of discussion herein. In some implementations, the information elements of the Extension Element 1200 may be referred to with any other appropriate term.

In some implementations, the Extension Element 1200 may be 1 octet (8 bits) long. The Extension Element 1200 is shown to include a plurality of fields (or "information elements"), including: a No-Fragmentation field 1201 (bit 1), an HE Fragmentation Operation field 1202 (bits 2 and 3), a Link ID Bitmap field 1203 (bits 4-7), and a Reserved field 1204 (bit 8). In some implementations, the Extension Element 1200 may be an ADDBA Capabilities field, as described with respect to FIG. 9B. In some aspects, the Extension Element 1200 may be extended to include the Link ID Bitmap field 1203 for indicating which links are affiliated with a particular TID. In this way, the first device D1 and the second device D2 may establish a common BA session for each TID for each of the links identified in the Link ID Bitmap field 1203. In some implementations, one or more information elements, including the information elements 1201-1204, may be combined, added, moved (to one or more other information elements), removed, or otherwise modified for the Extension Element 1200. Furthermore, "Extension Element" is an example name, and in some implementations, the Extension Element 1200 may have any other name. The names shown for information elements 1201-1204 also are example names, and in some implementations, one or more of the information elements 1201-1204 may have a different name.

As a non-limiting example, the first device D1 and the second device D2 may establish a separate BA session for each of a number of communication links, such as a primary (first) communication link and two auxiliary (second and third) communication links. To facilitate the establishment, the first device D1 or the second device D2 may set certain bits (such as 0 and 2) in the Link ID Bitmap field 1203 to indicate that a particular TID (such as TID=4) is mapped onto the BA session for each of the links. In this way, TID=4 may be remapped to a particular link without either of the first device D1 or the second device D2 establishing another BA session. In some aspects, a particular TID (such as for voice) may be indicated as always mapped to a particular link. In some other aspects, a particular communication type (such as HT) of TID may be mapped to a particular link, such that only the particular link may be used for the particular communication type of TID. In another example, a particular TID (such as low-latency voice) may be mapped to all links, such that the corresponding packets for the particular TID may be transmitted on any available link.

In some implementations, in a packet-level aggregation MLO system, a first MAC-SAP endpoint and a second MAC-SAP endpoint may each be capable of supporting multiple links, and MLDs may aggregate data over the pair of MAC-SAP endpoints. In some other implementations, in a flow-level aggregation MLD system, each of a first pair of MAC-SAP endpoints may support a first communication link, while each of a second pair of MAC-SAP endpoints may support a different, second communication link. In some aspects, flow-level aggregation may also be referred to as dynamic TID transfer. Aspects of the present disclosure may enable MLD devices of both packet-level aggregation and flow-level aggregation MLD system types to switch from communicating over a first communication link to a second communication link without disassociation or reassociation, saving time and resources. In some implementations, in a packet-level aggregation MLD system, the first device D1 may enable more than one bit of the Link ID Bitmap field 1203; while for a flow-level aggregation MLD system, the first device D1 may enable a single bit of the Link ID Bitmap field 1203 at any given time.

Figure 13A:
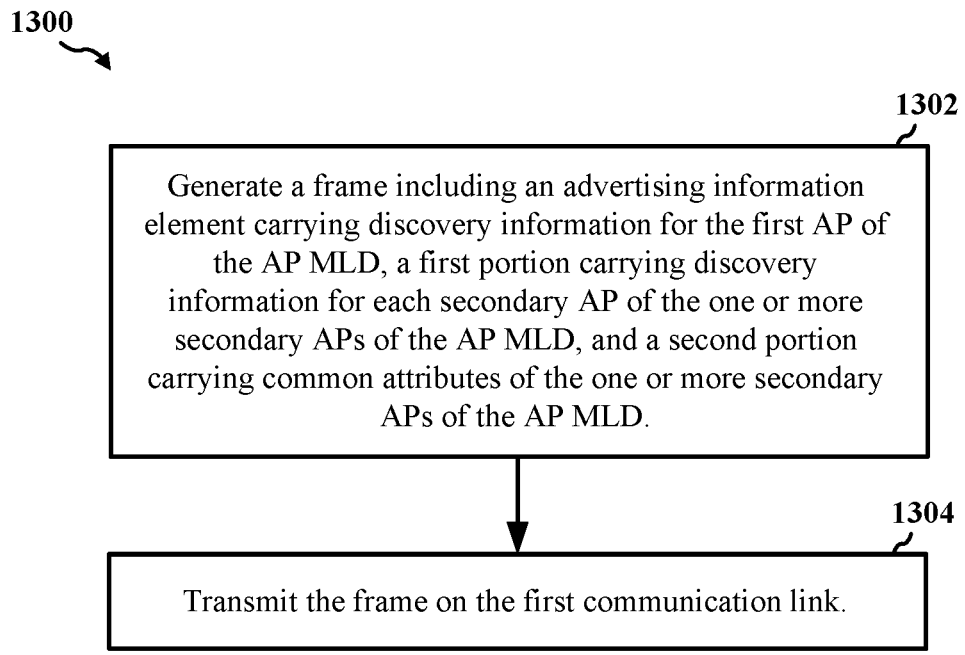
FIGS. 13A-13G show flowcharts illustrating example processes for wireless communication according to some implementations.

FIG. 13A shows a flowchart illustrating an example process 1300 for wireless communication according to some implementations. The process 1300 may be performed by a first wireless communication device such as the wireless communication device 500 described above with reference to FIG. 5. In some implementations, the process 1300 may be performed by a wireless communication device operating as or within an AP, such as one of the APs 102 and 602 described above with reference to FIGS. 1 and 6A, respectively. For the example of FIG. 13A, the process 1300 is performed by an AP MLD that includes a first AP and one or more secondary APs. The first AP is associated with a first communication link of the AP MLD, and each of the one or more secondary APs is associated with a respective secondary communication link of the one or more secondary communication links of the AP MLD. At block 1302, the first AP of the AP MLD generates a frame including an advertising information element, a first portion, and a second portion. The advertising information element carries discovery information for the first AP of the AP MLD, the first portion carries discovery information for each secondary AP of the one or more secondary APs of the AP MLD, and the second portion carries common attributes of the one or more secondary APs of the AP MLD. At block 1304, the AP MLD transmits the frame on the first communication link. In some implementations, the frame may be one of a beacon frame, a probe response frame, an association response frame, or a reassociation response frame.

In some implementations, the first portion may include one or more per-link profile subelements, and each per-link profile subelement may indicate the discovery information for a corresponding secondary AP of the one or more secondary APs (or their respective secondary communication links). In some instances, the discovery information may include one or more of an operating class of a corresponding secondary AP, a wireless channel of the corresponding secondary AP, or a basic service set identifier (BSSID) of the corresponding AP. In some instances, the frame may also include a field carrying an indication whether each of the per-link profile subelements carries all of the discovery information for the corresponding secondary AP or only a portion of the discovery information for the corresponding secondary AP.

Each of the per-link profile subelements may also include at least one of capability information or operating parameter information of a corresponding secondary AP of the one or more secondary APs. The capability information may indicate one or more of HT capabilities, VHT capabilities, HE capabilities, HE 6 GHz Band capabilities, or EHT capabilities. The operating parameter information may indicate one or more of HT operation parameters, VHT operation parameters, HE operation parameters, EHT operation parameters, EDCA parameters, MU EDCA parameters, UORA parameters, TWT parameters, FILS parameters, or SR parameters.

In some other implementations, the first portion may include a reduced neighbor report (RNR) element. The RNR element may indicate one or more of a transmit power level, a critical update, or an applicable amendment to the IEEE 802.11 family of standards for each AP of the first AP and the one or more secondary APs. In some instances, the RNR element may include one or more neighbor AP information fields, each field of the one or more neighbor AP information fields including a unique link identifier (ID) that identifies a corresponding communication link of the first communication link or the one or more secondary communication links associated with a respective AP of the first AP or the one or more secondary APs.

In some implementations, the second portion may include an MLD common element or field that indicates one or more common attributes shared by the one or more secondary APs (or their respective secondary communication links). The one or more common attributes indicated in the MLD common element may include at least one of an authentication scheme, an address of the AP MLD, or a basic service set identifier (BSSID) of the AP MLD. In some instances, the frame may also include a bitmap indicating a presence or absence of each of the one or more common attributes indicated in the MLD common element. For example, a first logic state of each bit in the bitmap may indicate the presence of a respective one of the authentication scheme, the address of the AP MLD, or the BSSID of the AP MLD in the MLD common element, and a second logic state of each bit in the bitmap may indicate an absence of the respective one of the authentication scheme, the address of the AP MLD, or the BSSID of the AP MLD from the MLD common element. In some other instances, an absence of a particular attribute in the MLD common element may indicate that the particular attribute of the corresponding secondary AP is the same as the particular attribute of the first AP (and therefore may be "inherited" from the first AP).

In some other implementations, the second portion may include a multi-link attribute element. In some instances, the multi-link attribute element may include one or more per-link profile subelements, each per-link profile subelement of the one or more per-link profile subelements including a corresponding one of the unique link IDs and one or more of capabilities or operating parameters for a respective AP of the one or more secondary APs.

In some implementations, the frame may also include an indication of whether the AP MLD supports simultaneous transmit-and-receive (STR) operations across multiple links of the first communication link and the one or more secondary communication links. In some instances, the frame may also include an indication of whether the AP MLD is an STR device or a non-STR device. In addition, or in the alternative, the frame may also include a first identifier (ID) field carrying a first identifier that uniquely identifies one or both of the AP MLD with which the first AP is associated or a respective secondary AP of the one or more secondary APs. In some instances, the frame may also include one or more second ID fields, each field of the one or more second ID fields carrying at least one of a link identifier that identifies a respective secondary AP of the one or more secondary APs or an MLD identifier that identifies the first AP MLD. Each link identifier of the first link identifier and the one or more second link identifier may associate one or more traffic identifiers (TIDs) with a respective communication link of the first communication link and the one or more secondary communication links for a block acknowledgement (BA) session between the AP MLD and the STA MLD.

In some implementations, the frame may also include an indication of critical updates corresponding to one or more of the first communication link and the one or more secondary communication links. In some instances, at least one critical update corresponds to the one or more secondary communication links but not the first communication link. In some other instances, at least one critical update corresponds to the first communication link and to at least one of the one or more secondary communication links. In some other implementations, the critical updates include a change in operating channels or a change in basic service set (BSS) parameters for at least one communication link of the first communication link or the one or more secondary communication links. In some instances, the critical updates may be carried in the per-link profile (either as an element or as a subelement within the multiple link attribute element). In addition, or in the alternative, there may be a bit to indicate when the reported link is in silent mode (such as when no transmissions are permitted on the link).

Figure 13B:
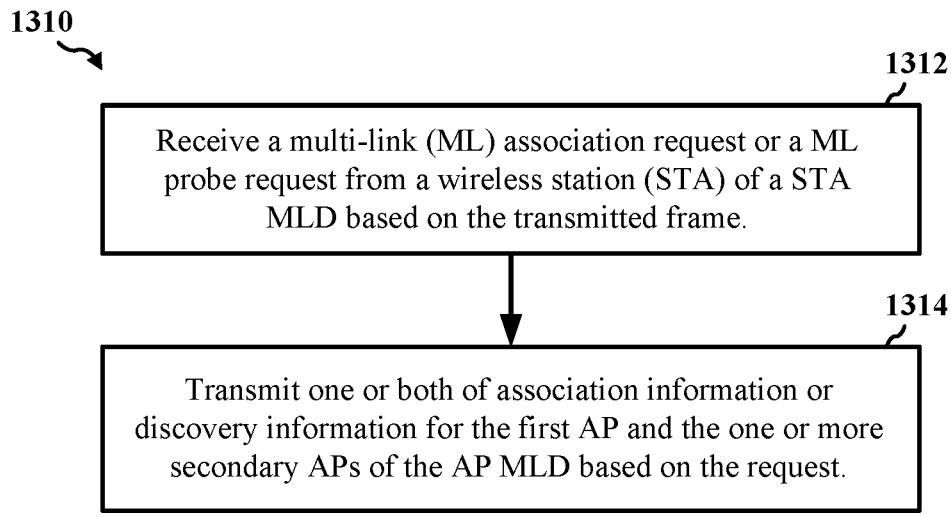

FIG. 13B shows a flowchart illustrating an example process 1310 for wireless communication according to some implementations. The process 1310 may be performed by a first wireless communication device such as the wireless communication device 500 described above with reference to FIG. 5. In some implementations, the process 1310 may be performed by a wireless communication device operating as or within an AP, such as one of the APs 102 and 602 described above with reference to FIGS. 1 and 6A, respectively. For the example of FIG. 13B, the process 1310 is performed by the AP MLD discussed with reference to FIG. 13A. In some implementations, the process 1310 is performed after transmitting the frame in block 1304 of FIG. 13A. At block 1312, the AP MLD receives a multi-link (ML) association request or a ML probe request from a wireless station (STA) of a STA MLD based on the transmitted frame. At block 1314, the first AP transmits one or both of association information or discovery information for the first AP and the one or more secondary APs of the AP MLD based on the request.

Figure 13C:
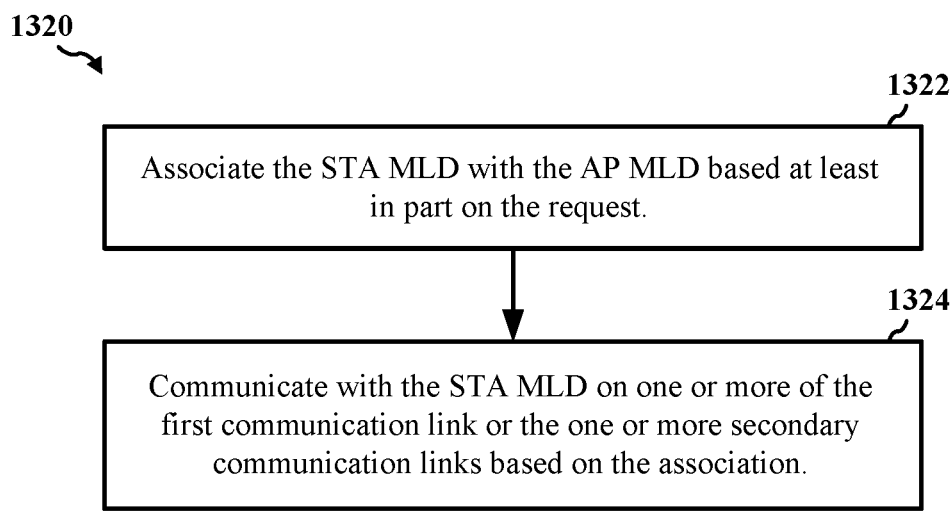

FIG. 13C shows a flowchart illustrating an example process 1320 for wireless communication according to some implementations. The process 1320 may be performed by a first wireless communication device such as the wireless communication device 500 described above with reference to FIG. 5. In some implementations, the process 1320 may be performed by a wireless communication device operating as or within an AP, such as one of the APs 102 and 602 described above with reference to FIGS. 1 and 6A, respectively. For the example of FIG. 13C, the process 1320 is performed by the AP MLD discussed with reference to FIG. 13A. In some implementations, the process 1320 is performed after transmitting the association information in block 1314 of FIG. 13B. At block 1322, the AP MLD associates with the STA MLD on the first communication link. At block 1324, the AP MLD communicates with the STA MLD on one or more of the first communication link or the one or more secondary communication links based on the association.

Figure 13D:
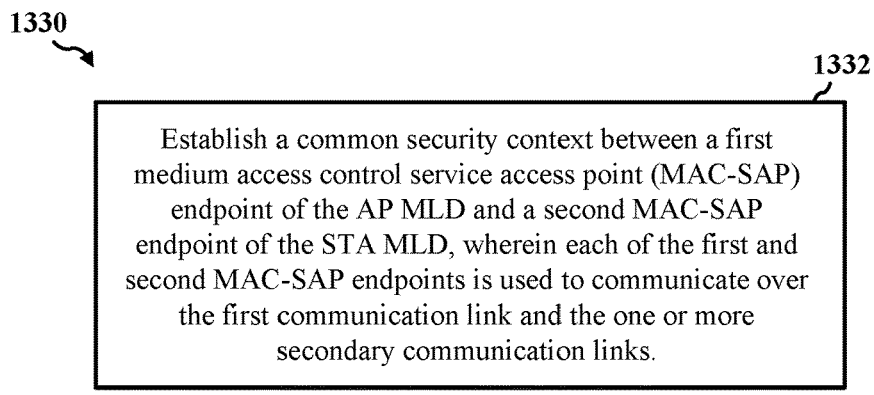

FIG. 13D shows a flowchart illustrating an example process 1330 for wireless communication according to some implementations. The process 1330 may be performed by a first wireless communication device such as the wireless communication device 500 described above with reference to FIG. 5. In some implementations, the process 1330 may be performed by a wireless communication device operating as or within an AP, such as one of the APs 102 and 602 described above with reference to FIGS. 1 and 6A, respectively. For the example of FIG. 13D, the process 1330 is performed by the AP MLD discussed with reference to FIG. 13A. In some implementations, the process 1330 is performed after associating the STA MLD with the AP MLD in block 1324 of FIG. 13C. At block 1332, the AP MLD establishes a common security context between a first medium access control service access point (MAC-SAP) endpoint of the AP MLD and a second MAC-SAP endpoint of the STA MLD, wherein each of the first and second MAC-SAP endpoints is used to communicate over the first communication link and the one or more secondary communication links.

Figure 13E:
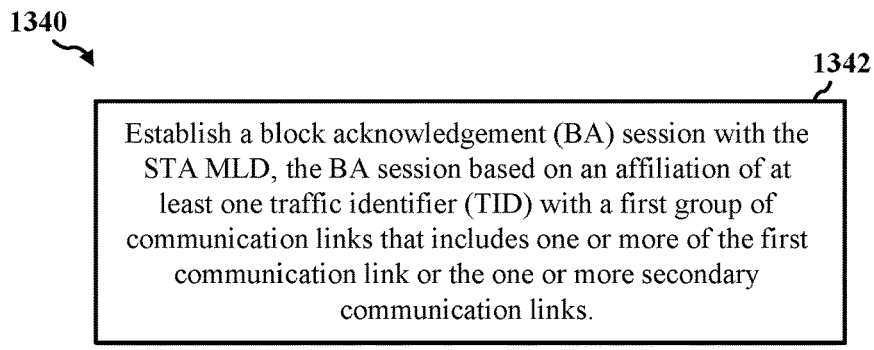

FIG. 13E shows a flowchart illustrating an example process 1340 for wireless communication according to some implementations. The process 1340 may be performed by a first wireless communication device such as the wireless communication device 500 described above with reference to FIG. 5. In some implementations, the process 1340 may be performed by a wireless communication device operating as or within an AP, such as one of the APs 102 and 602 described above with reference to FIGS. 1 and 6A, respectively. For the example of FIG. 13E, the process 1340 is performed by the AP MLD discussed with reference to FIG. 13A. In some implementations, the process 1340 is performed after transmitting the association information in block 1314 of FIG. 13B. At block 1342, the AP MLD establishes a block acknowledgement (BA) session with the STA MLD, the BA session based on an affiliation of at least one traffic identifier (TID) with a first group of communication links that includes one or more of the first communication link or the one or more secondary communication links.

Figure 13F:
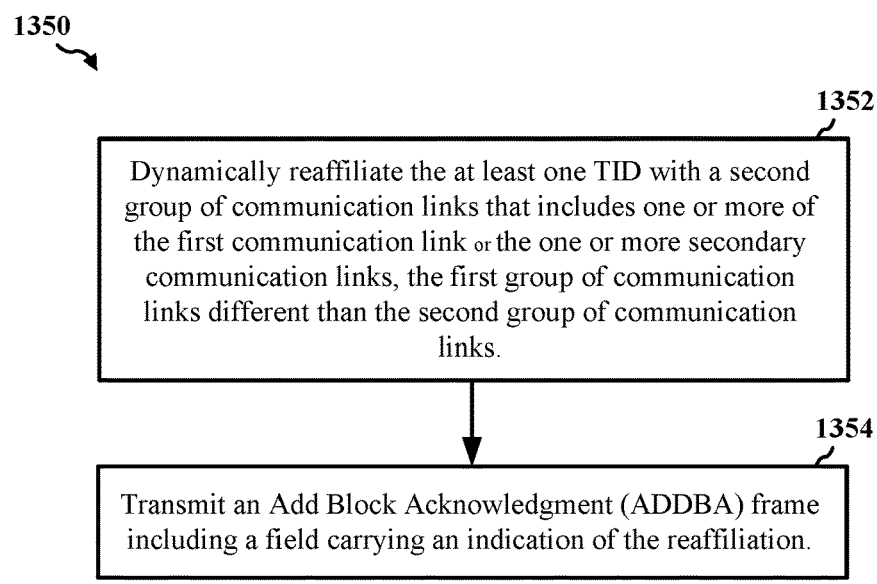

FIG. 13F shows a flowchart illustrating an example process 1350 for wireless communication according to some implementations. The process 1350 may be performed by a first wireless communication device such as the wireless communication device 500 described above with reference to FIG. 5. In some implementations, the process 1350 may be performed by a wireless communication device operating as or within an AP, such as one of the APs 102 and 602 described above with reference to FIGS. 1 and 6A, respectively. For the example of FIG. 13F, the process 1350 is performed by the AP MLD discussed with reference to FIG. 13A. In some implementations, the process 1350 is performed after establishing the BA session in block 1342 of FIG. 13E. At block 1352, the AP MLD dynamically reaffiliates the at least one TID with a second group of communication links that includes one or more of the first communication link or the one or more secondary communication links, the first group of communication links different than the second group of communication links. At block 1354, the AP MLD transmits an Add Block Acknowledgment (ADDBA) frame including a field carrying an indication of the reaffiliation.

Figure 13G:
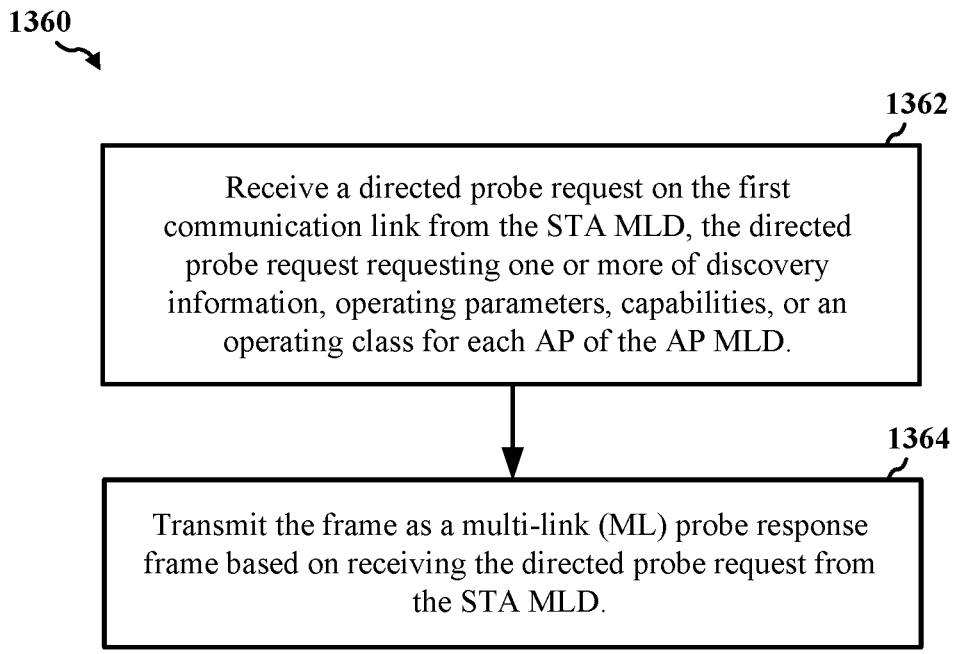

FIG. 13G shows a flowchart illustrating an example process 1360 for wireless communication according to some implementations. The process 1360 may be performed by a first wireless communication device such as the wireless communication device 500 described above with reference to FIG. 5. In some implementations, the process 1360 may be performed by a wireless communication device operating as or within an AP, such as one of the APs 102 and 602 described above with reference to FIGS. 1 and 6A, respectively. For the example of FIG. 13G, the process 1360 is performed by the AP MLD discussed with reference to FIG. 13A. In some implementations, the process 1360 is performed after transmitting the frame in block 1304 of FIG. 13A. At block 1362, the AP MLD receives a directed probe request on the first communication link from the STA MLD, the directed probe request requesting one or more of discovery information, operating parameters, capabilities, or an operating class for each AP of the AP MLD. At block 1364, the AP MLD transmits the frame as a multi-link (ML) probe response frame based on receiving the directed probe request from the STA MLD. In some implementations, the directed probe request may indicate one or more of capabilities, operating parameters, an operating class, or identification information of each STA of the STA MLD.

Figure 14A:
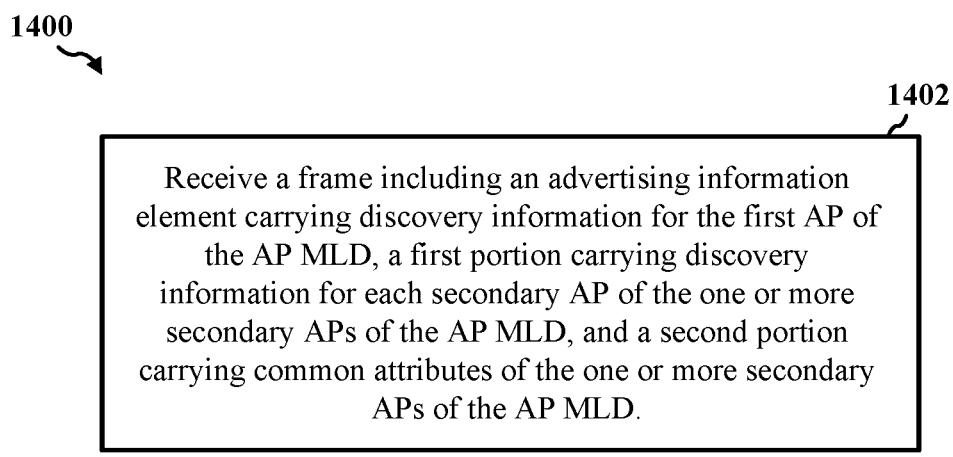
FIGS. 14A-14G show flowcharts illustrating example processes for wireless communication according to some implementations.

FIG. 14A shows a flowchart illustrating an example process 1400 for wireless communication according to some other implementations. The process 1400 may be performed by a first wireless communication device such as the wireless communication device 500 described above with reference to FIG. 5. In some implementations, the process 1400 may be performed by a wireless communication device operating as or within a STA, such as one of the STAs 104 and 604 described above with reference to FIGS. 1 and 6B, respectively. For the example of FIG. 14A, the process 1400 is performed by a wireless station (STA) multi-link device (MLD) to associate with an AP MLD that includes a first AP and one or more secondary APs. The first AP is associated with a first communication link of the AP MLD, and each of the one or more secondary APs is associated with a respective secondary communication link of the one or more secondary communication links.

At block 1402, the STA MLD receives a frame from a first AP of the AP MLD, the frame including an advertising information element, a first portion, and a second portion. The advertising information element carries discovery information for the first AP of the AP MLD, the first portion carries discovery information for each secondary AP of the one or more secondary APs of the AP MLD, and the second portion carries common attributes of the one or more secondary APs of the AP MLD. In some implementations, the frame may be one of a beacon frame, a probe response frame, an association response frame, or a reassociation response frame.

In some implementations, the first portion may include one or more per-link profile subelements, and each per-link profile subelement may indicate the discovery information for a corresponding secondary AP of the one or more secondary APs (or their respective secondary communication links). In some instances, the discovery information may include one or more of an operating class of a corresponding secondary AP, a wireless channel of the corresponding secondary AP, or a basic service set identifier (BSSID) of the corresponding AP. In some instances, the frame may also include a field carrying an indication whether each of the per-link profile subelements carries all of the discovery information for the corresponding secondary AP or only a portion of the discovery information for the corresponding secondary AP.

Each of the per-link profile subelements may also include at least one of capability information or operating parameter information of a corresponding secondary AP of the one or more secondary APs. The capability information may indicate one or more of HT capabilities, VHT capabilities, HE capabilities, HE 6 GHz Band capabilities, or EHT capabilities. The operating parameter information may indicate one or more of HT operation parameters, VHT operation parameters, HE operation parameters, EHT operation parameters, EDCA parameters, MU EDCA parameters, UORA parameters, TWT parameters, FILS parameters, or SR parameters.

In some other implementations, the first portion may include a reduced neighbor report (RNR) element. The RNR element may indicate one or more of a transmit power level, a critical update, or an applicable amendment to the IEEE 802.11 family of standards for each AP of the first AP and the one or more secondary APs. In some instances, the RNR element may include one or more neighbor AP information fields, each field of the one or more neighbor AP information fields including a unique link identifier (ID) that identifies a corresponding communication link of the first communication link or the one or more secondary communication links associated with a respective AP of the first AP or the one or more secondary APs.

In some implementations, the second portion may include an MLD common element or field that indicates one or more common attributes shared by the one or more secondary APs (or their respective secondary communication links). The one or more common attributes indicated in the MLD common element may include at least one of an authentication scheme, an address of the AP MLD, or a basic service set identifier (BSSID) of the AP MLD. In some instances, the frame may also include a bitmap indicating a presence or absence of each of the one or more common attributes indicated in the MLD common element. For example, a first logic state of each bit in the bitmap may indicate the presence of a respective one of the authentication scheme, the address of the AP MLD, or the BSSID of the AP MLD in the MLD common element, and a second logic state of each bit in the bitmap may indicate an absence of the respective one of the authentication scheme, the address of the AP MLD, or the BSSID of the AP MLD from the MLD common element. In some other instances, an absence of a particular attribute in the MLD common element may indicate that the particular attribute of the corresponding secondary AP is the same as the particular attribute of the first AP (and therefore may be "inherited" from the first AP).

In some other implementations, the second portion may include a multi-link attribute element. In some instances, the multi-link attribute element may include one or more per-link profile subelements, each per-link profile subelement of the one or more per-link profile subelements including a corresponding one of the unique link IDs and one or more of capabilities or operating parameters for a respective AP of the one or more secondary APs.

In some implementations, the frame may also include an indication of whether the AP MLD supports simultaneous transmit-and-receive (STR) operations across multiple links of the first communication link and the one or more secondary communication links. In some instances, the frame may also include an indication of whether the AP MLD is an STR device or a non-STR device. In addition, or in the alternative, the frame may also include a first identifier (ID) field carrying a first identifier that uniquely identifies one or both of the AP MLD with which the first AP is associated or a respective secondary AP of the one or more secondary APs. In some instances, the frame may also include one or more second ID fields, each field of the one or more second ID fields carrying at least one of a link identifier that identifies a respective secondary AP of the one or more secondary APs or an MLD identifier that identifies the first AP MLD. Each link identifier of the first link identifier and the one or more second link identifier may associate one or more traffic identifiers (TIDs) with a respective communication link of the first communication link and the one or more secondary communication links for a block acknowledgement (BA) session between the AP MLD and the STA MLD.

In some implementations, the frame may also include an indication of critical updates corresponding to one or more of the first communication link and the one or more secondary communication links. In some instances, at least one critical update corresponds to the one or more secondary communication links but not the first communication link. In some other instances, at least one critical update corresponds to the first communication link and to at least one of the one or more secondary communication links. In some other implementations, the critical updates include a change in operating channels or a change in basic service set (BSS) parameters for at least one communication link of the first communication link or the one or more secondary communication links. In some instances, the critical updates may be carried in the per-link profile (either as an element or as a subelement within the multiple link attribute element). In addition, or in the alternative, there may be a bit to indicate when the reported link is in silent mode (such as when no transmissions are permitted on the link).

Figure 14B:
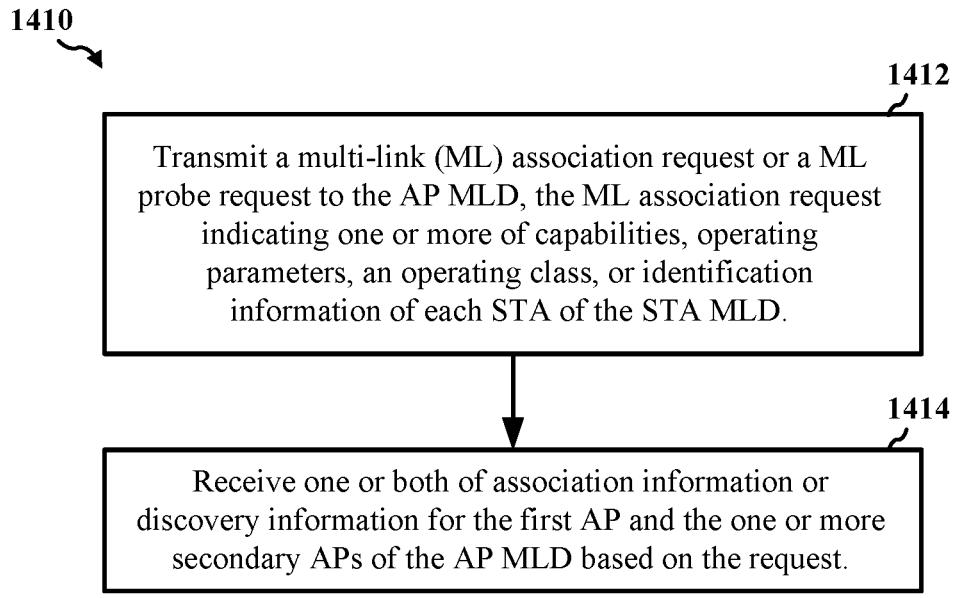

FIG. 14B shows a flowchart illustrating an example process 1410 for wireless communication according to some implementations. The process 1410 may be performed by a first wireless communication device such as the wireless communication device 500 described above with reference to FIG. 5. In some implementations, the process 1410 may be performed by a wireless communication device operating as or within a STA, such as one of the STAs 104 and 604 described above with reference to FIGS. 1 and 6B, respectively. For the example of FIG. 14B, the process 1410 is performed by the STA MLD of FIG. 14A. In some implementations, the process 1410 is performed after receiving the frame in block 1402 of FIG. 14A. At block 1412, the STA MLD transmits a multi-link (ML) association request or a ML probe request to the AP MLD, the ML association request indicating one or more of capabilities, operating parameters, an operating class, or identification information of each STA of the STA MLD. At block 1414, the STA MLD receives one or both of association information or discovery information for the first AP and the one or more secondary APs of the AP MLD based on the ML association request.

Figure 14C:
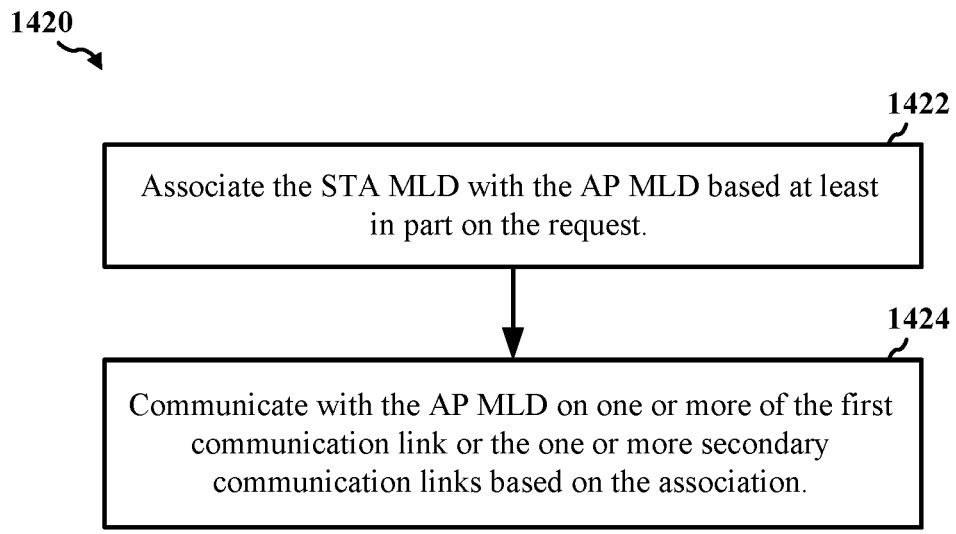

FIG. 14C shows a flowchart illustrating an example process 1420 for wireless communication according to some implementations. The process 1420 may be performed by a first wireless communication device such as the wireless communication device 500 described above with reference to FIG. 5. In some implementations, the process 1420 may be performed by a wireless communication device operating as or within a STA, such as one of the STAs 104 and 604 described above with reference to FIGS. 1 and 6B, respectively. For the example of FIG. 14C, the process 1420 is performed by the STA MLD of FIG. 14A. In some implementations, the process 1420 is performed after receiving the association information in block 1414 of FIG. 14B. At block 1422, the STA MLD associates with the AP MLD based at least in part on the request. At block 1424, the STA MLD communicates with the AP MLD on one or more of the first communication link or the one or more secondary communication links based on the association.

Figure 14D:
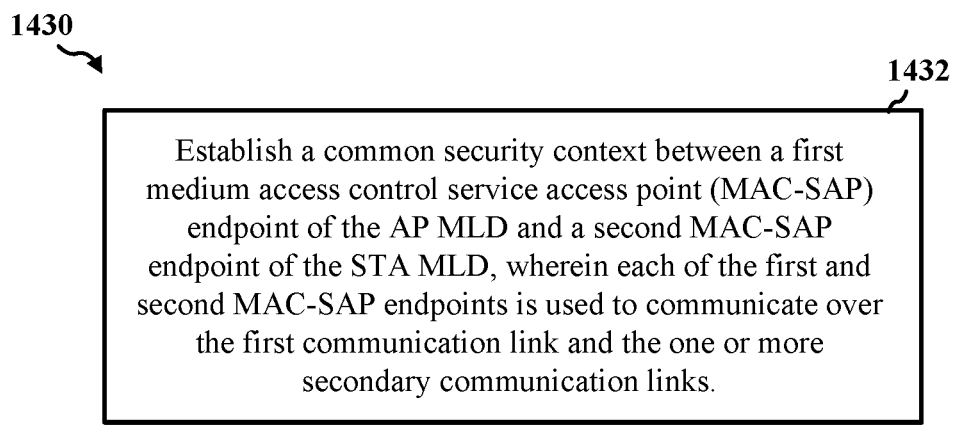

FIG. 14D shows a flowchart illustrating an example process 1430 for wireless communication according to some implementations. The process 1430 may be performed by a first wireless communication device such as the wireless communication device 500 described above with reference to FIG. 5. In some implementations, the process 1430 may be performed by a wireless communication device operating as or within a STA, such as one of the STAs 104 and 604 described above with reference to FIGS. 1 and 6B, respectively. For the example of FIG. 14D, the process 1430 is performed by the STA MLD of FIG. 14A. In some implementations, the process 1430 is performed after associating the STA MLD with the AP MLD in block 1424 of FIG. 14C. At block 1432, the STA MLD establishes a common security context between a first medium access control service access point (MAC-SAP) endpoint of the AP MLD and a second MAC-SAP endpoint of the STA MLD, wherein each of the first and second MAC-SAP endpoints is used to communicate over the first communication link and the one or more secondary communication links.

Figure 14E:
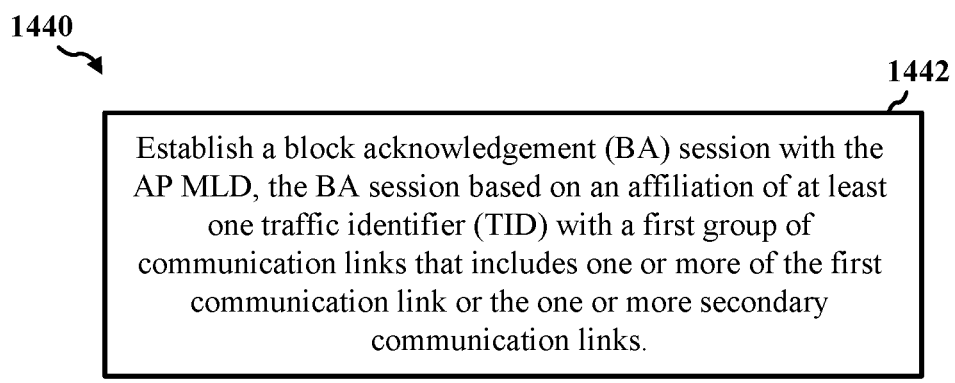

FIG. 14E shows a flowchart illustrating an example process 1440 for wireless communication according to some implementations. The process 1440 may be performed by a first wireless communication device such as the wireless communication device 500 described above with reference to FIG. 5. In some implementations, the process 1440 may be performed by a wireless communication device operating as or within a STA, such as one of the STAs 104 and 604 described above with reference to FIGS. 1 and 6B, respectively. For the example of FIG. 14E, the process 1440 is performed by the STA MLD of FIG. 14A. In some implementations, the process 1440 is performed after transmitting the association information in block 1414 of FIG. 14B. At block 1442, the STA MLD establishes a block acknowledgement (BA) session with the AP MLD, the BA session based on an affiliation of at least one traffic identifier (TID)

with a first group of communication links that includes one or more of the first communication link or the one or more secondary communication links.

Figure 14F:
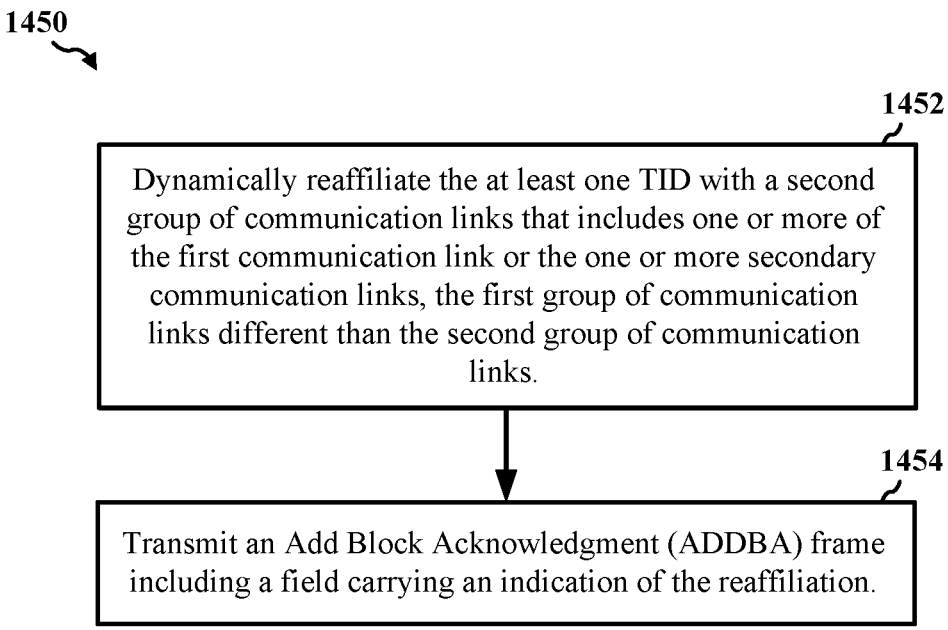

FIG. 14F shows a flowchart illustrating an example process 1450 for wireless communication according to some implementations. The process 1450 may be performed by a first wireless communication device such as the wireless communication device 500 described above with reference to FIG. 5. In some implementations, the process 1450 may be performed by a wireless communication device operating as or within a STA, such as one of the STAs 104 and 604 described above with reference to FIGS. 1 and 6B, respectively. For the example of FIG. 14F, the process 1450 is performed by the STA MLD of FIG. 14A. In some implementations, the process 1450 is performed after establishing the BA session in block 1442 of FIG. 14E. At block 1452, the STA MLD dynamically reaffiliates the at least one TID with a second group of communication links that includes one or more of the first communication link or the one or more secondary communication links, the first group of communication links different than the second group of communication links. At block 1454, the STA MLD transmits an ADDBA frame including a field carrying an indication of the reaffiliation.

Figure 14G:
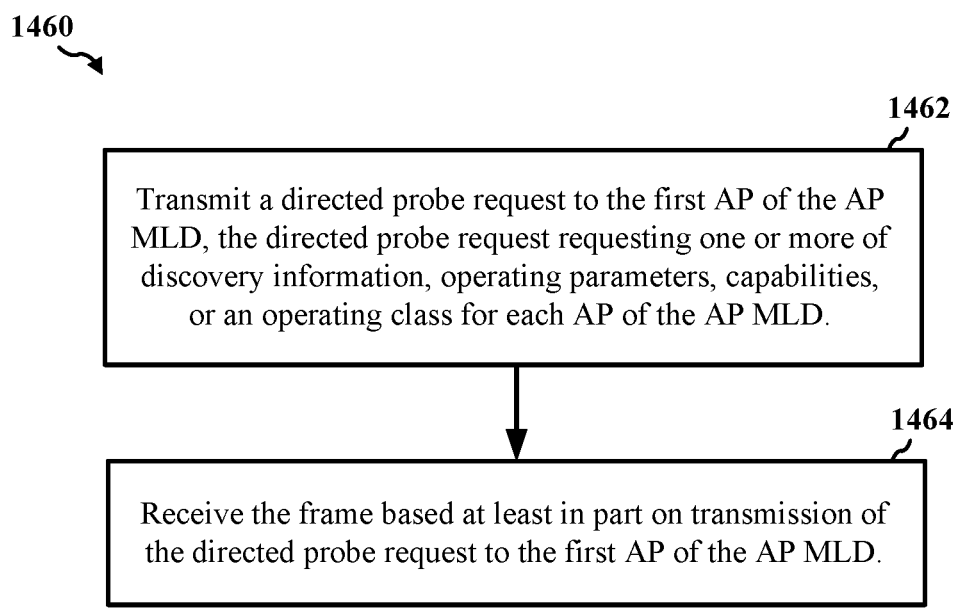

FIG. 14G shows a flowchart illustrating an example process 1460 for wireless communication according to some implementations. The process 1460 may be performed by a first wireless communication device such as the wireless communication device 500 described above with reference to FIG. 5. In some implementations, the process 1460 may be performed by a wireless communication device operating as or within a STA, such as one of the STAs 104 and 604 described above with reference to FIGS. 1 and 6B, respectively. For the example of FIG. 14E, the process 1460 is performed by the STA MLD of FIG. 14A. In some implementations, the process 1460 is performed after transmitting the frame in block 1404 of FIG. 14A. At block 1462, the STA MLD transmits a directed probe request to the first AP of the AP MLD, the directed probe request requesting one or more of discovery information, operating parameters, capabilities, or an operating class for each AP of the AP MLD. At block 1464, the STA MLD receives the frame based at least in part on transmission of the directed probe request to the first AP of the AP MLD. In some implementations, the directed probe request may indicate one or more of capabilities, operating parameters, an operating class, or identification information of each STA of the STA MLD.

Figure 15:
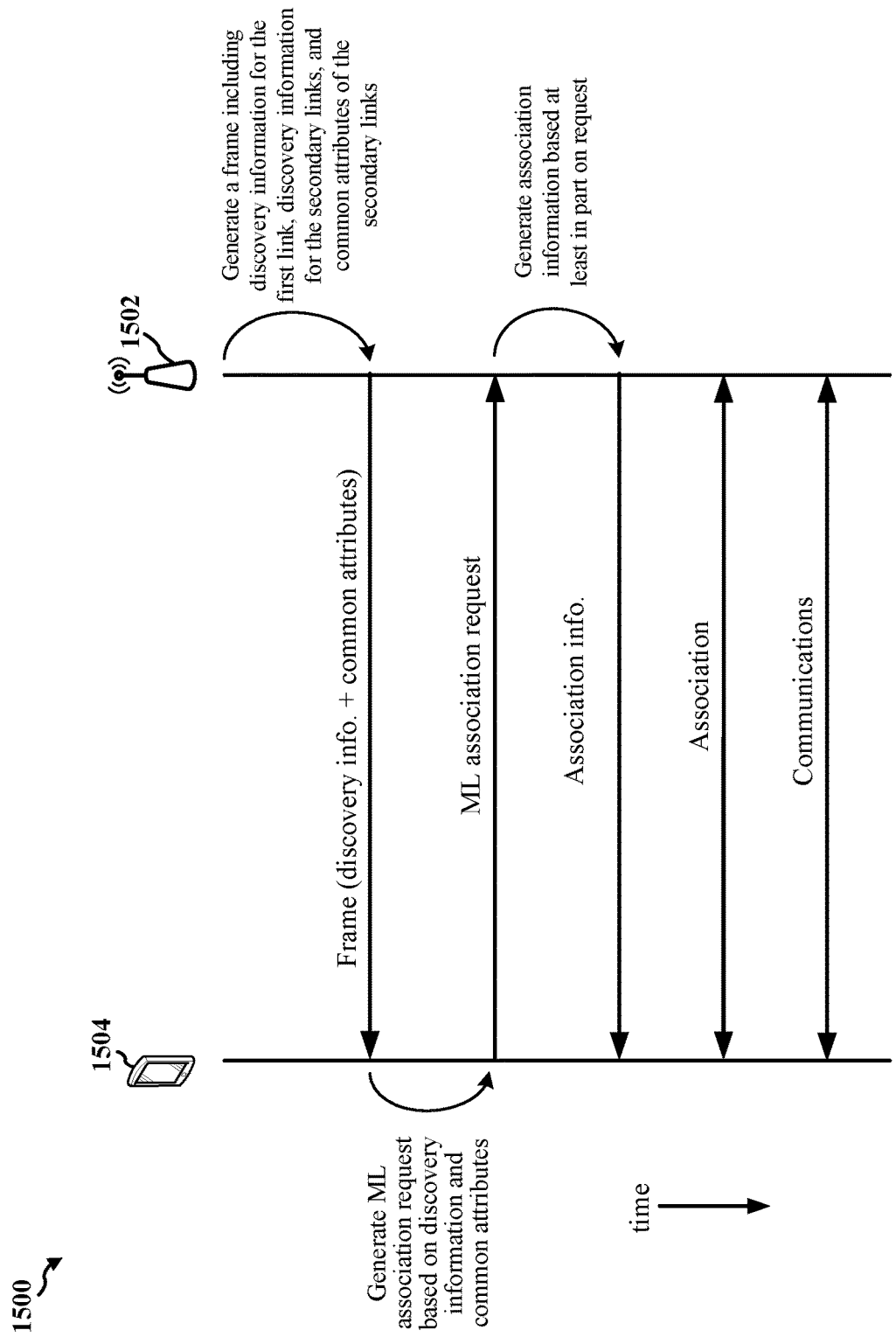
FIG. 15 shows a sequence diagram depicting an example multi-link communication according to some implementations.

FIG. 15 shows a sequence diagram depicting an example multi-link (ML) communication 1500 according to some implementations. In the example of FIG. 15, the ML communication 1500 may be performed between a first wireless communication device 1502 and a second wireless communication device 1504. In some implementations, the first device 1502 may be one of the APs 102 and 602 described above with reference to FIGS. 1 and 6A, respectively, and may be a first AP of an AP MLD associated with a first communication link of the AP MLD. Although not shown for simplicity, the AP MLD includes one or more secondary APs associated with one or more respective secondary communication links of the AP MLD. The second device 1504 may be one of the STAs 104 and 604 described above with reference to FIGS. 1 and 6B, respectively, and may be part of a STA MLD.

The first device 1502 generates a frame including discovery information for the first communication link, one or more per-link profile elements each indicating discovery information for a corresponding secondary communication link, and an MLD common element indicating common attributes of the one or more secondary communication links. The first device 1502 transmits the frame on the first communication link to the second device 1504.

The second device 1504 receives the frame, and transmits a ML association request to the first device 1502. The first device 1502 receives the ML association request, and transmits association information for the first communication link and the one or more secondary communication links based on the ML association request.

The first device 1502 associates the second device 1504 with the AP MLD based at least in part on the association information, and thereafter communicates with the second device 1504 on one or more of the first communication link or the one or more secondary communication links based on the association.

Figures 16A, 16B:
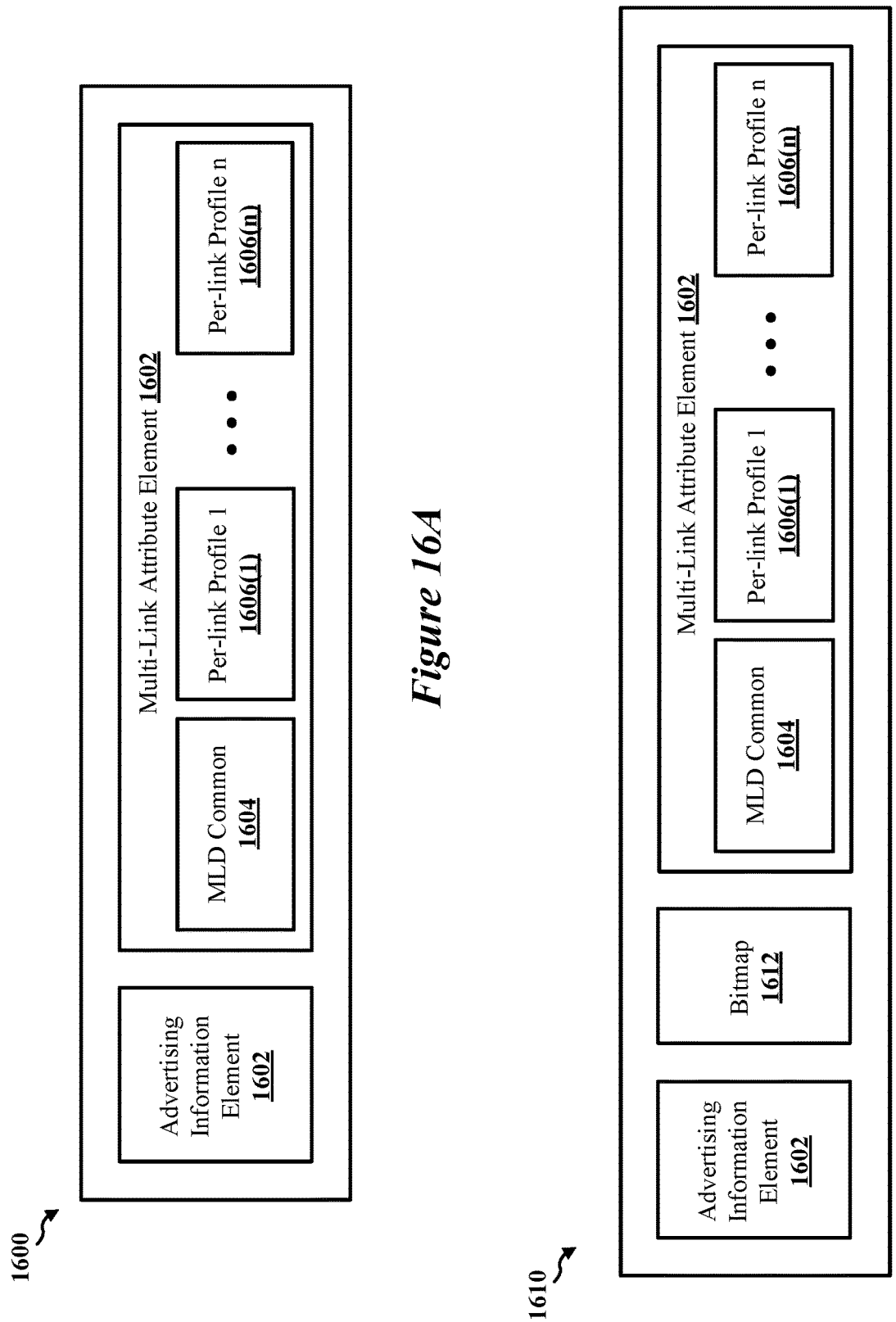
FIG. 16A shows an example frame usable for communications between wireless communication devices.
FIG. 16B shows another example frame usable for communications between wireless communication devices.

FIG. 16A shows an example frame 1600 usable for communications between wireless communication devices. The frame 1600 may be one example of the frame in the sequence diagram of FIG. 15. In some implementations, the frame 1600 may be a beacon frame. In some other implementations, frame 1600 may be a probe response or an association response. The frame 1600 is shown to include a discovery element 1602, a MLD common information element 1604, and one or more per-link profile elements 1606(1)-1606(n). In some implementations, the per-link profile elements 1606(1)-1606(n) may be organized as subelements. In some other implementations, the per-link profile elements 1606(1)-1606(n) and the MLD common element 1604 may be subelements contained within a multiple link attribute element.

Although not shown for simplicity, the frame 1600 may also include a link attribute element including at least a portion of the discovery information for the first communication link. The link attribute element may carry a link ID field indicating a unique identifier for the first communication link. In some implementations, the unique identifier is configured to identify the first communication link for a particular traffic identifier (TID) during block acknowledgement (BA) setup.

The advertising element 1602 may carry discovery information for the first communication link of an AP MLD (such as the first device 1502 of FIG. 15). The MLD common information element 1604 may carry common attributes of the one or more secondary communication links. In some implementations, the common attributes indicated in the MLD common element 1604 may include at least one of an authentication scheme, an address of the AP MLD, or a basic service set identifier (BSSID) of the AP MLD.

Each of the per-link profile elements 1606(1)-1606(n) may indicate discovery information for a corresponding secondary communication link of the AP MLD. In some implementations, the discovery information contained in each of the per-link profile elements 1606(1)-1606(n) includes one or more of an operating class of the corresponding secondary communication link, a wireless channel of the corresponding secondary communication link, or a basic service set identifier (BSSID) of the corresponding secondary communication link. In some instances, at least one per-link profile element 1606 includes only a portion of the discovery information for the corresponding secondary communication link. In some other instances, at least one per-link profile element 1606 includes an indication of whether the at least one per-link profile element carries all of the discovery information for the corresponding secondary communication link or a portion of the discovery information for the corresponding secondary communication link.

In some implementations, each per-link profile element 1606 further includes one or more capabilities of a corresponding secondary AP of the one or more secondary APs of the AP MLD. The one or more capabilities may include at least one of high-throughput (HT) capabilities, very high-throughput (VHT) capabilities, high efficiency (HE) capabilities, HE 6 GHz Band capabilities, or extremely high-throughput (EHT) capabilities.

In some implementations, each per-link profile element 1606 further includes one or more operating parameters of a corresponding secondary AP of the one or more secondary APs of the AP MLD. The one or more operating parameters may include at least one of high-throughput (HT) operation, very high-throughput (VHT) operation, high efficiency (HE) operation, or extremely high-throughput (EHT) operation, enhanced distributed channel access (EDCA) parameters, multi-user (MU) EDCA parameters, uplink (UL) orthogonal frequency division multiple access (OFDMA) random access (UORA) parameters, target wait time (TWT) parameters, fast initial link setup (FILS) parameters, or spatial reuse (SR) parameters.

The frame 1600 may also include a first identifier (ID) field carrying a first identifier that uniquely identifies one or both of the AP MLD with which the first AP is associated or a respective secondary AP of the one or more secondary APs. The frame 1600 may also include one or more second ID fields, each field of the one or more second ID fields carrying at least one of a link identifier that identifies a respective secondary AP of the one or more secondary APs or an MLD identifier that identifies the first AP MLD. In some instances, each link identifier of the first link identifier and the one or more second link identifier associates one or more traffic identifiers (TIDs) with a respective communication link of the first communication link and the one or more secondary communication links for a block acknowledgement (BA) session between the AP MLD and the STA MLD.

FIG. 16B shows another example frame 1610 usable for communications between wireless communication devices. The frame 1610 may be one example of the frame in the sequence diagram of FIG. 15. In some implementations, the frame 1610 may be a beacon frame. In some other implementations, frame 1610 may be a probe response or an association response. The frame 1610 is similar to the frame 1600 of FIG. 16A, and also includes a bitmap 1612 that may indicate a presence or absence of each of the one or more common attributes indicated in the MLD common element 1604. In some implementations, an absence of a particular common attribute from the MLD common element 1604 indicates that the particular common attribute is also common to the first communication link.

In some implementations, each bit of the bitmap 1612 indicates a presence or absence of the authentication scheme, the address of the AP MLD, and the BSSID of the AP MLD, respectively, in the MLD common element 1604. In some instances, a first logic state of a respective bit in the bitmap 1612 indicates the presence of one of the authentication scheme, the address of the AP MLD, or the BSSID of the AP MLD in the MLD common element 1604, and a second logic state of the respective bit in the bitmap 1612 indicates an absence of the one of the authentication scheme, the address of the AP MLD, or the BSSID of the AP MLD from the MLD common element 1604.

The frame 1610 may also include a first identifier (ID) field carrying a first identifier that uniquely identifies one or both of the AP MLD with which the first AP is associated or a respective secondary AP of the one or more secondary APs. The frame 1610 may also include one or more second ID fields, each field of the one or more second ID fields carrying at least one of a link identifier that identifies a respective secondary AP of the one or more secondary APs or an MLD identifier that identifies the first AP MLD. In some instances, each link identifier of the first link identifier and the one or more second link identifier associates one or more traffic identifiers (TIDs) with a respective communication link of the first communication link and the one or more secondary communication links for a block acknowledgement (BA) session between the AP MLD and the STA MLD.

Figures 17, 18:
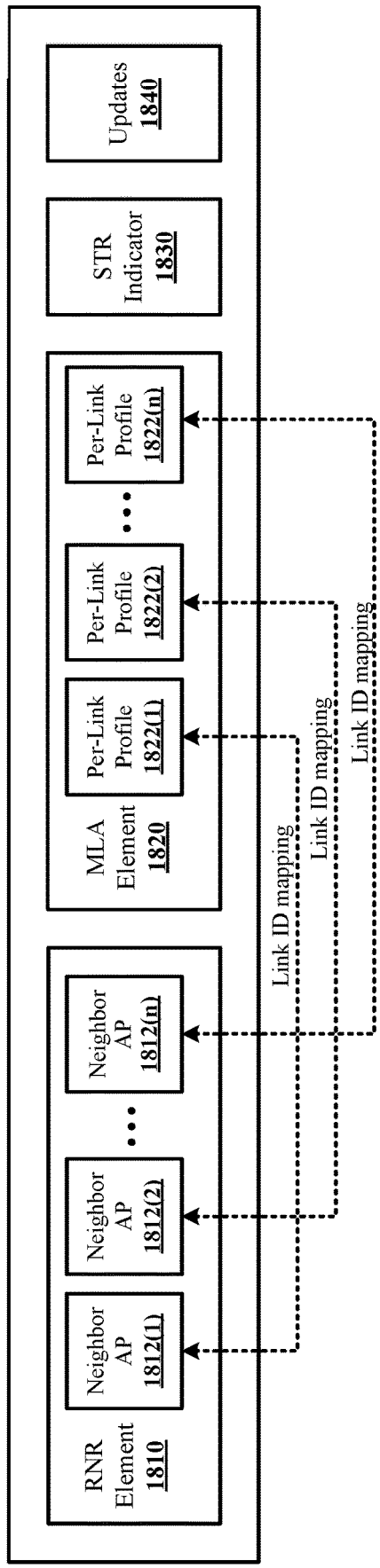
FIG. 17 shows an example multiple link attribute element usable for communications between wireless communication devices.
FIG. 18 shows another example frame usable for communications between wireless communication devices.

FIG. 17 shows an example multiple link attribute element 1700 usable for communications between wireless communication devices. In some implementations, the multiple link attribute element 1700 may be used to carry the MLD common element 1604 and the one or more per-link profile elements 1606(1)-1606(n) described with reference to FIGS. 16A and 16B.

FIG. 18 shows another example frame 1800 usable for communications between wireless communication devices. As shown, the frame 1800 may include a reduced neighbor report (RNR) 1810 and a multiple link attribute element 1820. In some implementations, the RNR element 1810 included one or more neighbor AP information fields, each field of the one or more neighbor AP information fields including a unique link ID and one or more of an operating class, a channel number, a basic service set identifier (BSSID), or basic service set (BSS) parameters for a respective AP of the one or more secondary APs.

The multiple link attribute element 1820 may include one or more per-link profile elements, where each per-link profile element may include a corresponding unique link ID and one or more of capabilities or operating parameters for a respective AP of the one or more secondary APs. The capabilities may include at least one of high-throughput (HT) capabilities, very high-throughput (VHT) capabilities, high efficiency (HE) capabilities, or extremely high-throughput (EHT) capabilities. In some instances, the operating parameters may include at least one of an operating class, a wireless channel, or a BSSID. In some other instances, the operating parameters may include at least one of high-throughput (HT) operation, very high-throughput (VHT) operation, high efficiency (HE) operation, extremely high-throughput (EHT) operation, enhanced distributed channel access (EDCA) parameters, multi-user (MU) EDCA parameters, uplink (UL) orthogonal frequency division multiple access (OFDMA) random access (UORA) parameters, target wait time (TWT) parameters, fast initial link setup (FILS) parameters, or spatial reuse (SR) parameters.

In some implementations, the link IDs carried in the neighbor AP information fields 1812(1)-1812(n) are the same as the link IDs carried in the per-link profile subelements 1822(1)-1822(n), respectively. That is, the link ID carried in the first neighbor AP information field 1812(1) is the same as the link ID carried in the first per-link profile subelement 1822(1), the link ID carried in the second neighbor AP information field 1812(2) is the same as the link ID carried in the second per-link profile subelement 1822(2), and the link ID carried in the $n^{th}$ neighbor AP information field 1812(n) is the same as the link ID carried in the $n^{th}$ per-link profile subelement 1822(n). In this way, information carried in the information fields 1812(1)-1812(n) may be mapped to information carried in the respective per-link profile subelements 1822(1)-1822(n).

In some implementations, the multiple link attribute element 1820 may include an indication 1830 of whether the transmitting device supports simultaneous transmit-and-receive (STR) operations across multiple links of the first communication link and the one or more secondary communication links. In some instances, the STR indication 1830 may indicate whether the transmitting device is an STR device or a non-STR device.

In some implementations, the multiple link attribute element 1820 may include an indication 1840 of critical updates corresponding to at least one of the first communication link and the one or more secondary communication links. In some instances, the critical updates may include a change in operating channels or a change in basic service set (BSS) parameters for at least one communication link of the first communication link and the one or more secondary communication links.

In some implementations, the RNR element 1810 is extended to include a Link ID field that stores one or more unique link IDs that may be used to map the AP entries in the RNR element 1810 with corresponding per-link profile elements in the multiple link attribute element 1820. In such implementations, the multiple link attribute element 1820 also includes a Link ID field that stores the one or more unique link IDs.

Figure 19A:
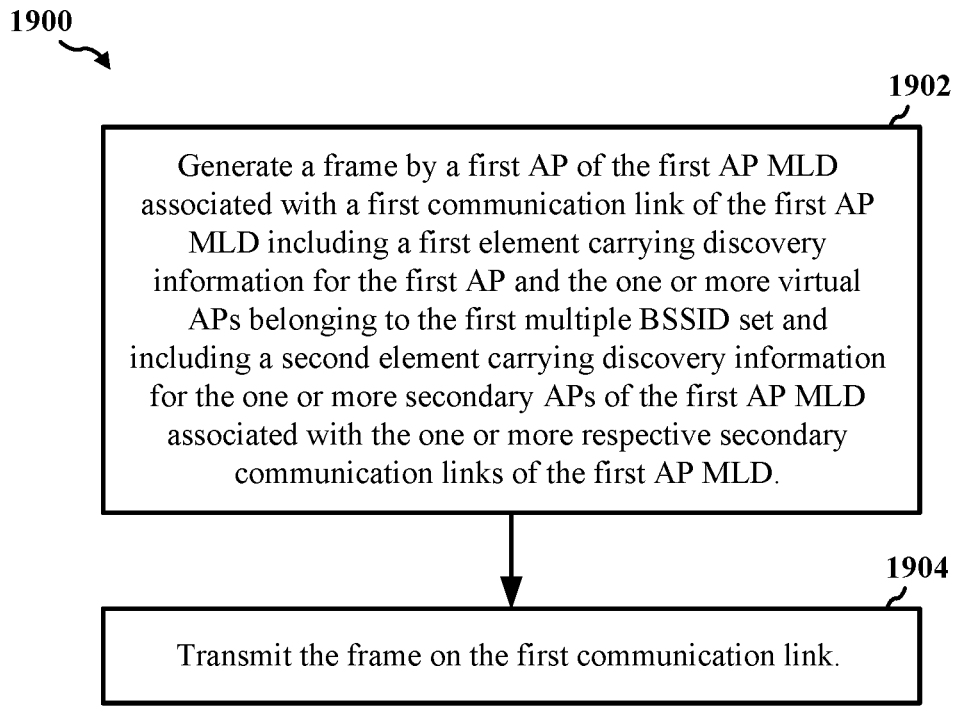
FIGS. 19A-19C show flowcharts illustrating example processes for wireless communication according to some implementations.

FIG. 19A shows a flowchart illustrating an example process 1900 for wireless communication according to some implementations. The process 1900 may be performed by a first wireless communication device such as the wireless communication device 500 described above with reference to FIG. 5. In some implementations, the process 1900 may be performed by a wireless communication device operating as or within an AP, such as one of the APs 102 and 602 described above with reference to FIGS. 1 and 6A, respectively. For the example of FIG. 19A, the process 1900 is performed by an AP MLD that includes a first AP and one or more secondary APs. The first AP is associated with a first communication link of the AP MLD, and each of the one or more secondary APs is associated with a respective secondary communication link of the one or more secondary communication links of the AP MLD. The first AP also includes one or more virtual APs, and the first AP and the one or more virtual APs of the first AP belong to a first multiple basic service set identifier (BSSID) set associated with the first communication link.

At block 1902, the first AP of the AP MLD generates a frame including a first element and a second element. The first element carries discovery information for the first AP and the one or more virtual APs belonging to the first multiple BSSID set, and the second element carries discovery information for the one or more secondary APs of the first AP MLD associated with the one or more respective secondary communication links of the first AP MLD. At block 1904, the AP MLD transmits the frame on the first communication link. The frame may be one of a beacon frame, a probe response frame, an association response frame, or a reassociation response frame. In some implementations, each secondary AP of the one or more secondary APs belongs to a respective secondary multiple BSSID set of one or more secondary multiple BSSID sets.

In some implementations, the frame further may include an identifier (ID) field carrying a first identifier that uniquely identifies one or both of the AP MLD with which the first AP is associated or a respective secondary AP of the one or more secondary APs that is affiliated with the first AP MLD. The frame may also include one or more second ID fields, each field of the one or more second ID fields carrying a corresponding second identifier that uniquely identifies one or both of a second AP MLD of one or more second AP MLDs with which a respective virtual AP of the one or more virtual APs is affiliated, or a secondary AP of the one or more secondary APs that is affiliated with the second AP MLD. In some instances, the first identifier may include one or more of a first link identifier that identifies the secondary AP affiliated with the first AP MLD, or a first MLD identifier that identifies the first AP MLD, and each identifier of the one or more second identifiers may include one or more of a second link identifier that identifies the secondary AP that is affiliated with the second AP MLD, or a second MLD identifier that identifies the second AP MLD.

In some implementations, the first AP is associated with a transmitted BSSID (Tx BSSID), and each virtual AP of the one or more virtual APs is associated with a corresponding non-transmitted BSSID (non-Tx BSSID) of one or more non-Tx BSSIDs. In some instances, the first element comprises a multiple BSSID element including one or more non-Tx BSSID profiles, each profile of the one or more non-Tx BSSID profiles including an identifier (ID) field carrying an identifier that uniquely identifies one or both of a respective AP of the first AP and the one or more virtual APs or a respective AP MLD of the first AP MLD and one or more second AP MLDs.

In some implementations, the second element may include a multi-link attribute element including one or more per-link profile subelements, each per-link profile subelement of the one or more per-link profile subelements carrying the discovery information for a corresponding secondary AP of the one or more secondary APs of the first AP MLD and carrying an identifier (ID) field carrying an identifier that uniquely identifies a corresponding secondary communication link of the one or more secondary communication links. In some instances, each per-link profile subelement carries operating parameters of the corresponding secondary AP of the first AP MLD, the operating parameters indicating at least one of a high-throughput (HT) operation, very high-throughput (VHT) operation, high efficiency (HE) operation, extremely high-throughput (EHT) operation, enhanced distributed channel access (EDCA) parameters, multi-user (MU) EDCA parameters, uplink (UL) orthogonal frequency division multiple access (OFDMA) random access (UORA) parameters, target wait time (TWT) parameters, fast initial link setup (FILS) parameters, or spatial reuse (SR) parameters. Each per-link profile subelement may also carry capability information of the corresponding secondary AP of the first AP MLD, the capability information indicating at least one of high-throughput (HT) capabilities, very high-throughput (VHT) capabilities, high efficiency (HE) capabilities, high efficiency (HE) 6 GHz Band Capabilities, or extremely high-throughput (EHT) capabilities.

In some implementations, the multi-link attribute element may also indicate operating parameters of a respective AP and one or more corresponding virtual APs included in the respective AP, the respective AP and the one or more corresponding virtual APs belonging to a corresponding secondary multiple BSS ID set of the one or more secondary multiple BSSID sets.

In some other implementations, the frame may also include a reduced neighbor report (RNR) element carrying one or more neighbor AP information fields, each field of the one or more neighbor AP information fields carrying the unique link ID of a corresponding secondary AP of the one or more secondary APs of the first AP MLD. In some instances, the frame may also include an MLD common element or field carrying common attributes shared by each secondary AP of the one or more secondary APs of the AP MLD, the RNR element further comprising a control field indicating a presence or absence of one or more of the common attributes in the MLD common element or field.

Figure 19B:
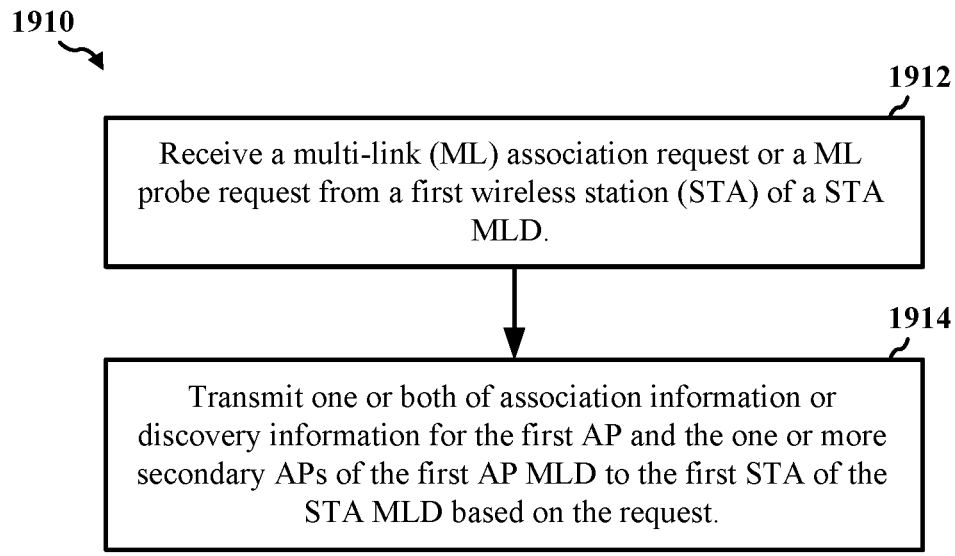

FIG. 19B shows a flowchart illustrating an example process 1910 for wireless communication according to some implementations. The process 1910 may be performed by a first wireless communication device such as the wireless communication device 500 described above with reference to FIG. 5. In some implementations, the process 1910 may be performed by a wireless communication device operating as or within an AP, such as one of the APs 102 and 602 described above with reference to FIGS. 1 and 6A, respectively. For the example of FIG. 19B, the process 1910 is performed by the AP MLD discussed with reference to FIG. 19A.

In some implementations, the process 1910 is performed after transmitting the frame in block 1904 of FIG. 19A. At block 1912, the first AP receives a multi-link (ML) association request or a ML probe request from a first wireless station (STA) of a STA MLD. At block 1914, the first AP transmits one or both of association information or discovery information for the first AP and the one or more secondary APs of the first AP MLD to the first STA of the STA MLD based on the request. In some implementations, the ML association or probe request includes a multi-link attribute element carrying capability information of one or more secondary STAs of the STA MLD.

Figure 19C:
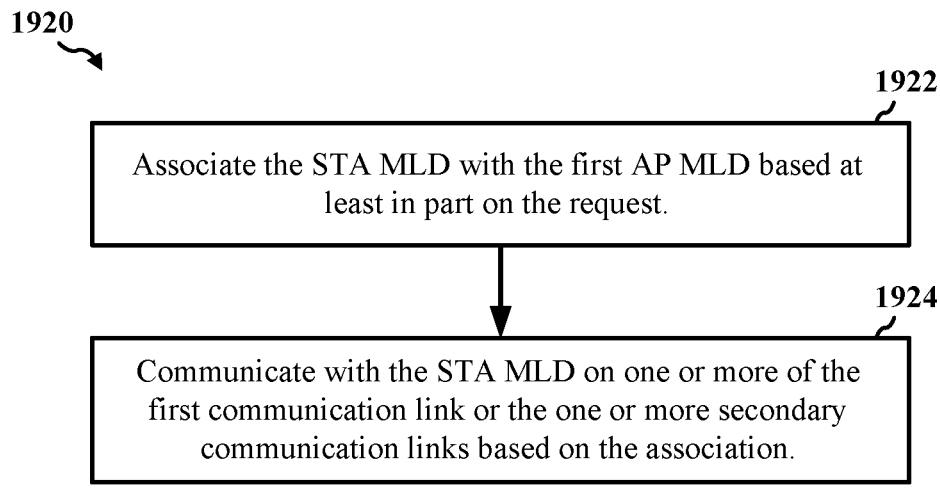

FIG. 19C shows a flowchart illustrating an example process 1920 for wireless communication according to some implementations. The process 1920 may be performed by a first wireless communication device such as the wireless communication device 500 described above with reference to FIG. 5. In some implementations, the process 1920 may be performed by a wireless communication device operating as or within an AP, such as one of the APs 102 and 602 described above with reference to FIGS. 1 and 6A, respectively. For the example of FIG. 19C, the process 1920 is performed by the AP MLD discussed with reference to FIG. 19A.

In some implementations, the process 1920 is performed after transmitting one or both of the association information or the discovery information in block 1914 of FIG. 19B. At block 1922, the first AP associates the STA MLD with the first AP MLD based at least in part on the request. At block 1924, the first AP communicates with the STA MLD on one or more of the first communication link or the one or more secondary communication links based on the association.

Figure 20A:
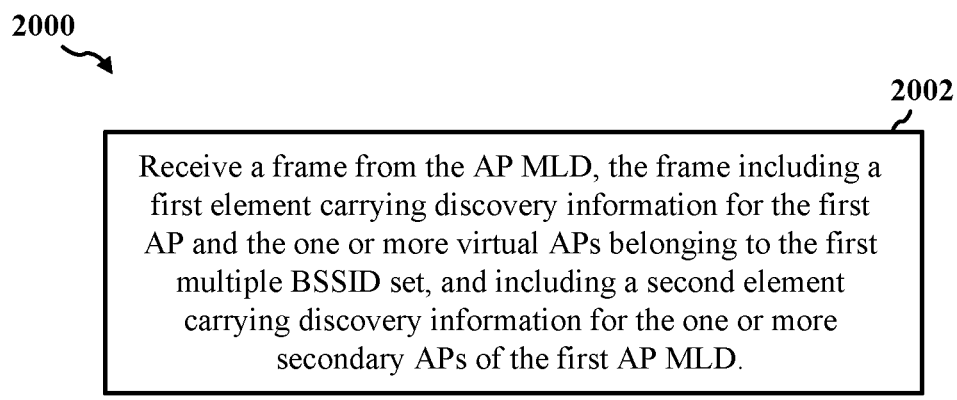
FIGS. 20A-20C show flowcharts illustrating example processes for wireless communication according to some implementations.

FIG. 20A shows a flowchart illustrating an example process 2000 for wireless communication according to some other implementations. The process 2000 may be performed by a first wireless communication device such as the wireless communication device 500 described above with reference to FIG. 5. In some implementations, the process 2000 may be performed by a wireless communication device operating as or within a STA, such as one of the STAs 104 and 604 described above with reference to FIGS. 1 and 6B, respectively. For the example of FIG. 20A, the process 2000 is performed by a STA MLD to associate with an AP MLD that includes a first AP and one or more secondary APs. The AP MLD includes a first AP and one or more secondary APs. The first AP is associated with a first communication link of the AP MLD, and each of the one or more secondary APs is associated with a respective secondary communication link of the one or more secondary communication links of the AP MLD. The first AP also includes one or more virtual APs, and the first AP and the one or more virtual APs of the first AP belong to a first multiple basic service set identifier (BSSID) set associated with the first communication link. At block 2002, the STA MLD receives a frame from the AP MLD, the frame including a first element carrying discovery information for the first AP and the one or more virtual APs belonging to the first multiple BSSID set, and including a second element carrying discovery information for the one or more secondary APs of the first AP MLD.

In some implementations, the frame further may include an identifier (ID) field carrying a first identifier that uniquely identifies one or both of the AP MLD with which the first AP is associated or a respective secondary AP of the one or more secondary APs that is affiliated with the first AP MLD. The frame may also include one or more second ID fields, each field of the one or more second ID fields carrying a corresponding second identifier that uniquely identifies one or both of a second AP MLD of one or more second AP MLDs with which a respective virtual AP of the one or more virtual APs is affiliated, or a secondary AP of the one or more secondary APs that is affiliated with the second AP MLD. In some instances, the first identifier may include one or more of a first link identifier that identifies the secondary AP affiliated with the first AP MLD, or a first MLD identifier that identifies the first AP MLD, and each identifier of the one or more second identifiers may include one or more of a second link identifier that identifies the secondary AP that is affiliated with the second AP MLD, or a second MLD identifier that identifies the second AP MLD.

In some implementations, the first AP is associated with a transmitted BSSID (Tx BSSID), and each virtual AP of the one or more virtual APs is associated with a corresponding non-transmitted BSSID (non-Tx BSSID) of one or more non-Tx BSSIDs. In some instances, the first element comprises a multiple BSSID element including one or more non-Tx BSSID profiles, each profile of the one or more non-Tx BSSID profiles including an identifier (ID) field carrying an identifier that uniquely identifies one or both of a respective AP of the first AP and the one or more virtual APs or a respective AP MLD of the first AP MLD and one or more second AP MLDs.

In some implementations, the second element may include a multi-link attribute element including one or more per-link profile subelements, each per-link profile subelement of the one or more per-link profile subelements carrying the discovery information for a corresponding secondary AP of the one or more secondary APs of the first AP MLD and carrying an identifier (ID) field carrying an identifier that uniquely identifies a corresponding secondary communication link of the one or more secondary communication links. In some instances, each per-link profile subelement carries operating parameters of the corresponding secondary AP of the first AP MLD, the operating parameters indicating at least one of a high-throughput (HT) operation, very high-throughput (VHT) operation, high efficiency (HE) operation, extremely high-throughput (EHT) operation, enhanced distributed channel access (EDCA) parameters, multi-user (MU) EDCA parameters, uplink (UL) orthogonal frequency division multiple access (OFDMA) random access (UORA) parameters, target wait time (TWT) parameters, fast initial link setup (FILS) parameters, or spatial reuse (SR) parameters. Each per-link profile subelement may also carry capability information of the corresponding secondary AP of the first AP MLD, the capability information indicating at least one of high-throughput (HT) capabilities, very high-throughput (VHT) capabilities, high efficiency (HE) capabilities, high efficiency (HE) 6 GHz Band Capabilities, or extremely high-throughput (EHT) capabilities.

In some implementations, the multi-link attribute element may also indicate operating parameters of a respective AP and one or more corresponding virtual APs included in the respective AP, the respective AP and the one or more corresponding virtual APs belonging to a corresponding secondary multiple BSSID set of the one or more secondary multiple BSSID sets.

In some other implementations, the frame may also include a reduced neighbor report (RNR) element carrying one or more neighbor AP information fields, each field of the one or more neighbor AP information fields carrying the unique link ID of a corresponding secondary AP of the one or more secondary APs of the first AP MLD. In some instances, the frame may also include an MLD common element or field carrying common attributes shared by each secondary AP of the one or more secondary APs of the AP MLD, the RNR element further comprising a control field indicating a presence or absence of one or more of the common attributes in the MLD common element or field.

Figure 20B:
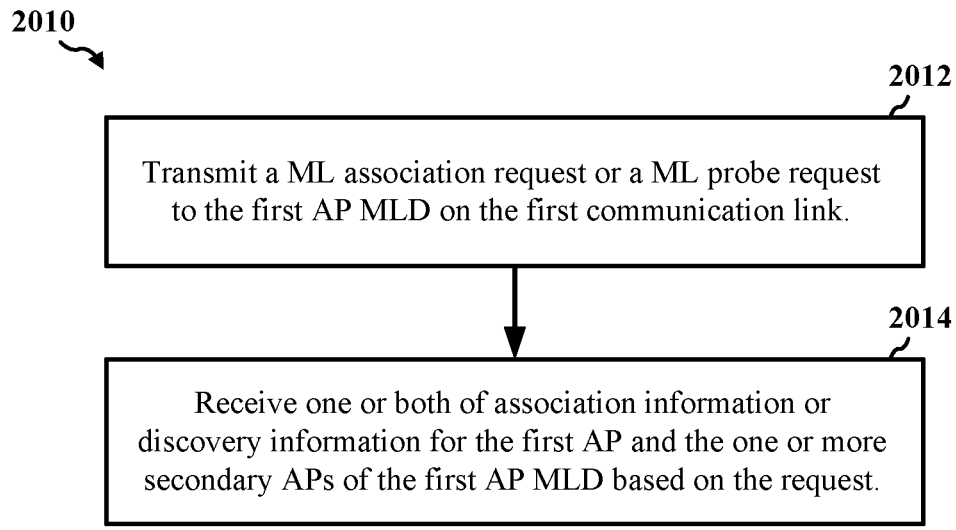

FIG. 20B shows a flowchart illustrating an example process 2010 for wireless communication according to some other implementations. The process 2010 may be performed by a first wireless communication device such as the wireless communication device 500 described above with reference to FIG. 5. In some implementations, the process 2010 may be performed by a wireless communication device operating as or within a STA, such as one of the STAs 104 and 604 described above with reference to FIGS. 1 and 6B, respectively. For the example of FIG. 20B, the process 2010 is performed by the STA MLD discussed with reference to FIG. 20A. In some implementations, the process 2010 is performed after receiving the frame in block 2002 of FIG. 20A. At block 2012, the STA MLD transmits a ML association request or a ML probe request to the first AP MLD on the first communication link. At block 2014, the STA MLD receives one or both of association information or discovery information for the first AP and the one or more secondary APs of the first AP MLD based on the request. In some implementations, the ML association or probe request includes a multi-link attribute element carrying capability information of one or more secondary STAs of the STA MLD.

Figure 20C:
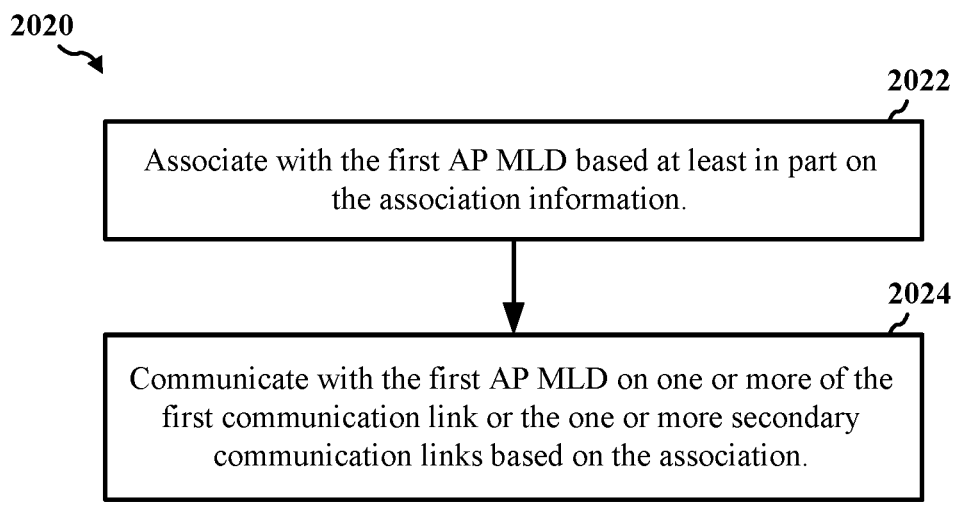

FIG. 20C shows a flowchart illustrating an example process 2020 for wireless communication according to some other implementations. The process 2020 may be performed by a first wireless communication device such as the wireless communication device 500 described above with reference to FIG. 5. In some implementations, the process 2020 may be performed by a wireless communication device operating as or within a STA, such as one of the STAs 104 and 604 described above with reference to FIGS. 1 and 6B, respectively. For the example of FIG. 20C, the process 2020 is performed by the STA MLD discussed with reference to FIG. 20A. In some implementations, the process 2020 is performed after receiving one or both of the association information or the discovery information in block 2014 of FIG. 20B.

In some implementations, the process 2020 is performed after transmitting the frame in block 2014 of FIG. 20B. At block 2022, the STA MLD associates with the first AP MLD based at least in part on the association information. At block 2024, the STA MLD communicates with the first AP MLD on one or more of the first communication link or the one or more secondary communication links based on the association.

Figure 21:
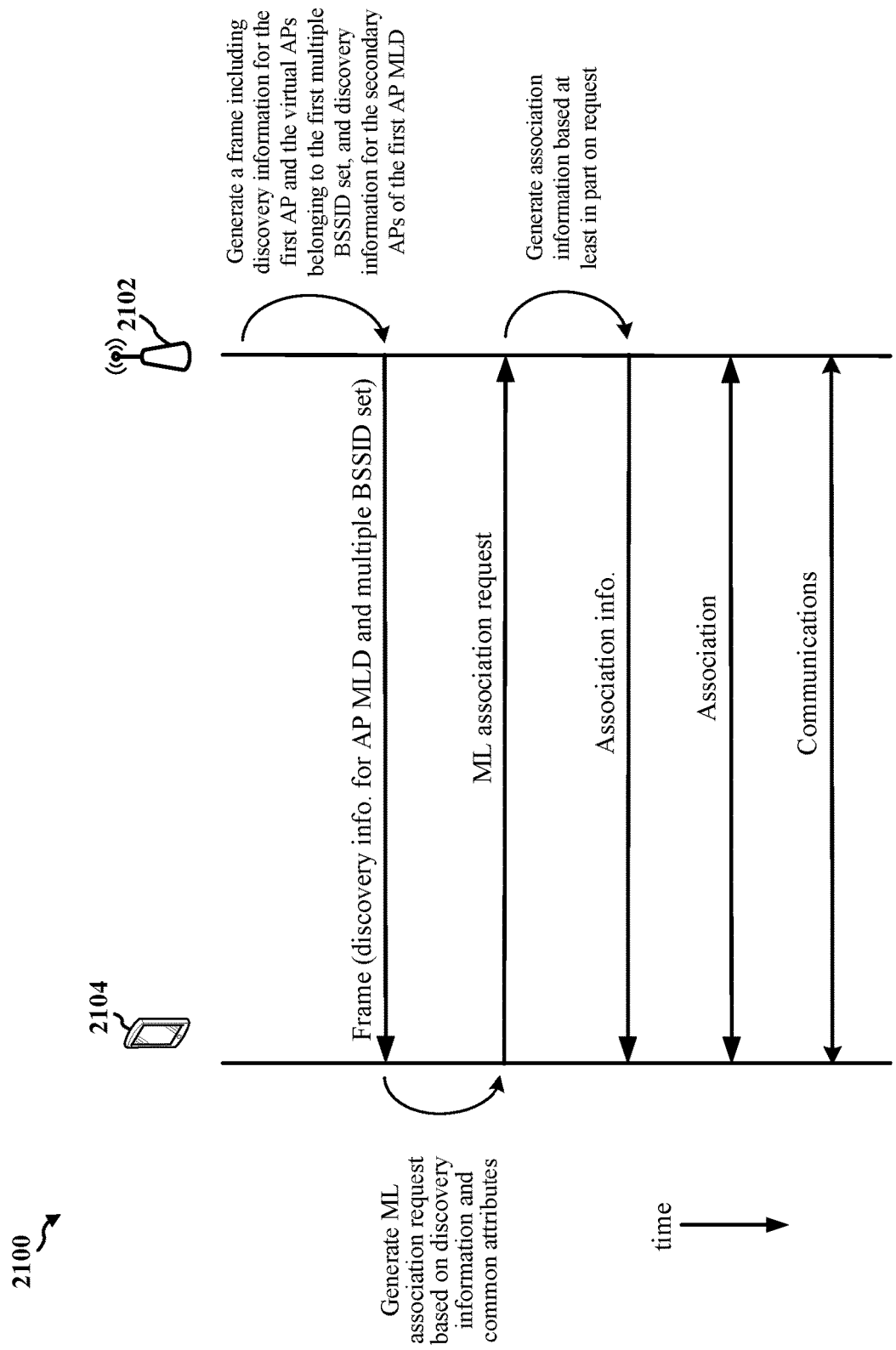
FIG. 21 shows a sequence diagram depicting an example multi-link communication according to some implementations.

FIG. 21 shows a sequence diagram depicting an example multi-link (ML) communication 2100 according to some implementations. In the example of FIG. 21, the ML communication 2100 may be performed between a first wireless communication device 2102 and a second wireless communication device 2104. In some implementations, the first device 2102 may be one of the APs 102 and 602 described above with reference to FIGS. 1 and 6A, respectively, and may be a first AP of a first AP MLD associated with a first communication link of the first AP MLD. Although not shown for simplicity, the AP MLD includes one or more secondary APs associated with one or more respective secondary communication links of the first AP MLD, the first AP belonging to a first multiple basic service set identifier (BSSID) set associated with the first communication link and including one or more virtual APs corresponding to one or more different BSSIDs. The second device 2104 may be one of the STAs 104 and 604 described above with reference to FIGS. 1 and 6B, respectively, and may be part of a STA MLD.

The first device 2102 generates a frame including discovery information for the first AP and the one or more virtual APs belonging to the first multiple BSSID set, and including discovery information for the one or more secondary APs of the first AP MLD associated with the one or more respective secondary communication links of the first AP MLD. The first device 2102 transmits the frame on the first communication link to the second device 2104.

The second device 2104 receives the frame, and transmits a ML association request to the first device 2102. The first device 2102 receives the ML association request, and transmits association information for the first communication link and the one or more secondary communication links based on the ML association request.

The first device 2102 associates the second device 2104 with the AP MLD based at least in part on the association information, and thereafter communicates with the second device 2104 on one or more of the first communication link or the one or more secondary communication links based on the association.

Figure 22:
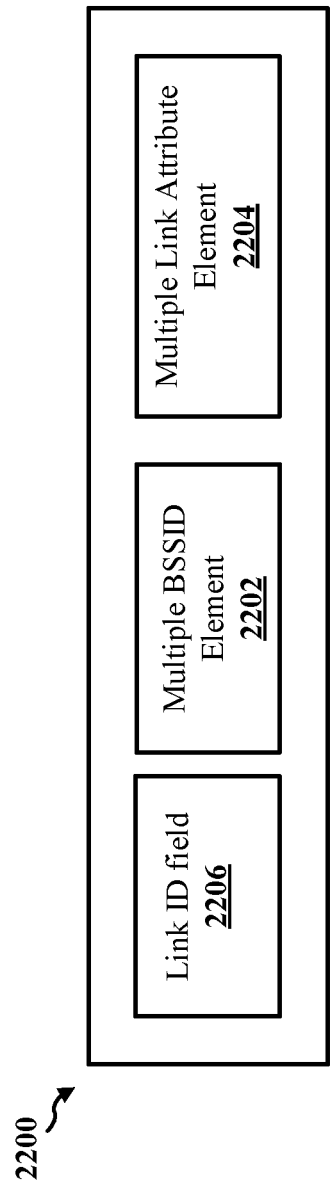
FIG. 22 shows an example frame usable for communications between wireless communication devices.

FIG. 22 shows an example frame 2200 usable for communications between wireless communication devices. The frame 2200 may be one example of the frame in the sequence diagram of FIG. 21. In some implementations, the frame 2200 may be a beacon frame. In some other implementations, frame 2200 may be a probe response or an association response. The frame 2200 is shown to include a multiple BSSID element 2202 and a multiple link attribute element 2204.

The multiple BSSID element 2202 may include discovery information for the first AP and the one or more virtual APs belonging to the first multiple BSSID set. The discovery information may include an operating class of the first communication link, a wireless channel of the first communication link, and a basic service set identifier (BSSID) of the first communication link. In some implementations, the multiple BSSID element 2202 may also include capability information of the first AP and the one or more virtual APs. The capability information includes at least one of high-throughput (HT) capabilities, very high-throughput (VHT) capabilities, high efficiency (HE) capabilities, high efficiency (HE) 6 GHz Band Capabilities, or extremely high-throughput (EHT) capabilities.

In some implementations, the multiple BSSID element 2202 further includes one or more operating parameters of the first AP and the one or more virtual APs. The operating parameters includes at least one of high-throughput (HT) operation element, very high-throughput (VHT) operation element, high efficiency (HE) operation element, extremely high-throughput (EHT) operation element, enhanced distributed channel access (EDCA) parameters, multi-user (MU) EDCA parameters, uplink (UL) orthogonal frequency division multiple access (OFDMA) random access (UORA) parameters, target wait time (TWT) parameters, fast initial link setup (FILS) parameters, or spatial reuse (SR) parameters.

The multiple link attribute element 2204 may include discovery information for the one or more secondary APs of the first AP MLD associated with the one or more respective secondary communication links of the first AP MLD. In some implementations, the multiple BSSID element 2202 carries a link ID subelement indicating a unique identifier for the first communication link. The discovery information included in the multiple link attribute element 2204 may include an operating class, a wireless channel, and a BSSID of each multiple BSSID set of the one or more other multiple BSSID sets. In some implementations, the multiple link attribute element 2204 also includes capability information of one or more APs belonging to each multiple BSSID set of the one or more other multiple BSSID sets. The capabilities may include at least one of high-throughput (HT) capabilities, very high-throughput (VHT) capabilities, high efficiency (HE) capabilities, or extremely high-throughput (EHT) capabilities of the transmitting device.

In some implementations, the multiple link attribute element 2204 also includes operating parameters of one or more APs belonging to each multiple BSSID set of the one or more other multiple BSSID sets. The operating parameters may include at least one of high-throughput (HT) operation element, very high-throughput (VHT) operation element, high efficiency (HE) operation element, extremely high-throughput (EHT) operation element, enhanced distributed channel access (EDCA) parameters, multi-user (MU) EDCA parameters, uplink (UL) orthogonal frequency division multiple access (OFDMA) random access (UORA) parameters, target wait time (TWT) parameters, fast initial link setup (FILS) parameters, or spatial reuse (SR) parameters.

The frame 2200 may also include a link ID field 2206. The link ID field 2206 may carry a first identifier that uniquely identifies one or both of the AP MLD with which the first AP is associated or a respective secondary AP of the one or more secondary APs that is affiliated with the first AP MLD. In some implementations, the link ID field 2206 may also carry one or more second ID fields, each field of the one or more second ID fields carrying a corresponding second identifier that uniquely identifies one or both of a second AP MLD of one or more second AP MLDs with which a respective virtual AP of the one or more virtual APs is affiliated, or a secondary AP of the one or more secondary APs that is affiliated with the second AP MLD. In some instances, the first identifier comprises one or more of a first link identifier that identifies the secondary AP affiliated with the first AP MLD, or a first MLD identifier that identifies the first AP MLD, and each identifier of the one or more second identifiers comprises one or more of a second link identifier that identifies the secondary AP that is affiliated with the second AP MLD, or a second MLD identifier that identifies the second AP MLD.

Figure 23:
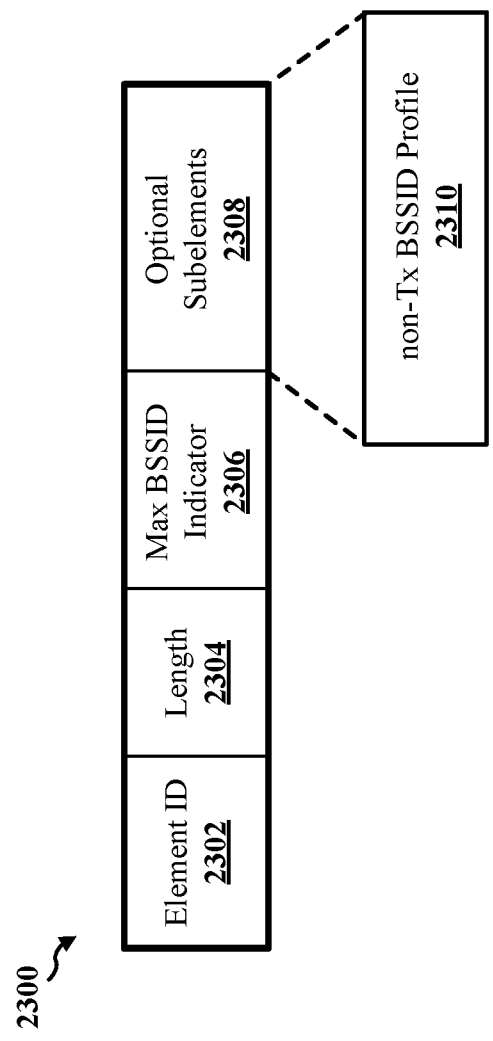
FIG. 23 shows an example multiple BSSID element usable for communications between wireless communication devices.

FIG. 23 shows an example multiple BSSID element 2300 usable for communications between wireless communication devices. The Multiple BSSID element 2300, which may be used by an AP associated with the Tx BSSID to advertise the presence of the multiple BSSID set, includes an element ID field 2302, a length field 2304, a MaxBSSID Indicator field 2306, and an optional Sub-elements field 2308. The element ID field 2302 may store a value indicating the element type (such as a Multiple BSSID element). The length field 2304 may store a value indicating a length of the Multiple BSSID element 2300. The MaxBSSID Indicator field 2306 may store a value indicating the maximum possible number of BSSIDs in the multiple BSSID set.

The optional Sub-elements field 2308 may store zero or more additional sub-elements. For the example of FIG. 23, the Sub-elements field 2308 is shown to include a non-Tx BSSID profile 2310. The non-Tx BSSID profile 2310 may contain a list of elements for one or more APs (or virtual APs) associated with the non-Tx BSSIDs. In some implementations, the non-Tx BSSID profile 2310 may include. In some other implementations, the non-Tx BSSID profile 2310 may also include a non-Tx BSSID capabilities element, an SSID and BSSID-index element, and an FMS descriptor element (not shown for simplicity).

FIG. 24 shows an example multi-link attribute element 2400 usable for communications between wireless communication devices. In some implementations, the multiple link attribute element 2400 may be used to carry the MLD common element 2204 and the one or more per-link profile elements 2206(1)-2206(n) described with reference to FIGS. 22A and 22B.

FIG. 25 shows another example frame 2500 usable for communications between wireless communication devices. The frame 2500 is shown to include a reduced neighbor report (RNR) 2510, a multiple link attribute element 2520, and a multiple BSSID element 2530. In some implementations, the RNR element 2510 includes one or more neighbor AP information fields, each field of the one or more neighbor AP information fields including a unique link ID and one or more of an operating class of the first communication link, a wireless channel of the first communication link, and a basic service set identifier (BSSID) of the first communication link. In some implementations, the RNR element 2510 includes capability information of the first AP and the one or more virtual APs. The capability information may include at least one of high-throughput (HT) capabilities, very high-throughput (VHT) capabilities, high efficiency (HE) capabilities, high efficiency (HE) 6 GHz Band Capabilities, or extremely high-throughput (EHT) capabilities.

In some implementations, the RNR element 2510 also includes one or more operating parameters of the first AP and the one or more virtual APs. The one or more operating parameters includes at least one of high-throughput (HT) operation element, very high-throughput (VHT) operation element, high efficiency (HE) operation element, extremely high-throughput (EHT) operation element, enhanced distributed channel access (EDCA) parameters, multi-user (MU) EDCA parameters, uplink (UL) orthogonal frequency division multiple access (OFDMA) random access (UORA) parameters, target wait time (TWT) parameters, fast initial link setup (FILS) parameters, or spatial reuse (SR) parameters.

The multiple link attribute element 2520 may include one or more per-link profile elements, each per-link profile element of the one or more per-link profile elements including a corresponding unique link ID and capability information of one or more APs belonging to each multiple BSSID set of the one or more other multiple BSSID sets. The multiple link attribute element 2520 may also include operating parameters of one or more APs belonging to each multiple BSSID set of the one or more other multiple BSSID sets. The operating parameters include at least one of high-throughput (HT) operation element, very high-throughput (VHT) operation element, high efficiency (HE) operation element, extremely high-throughput (EHT) operation element, enhanced distributed channel access (EDCA) parameters, multi-user (MU) EDCA parameters, uplink (UL) orthogonal frequency division multiple access (OFDMA) random access (UORA) parameters, target wait time (TWT) parameters, fast initial link setup (FILS) parameters, or spatial reuse (SR) parameters.

In some implementations, the link IDs carried in the neighbor AP information fields are the same as the link IDs carried in respective per-link profile subelements of the MLA element 2520, for example, so that information carried in the neighbor AP information fields may be mapped to information carried in the per-link profile subelements of the MLA element. In some instances, the RNR element may include a first identifier (ID) field carrying a first identifier that uniquely identifies one or both of the AP MLD with which the first AP is associated or a respective secondary AP of the one or more secondary APs, and may include one or more second ID fields, each field of the one or more second ID fields carrying at least one of a link identifier that identifies a respective secondary AP of the one or more secondary APs or an MLD identifier that identifies the first AP MLD. In some instances, each link identifier of the first link identifier and the one or more second link identifier associates one or more traffic identifiers (TIDs) with a respective communication link of the first communication link and the one or more secondary communication links for a block acknowledgement (BA) session between the AP MLD and the STA MLD.

The multiple link attribute element 2520 may also include an indication 2530 of whether the transmitting device supports simultaneous transmit-and-receive (STR) operations across multiple links of the first communication link and the one or more secondary communication links. In some instances, the STR indication 2530 may indicate whether the transmitting device is an STR device or a non-STR device.

In some implementations, the multiple link attribute element 2520 may include an indication 2540 of critical updates corresponding to at least one of the first communication link and the one or more secondary communication links. In some instances, the critical updates may include a change in operating channels or a change in basic service set (BSS) parameters for at least one communication link of the first communication link and the one or more secondary communication links.

In some implementations, the RNR element 2510 is extended to include a Link ID field that stores one or more unique link IDs that may be used to map the AP entries in the RNR element 2510 with corresponding per-link profile elements in the multiple link attribute element 2520. In such implementations, the multiple link attribute element 2520 also includes a Link ID field that stores the one or more unique link IDs.

Figure 26:
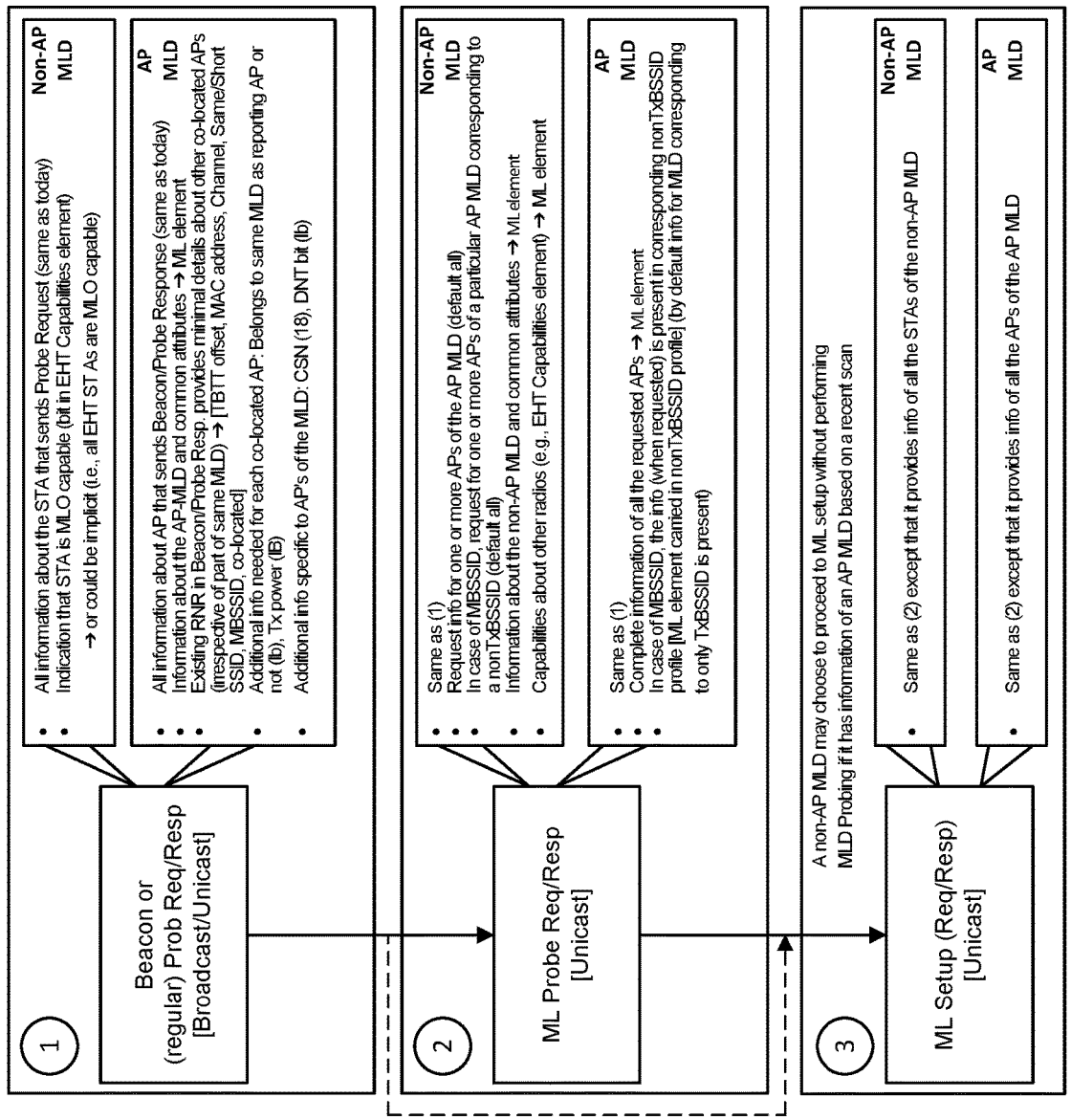
FIG. 26 shows an illustration depicting an example process for associating various wireless communication devices with an AP MLD.

FIG. 26 shows an illustration depicting an example process for associating various wireless communication devices with an AP MLD.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by an access point (AP) multi-link device (MLD), comprising:
generating a frame by a first AP that is affiliated with the AP MLD and is associated with a first communication link of the AP MLD, the AP MLD comprising one or more affiliated secondary APs that are associated with one or more respective secondary communication links of the AP MLD, the frame comprising:

information for the first AP, the information comprising at least one of an operating class of the first AP, a wireless channel of the first AP, and a basic service set identifier (BSSID) of the first AP;
- a first portion carrying information for each secondary AP of the one or more affiliated secondary APs, the information comprising an operating class of the respective secondary AP, a wireless channel of the respective secondary AP, and a BSSID of the respective secondary AP; and
- a second portion carrying common attributes of the AP MLD; and transmitting the frame on the first communication link.

2. The method of claim 1, further comprising:
receiving a request from a wireless station (STA) of a STA MLD in accordance with the transmitted frame, the request comprising a multi-link (ML) association request or a ML probe request; and
transmitting one or both of association information or the information for the first AP and one or both of the association information and the information for the one or more affiliated secondary APs in accordance with the ML association request or the ML probe request.

3. The method of claim 2, further comprising:
associating the STA MLD with the AP MLD in accordance with the request; and
communicating with the STA MLD on one or more of the first communication link or the one or more respective secondary communication links in accordance with the association.

4. The method of claim 3, wherein the associating comprises:
establishing a common security context between a first medium access control service access point (MAC-SAP) endpoint of the AP MLD and a second MAC-SAP endpoint of the STA MLD, each of the first and second MAC-SAP endpoints for communicating over the first communication link and the one or more respective secondary communication links.

5. The method of claim 2, further comprising:
establishing a block acknowledgement (BA) session with the STA MLD in accordance with an affiliation of one or more traffic identifiers (TIDs) with a first group of communication links that comprises one or more of the first communication link or the one or more respective secondary communication links.

6. The method of claim 5, further comprising:
dynamically reaffiliating the one or more TIDs with a second group of communication links that includes one or more of the first communication link or the one or more respective secondary communication links, the first group of communication links different than the second group of communication links; and
transmitting an Add Block Acknowledgment (ADDBA) frame including a field carrying an indication of the reaffiliation.

7. The method of claim 1, further comprising:
receiving, by the first AP on the first communication link, a directed probe request from a wireless station (STA) of a STA MLD, the directed probe request requesting one or more of the information, operating parameters, capabilities, or an operating class for each AP affiliated with the AP MLD; and
transmitting the frame as a multi-link (ML) probe response frame in accordance with receiving the directed probe request from the STA MLD.

8. The method of claim 7, wherein the directed probe request indicates one or more of capabilities, operating parameters, an operating class, or identification information of each STA of the STA MLD.

9. The method of claim 1, wherein the frame further comprises a first identifier (ID) field carrying a first identifier that uniquely identifies one or both of the AP MLD with which the first AP is affiliated or a respective secondary AP of the one or more affiliated secondary APs.

10. The method of claim 9, wherein the frame further comprises one or more second ID fields, each field of the one or more second ID fields carrying one or both of a link identifier that identifies a respective secondary AP of the one or more secondary APs or an MLD identifier that identifies the first AP MLD.

11. The method of claim 10, wherein each link identifier of the first link identifier and the one or more second link identifiers associates one or more traffic identifiers (TIDs) with a respective communication link of the first communication link and the one or more respective secondary communication links.

12. The method of claim 1, wherein:
the first portion comprises one or more per-STA profile subelements, each per-STA profile subelement indicating the information for a corresponding secondary AP of the one or more affiliated secondary APs associated with a respective secondary communication link of the one or more respective secondary communication links; and
the second portion comprises an MLD common element or field indicating the common attributes of the AP MLD.

13. The method of claim 12, wherein each per-STA profile subelement further includes one or more of capability information or operating parameter information of a corresponding secondary AP of the one or more affiliated secondary APs, the capability information indicating one or more of high-throughput (HT) capabilities, very high-throughput (VHT) capabilities, high efficiency (HE) capabilities, HE 6 GHz Band capabilities, or extremely high-throughput (EHT) capabilities, and the operating parameter information indicating one or more of HT operation parameters, VHT operation parameters, HE operation parameters, EHT operation parameters, enhanced distributed channel access (EDCA) parameters, multi-user (MU) EDCA parameters, uplink (UL) orthogonal frequency division multiple access (OFDMA) random access (UORA) parameters, target wait time (TWT) parameters, fast initial link setup (FILS) parameters, or spatial reuse (SR) parameters.

14. The method of claim 13, wherein an absence of a particular capability or operating parameter from a respective per-STA profile subelement of the one or more per-STA profile subelements indicates that the particular capability or operating parameter of the corresponding secondary AP of the one or more affiliated secondary APs is the same as the particular capability or operating parameter of the first AP.

15. The method of claim 13, wherein the frame further includes a field within each per-STA profile subelement carrying an indication of whether the per-STA profile subelement of the one or more per-STA profile subelements carries all of the information for the corresponding secondary AP or only a portion of the information for the corresponding secondary AP.

16. The method of claim 1, wherein the first portion comprises a reduced neighbor report (RNR) element, and the second portion comprises a multi-link element.

17. The method of claim 16, wherein the RNR element indicates one or more of a transmit power level, a critical update, or an applicable amendment to the IEEE 802.11 family of standards for each AP of the one or more secondary APs.

18. The method of claim 16, wherein:
the RNR element includes one or more neighbor AP information fields, each field of the one or more neighbor AP information fields including a unique link identifier (ID) that identifies a corresponding communication link of the one or more secondary communication links associated with a respective one or more secondary APs; and
the multi-link element includes one or more per-STA profile subelements, each per-STA profile subelement of the one or more per-STA profile subelements including a corresponding one of the unique link IDs and one or more of capabilities or operating parameters for a respective AP of the one or more affiliated secondary APs.

19. The method of claim 1, wherein the frame further includes a field containing an indication of a presence or absence of each of the common attributes indicated in the second portion of the frame.

20. The method of claim 1, wherein the frame further indicates whether the AP MLD supports simultaneous transmit-and-receive (STR) operations across multiple links of the first communication link or the one or more respective secondary communication links.

21. The method of claim 1, wherein the frame comprises one of a beacon frame, a probe response frame, an association response frame, or a reassociation response frame.

22. The method of claim 1, wherein:
the frame further includes an indication of one or more critical updates corresponding to one or more of the first AP or the one or more affiliated secondary APs; and
the one or more critical updates include a change in operating channels or a change in basic service set (BSS) parameters for one or more APs of the first AP or the one or more secondary APs.

23. An access point (AP) multi-link device (MLD), comprising:
one or more modems;
one or more processors communicatively coupled with the one or more modems; and
one or more memories communicatively coupled with the one or more processors and storing processor-readable code that, when executed by the one or more processors in conjunction with the one or more modems, causes the AP MLD to perform operations comprising:
generating a frame by a first AP that is affiliated with the AP MLD and is associated with a first communication link of the AP MLD, the AP MLD comprising one or more affiliated secondary APs that are associated with one or more respective secondary communication links of the AP MLD, the frame comprising:
information for the first AP, the information comprising at least one of an operating class of the first AP, a wireless channel of the first AP, and a basic service set identifier (BSSID) of the first AP;
a first portion carrying information for each secondary AP of the one or more affiliated secondary APs, the information comprising an operating class of the respective secondary AP, a wireless channel of the respective secondary AP, and a BSSID of the respective secondary AP; and
a second portion carrying common attributes of the AP MLD; and
transmitting the frame on the first communication link.

24. A method for wireless communication performed by a wireless station (STA) multi-link device (MLD), comprising:
receiving, on a first communication link of an AP MLD, a frame from a first access point (AP) that is affiliated with the AP MLD and is associated with the first communication link of the AP MLD, the AP MLD comprising one or more affiliated secondary APs that are associated with one or more respective secondary communication links of the AP MLD, the frame comprising:
information for the first AP, the information comprising at least one of an operating class of the first AP, a wireless channel of the first AP, and a basic service set identifier (BSSID) of the first AP;
a first portion carrying information for each secondary AP of the one or more affiliated secondary APs, the information comprising an operating class of the respective secondary AP, a wireless channel of the respective secondary AP, and a BSSID of the respective secondary AP; and
a second portion carrying common attributes of the AP MLD.

25. The method of claim 24, further comprising:
transmitting a request comprising a multi-link (ML) association request to the AP MLD, the ML association request indicating one or more of capabilities, operating parameters, an operating class, or identification information of each STA of the STA MLD; and
receiving association information for the first AP and association information for the one or more affiliated secondary APs in accordance with the ML association request.

26. The method of claim 25, further comprising:
associating the STA MLD with the AP MLD in accordance with the association information; and
communicating with the AP MLD on one or more of the first communication link or the one or more respective secondary communication links in accordance with the association.

27. The method of claim 26, wherein the associating comprises:
establishing a block acknowledgement (BA) session with the AP MLD in accordance with an affiliation of one or more traffic identifiers (TIDs) with a first group of communication links that comprises one or more of the first communication link or the one or more secondary communication links.

28. The method of claim 27, further comprising:
dynamically reaffiliating the one or more TIDs with a second group of communication links that includes one or more of the first communication link or the one or more respective secondary communication links, the first group of communication links different than the second group of communication links; and
transmitting an Add Block Acknowledgment (ADDBA) frame including a field carrying an indication of the reaffiliation.

29. The method of claim 24, further comprising:
transmitting a directed probe request to the first AP, the directed probe request requesting one or more of the information, operating parameters, capabilities, or an operating class for each AP affiliated with the AP MLD; and receiving the frame in accordance with transmission of the directed probe request to the first AP affiliated with the AP MLD.

30. A wireless station (STA) multi-link device (MLD), comprising:
one or more modems;
one or more processors communicatively coupled with the one or more modems; and
one or more memories communicatively coupled with the one or more processors and storing processor-readable code that, when executed by the one or more processors in conjunction with the one or more modems, causes the STA MLD to perform operations comprising:
receiving, on a first communication link of an AP MLD, a frame from a first access point (AP) that is affiliated with the AP MLD and is associated with the first communication link of the AP MLD, the AP MLD comprising one or more affiliated secondary APs associated with one or more respective secondary communication links of the AP MLD, the frame comprising:
information for the first AP, the information comprising at least on of an operating class of the first AP, a wireless channel of the first AP, and a basic service set identifier (BSSID) of the first AP;
a first portion indicating information for each secondary AP of the one or more affiliated secondary APs, the information comprising an operating class of the respective secondary AP, a wireless channel of the respective secondary AP, and a BSSID of the respective secondary AP; and
a second portion indicating common attributes of the AP MLD.

* * * * *